US007780277B2

(12) United States Patent
Aruga et al.

(10) Patent No.: US 7,780,277 B2
(45) Date of Patent: Aug. 24, 2010

(54) LIQUID INJECTING APPARATUS

(75) Inventors: Yoshiharu Aruga, Nagano-ken (JP); Toshio Kumagai, Nagano-ken (JP); Hitoshi Matsumoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 953 days.

(21) Appl. No.: 11/598,750

(22) Filed: Nov. 14, 2006

(65) Prior Publication Data

US 2007/0115333 A1 May 24, 2007

Related U.S. Application Data

(62) Division of application No. 10/468,760, filed on Aug. 25, 2003, now Pat. No. 7,156,507.

(30) Foreign Application Priority Data

| | | | |
|---|---|---|---|
| Nov. 12, 2001 | (JP) | ........................... | P2001-345827 |
| Mar. 25, 2002 | (JP) | ........................... | P2002-082376 |
| Aug. 29, 2002 | (JP) | ............................. | 2002-252173 |
| Aug. 29, 2002 | (JP) | ............................. | 2002-252176 |
| Aug. 30, 2002 | (JP) | ............................. | 2002-255171 |
| Oct. 16, 2002 | (JP) | ............................. | 2002-302256 |

(51) Int. Cl.
*B41J 2/175* (2006.01)
*F16K 31/00* (2006.01)

(52) U.S. Cl. ...................................... 347/85; 251/335.2

(58) Field of Classification Search ............. 347/85–86; 251/335.1, 335.2, 335.3
See application file for complete search history.

(56) References Cited

U.S. PATENT DOCUMENTS

| | | | | |
|---|---|---|---|---|
| 5,450,112 | A | 9/1995 | Scheffelin | |
| 5,716,533 | A | 2/1998 | O'Neill et al. | |
| 5,923,353 | A | 7/1999 | Boyd et al. | |
| 5,966,155 | A | 10/1999 | Pawlowski et al. | |
| 6,084,617 | A | 7/2000 | Balazer | |
| 6,137,512 | A | 10/2000 | Higuma et al. | |
| 6,203,146 | B1 | 3/2001 | Pawlowksi, Jr. et al. | |
| 6,302,531 | B1 * | 10/2001 | Usui et al. | 347/86 |
| 6,685,307 | B2 | 2/2004 | Dowell et al. | |
| 6,846,062 | B2 | 1/2005 | Harada et al. | |
| 6,886,928 | B2 * | 5/2005 | Sasaki et al. | 347/86 |
| 7,121,652 | B2 | 10/2006 | Harada et al. | |

(Continued)

FOREIGN PATENT DOCUMENTS

| | | |
|---|---|---|
| EP | 0 339 770 A2 | 11/1989 |

(Continued)

*Primary Examiner*—Stephen D Meier
*Assistant Examiner*—Geoffrey Mruk
(74) *Attorney, Agent, or Firm*—Sughrue Mion, PLLC

(57) ABSTRACT

Provided is a liquid injecting apparatus equipped with a liquid injecting head, which is mounted on a carriage and moved reciprocally in a widthwise direction of a target, and a valve unit, which is mounted on the carriage to be supplied with liquid via a supply passage from a liquid retainer and to supply liquid to the liquid injecting head. The valve unit has a pressure chamber connected to the liquid retainer via the supply passage; a valve, which opens or closes the supply passage to supply liquid to the pressure chamber; and a flexible film member, which is displaced based on a negative pressure generated as liquid in the pressure chamber decreases to thereby operate the valve.

6 Claims, 48 Drawing Sheets

U.S. PATENT DOCUMENTS

| | | | |
|---|---|---|---|
| 2001/0006396 | A1 | 7/2001 | Iida |
| 2001/0020971 | A1 | 9/2001 | Usui et al. |
| 2001/0024225 | A1 | 9/2001 | Ishizawa et al. |
| 2006/0250436 | A1 | 11/2006 | Harada et al. |

FOREIGN PATENT DOCUMENTS

| | | | |
|---|---|---|---|
| EP | 0733481 | A2 | 9/1996 |
| EP | 0 800 922 | A1 | 10/1997 |
| EP | 1 016 533 | A1 | 7/2000 |
| GB | 2 331 488 | A | 5/1999 |
| JP | 08-174860 | A | 7/1996 |
| JP | 08-176388 | A | 7/1996 |
| JP | 09-011488 | A | 1/1997 |
| JP | 09-193414 | A | 7/1997 |
| JP | 10-029324 | A | 2/1998 |
| JP | 2001-001554 | A | 1/2001 |
| JP | 2001-199080 | A | 7/2001 |
| JP | 2001-514985 | A | 9/2001 |
| WO | WO 99/41083 | A2 | 8/1999 |
| WO | WO 01/32424 | A2 | 5/2001 |

* cited by examiner

Fig. 41

With Respect to Volume of Pressure Chamber

In Case of Position of 40% | In Case of Position of 25% | In Case of Position of 12%

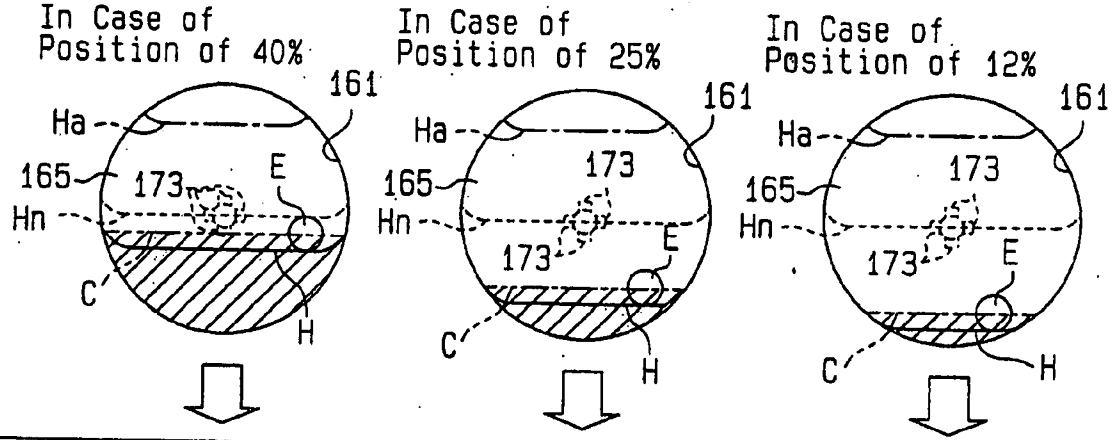

| Residual Ink Density | No Valve | Valve Present | No Valve | Valve Present | No Valve | Valve Present |
|---|---|---|---|---|---|---|
| At the Time of Cleaning | 100.00 | 100.00 | 100.00 | 100.00 | 100.00 | 100.00 |
| First Cleaning | 80.00 | 50.00 | 50.00 | 31.25 | 24.00 | 15.00 |
| Second Cleaning | 64.00 | 25.00 | 25.00 | 9.77 | 5.76 | 2.25 |
| Third Cleaning | 51.20 | 12.50 | 12.50 | 3.05 | 1.38 | 0.34 |
| Fourth Cleaning | 40.96 | 6.25 | 6.25 | 0.95 | 0.33 | 0.05 |
| Fifth Cleaning | 32.77 | 3.13 | 3.13 | 0.30 | 0.08 | 0.01 |
| Sixth Cleaning | 26.21 | 1.56 | 1.56 | 0.09 | 0.02 | 0.00 |
| Seventh Cleaning | 20.97 | 0.78 | 0.78 | 0.03 | 0.00 | 0.00 |
| Eighth Cleaning | 16.78 | 0.39 | 0.39 | 0.01 | 0.00 | 0.00 |
| Nighth Cleaning | 13.42 | 0.20 | 0.20 | 0.00 | 0.00 | 0.00 |
| Tenth Cleaning | 10.74 | 0.10 | 0.10 | 0.00 | 0.00 | 0.00 |

Fig.61
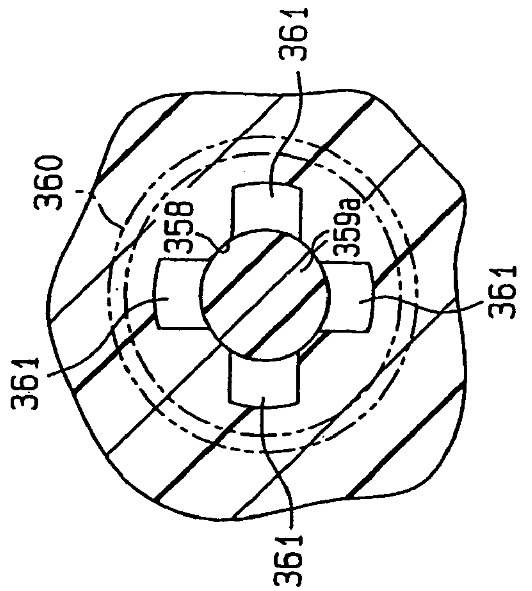
Fig.60(b)
Fig.60(a)
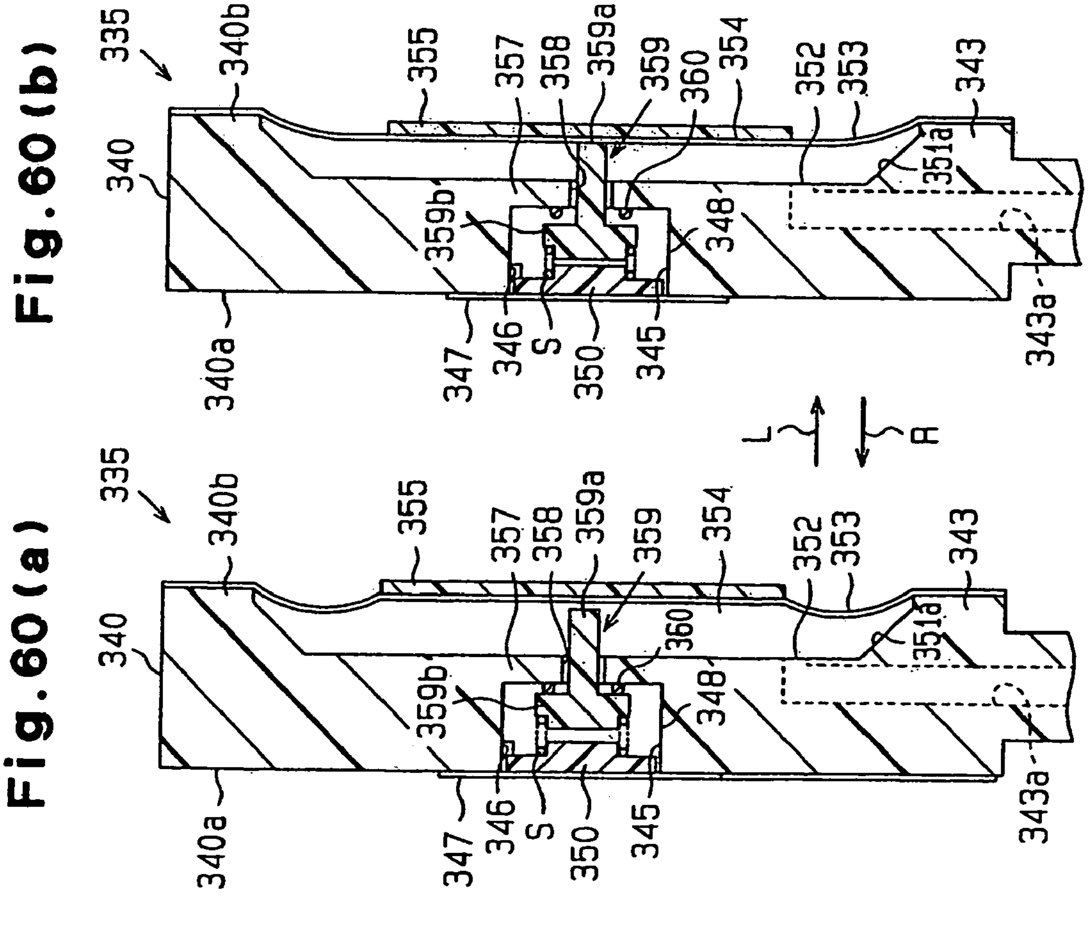

LIQUID INJECTING APPARATUS

This is a divisional of application Ser. No. 10/468,760 filed Aug. 25, 2003 now U.S. Pat. No. 7,156,507. The entire disclosure of the prior application, application Ser. No. 10/468,760 is hereby incorporated by reference.

TECHNICAL FIELD

The present invention relates to a liquid injecting apparatus, a valve unit that is used therein, and a method of manufacturing the valve unit.

Conventionally, as an apparatus that injects a minute amount of liquid onto a target, an ink jet type printer prints by injecting a plurality of ink droplets. This type of printer includes a recording head in which a plurality of nozzles with minuscule opening portions is formed, and discharges ink droplets from the opening portions of the individual nozzles. Most of the recording apparatus of this type, which are mainly used for home usage, are constructed in such a way that individual ink cartridges for supplying inks to the recording head can be detachably attached to a carriage on which the recording head is mounted.

In such a printer of a so-called on-carriage type, frequent replacement of the ink cartridges is inevitable when carrying out a relatively large amount of printing. This therefore requires manpower in replacing the ink cartridges and consequently increases the running cost. Therefore, printers that are used for business use a structure (off-carriage type) wherein large-capacity ink cartridges are laid out apart from the carriage and inks are supplied from the ink cartridges to the recording head, mounted on the carriage, via flexible tubes.

In such an off-carriage type structure, the extending distance of the ink supply tubes becomes greater as the printer size (paper size) increases, thereby increasing the dynamic pressure (pressure loss) in the ink supply tubes extending from the ink cartridges to the carriage. It is therefore necessary to use individual ink supply tubes with large inside diameters. Larger diameters of ink supply tubes increase the flexing resistance of each tube. To overcome the increase in the flexing resistance, for example, the drive force of the carriage needs to be increased further. This increases the size of the recording apparatus.

In this respect, the present applicant has already proposed a structure of an ink pressurized supply system that pressurizes the ink pack in the ink cartridge with air and supplies the ink to each sub tank mounted on the carriage in order to eliminate the influence of the dynamic pressure in the tube (e.g., Japanese Laid-Open Patent Publication No. 2001-199080).

According to the recording apparatus employing this pressurized supply system, the ink is always supplied to each sub tank from each ink cartridge by pressurized air so that a constant range of ink is always stored in the sub tank. This can guarantee a more stable ink-droplet discharge action of the recording head.

Because the ink from each ink cartridge fed by the pressurized air is stored in each sub tank so as to come to a predetermined liquid level, a liquid level detecting mechanism should be arranged with respect to each sub tank. In case of employing such a liquid level detecting mechanism, the reliability of the mechanism of the liquid level detecting mechanism must be improved. This inevitably increases the cost. Further, in order to cope with the use environment of the recording apparatus and with abnormal use conditions, such as vibration, the control system becomes complicated and the mechanism inevitably becomes large.

Japanese Laid-Open Patent Publication No. Hei 9-11488 describes an ink supply apparatus equipped with a reservoir for retaining the ink and a backpressure adjuster to receive the ink from the reservoir and feed it to the print head. In this apparatus, nozzles are provided between the reservoir and the print head, and the nozzles are released from the valve seats in accordance with the pressure of the reservoir, causing the inks to be supplied to the print head. At the time of releasing the nozzle from the valve seat, the valve seat is separated from the nozzle via the diaphragm of the backpressure adjuster, diaphragm piston, and lever.

Because a plurality of parts are between the diaphragm and the valve seat, the structure becomes complex, thus causing problems, such as the difficulty in making the structure compact and the probable loss in the power transmission.

The present invention addresses the above-described technical problems, and involves a liquid injecting apparatus constructed in such a way that liquid from a liquid retainer, secured, as separate from the carriage, is received on the carriage side by a valve unit having a self-sealing function. Accordingly, it is an object to provide a compact and low-cost liquid injecting apparatus that can improve the reliability of the liquid supply, a valve unit to be used therein, and a method of manufacturing the valve unit.

BRIEF SUMMARY OF THE INVENTION

According to one aspect of the present invention, a liquid injecting apparatus is provided to overcome the above-described problems. That liquid injecting apparatus is equipped with a liquid injecting head that is mounted on a carriage and is moved reciprocally in a widthwise direction of a target, and a valve unit that is mounted on the carriage to be supplied with liquid via a supply passage from a liquid retainer and to supply liquid to the liquid injecting head. The valve unit has a pressure chamber connected to the liquid retainer via the supply passage; a valve which opens or closes the supply passage to supply liquid to the pressure chamber; an urging member which urges the valve in a direction to close the supply passage; and a flexible film member which is displaced based on a negative pressure generated as liquid in the pressure chamber decreases and directly transmits the displacement to the valve to thereby cause the valve to operate against the urging force of the urging member.

According to another aspect of the present invention, a method of manufacturing a valve unit having a unit case, a pressure chamber, and a valve is provided. When liquid in the pressure chamber decreases, the valve uses the film member to detect the negative pressure originated from the decrease in liquid, thereby conducting liquid from the liquid retainer to the pressure chamber. The manufacturing method comprises heating the unit case; placing the film member on the unit case such that the film member covers the recess portion of the heated unit case; and heat welding the film member to the unit case, thereby forming the pressure chamber.

According to a further aspect of the present invention, there is provided another manufacturing method for a valve unit. The method comprises attaching a pressure-receiving plate to a first top surface of the film member; placing the film member on the unit case in such a way as to cover the recess portion of the unit case; and thermally depositing the film member on the unit case to form the pressure chamber.

According to another aspect of the present invention, an ink jet type recording apparatus is provided equipped with a recording head and an ink-supply valve unit. The recording head is mounted on a carriage and is moved reciprocally in a widthwise direction of recording paper. The ink-supply valve unit is mounted on the carriage and supplies the carriage with ink via an ink supply passage from an ink cartridge, to supply ink to the recording head. The ink-supply valve unit has a pressure chamber connected to the ink cartridge via the ink supply passage; a valve that opens or closes the ink supply passage to supply the ink to the pressure chamber; a drive body that operates the valve and that detects a negative pressure generated in the pressure chamber as the ink is consumed by the recording head; and a negative-pressure holding spring that abuts on the drive body and urges it in a direction to expand the volume of the pressure chamber.

According to another aspect of the present invention, a liquid injecting apparatus is provided that is equipped with a liquid storing member that stores liquid, a liquid injecting head that injects liquid, a liquid supply passage for supplying liquid to the liquid injecting head from the liquid storing member, and a valve unit that is provided on the liquid supply passage and that temporarily stores liquid. The valve unit has a supply chamber, into which flows liquid to be supplied from the liquid storing member; a pressure chamber, in which is stored liquid to be lead out to the liquid injecting head; and a valve that connects the supply chamber to the pressure chamber by a negative pressure generated in the pressure chamber as liquid is injected from the liquid injecting head. A liquid outlet, which is led out to the liquid injecting head, is provided in the pressure chamber at a position equal to or below 25% of a volume of the pressure chamber in a gravitational direction.

According to another aspect of the present invention, a liquid injecting apparatus is provided that is equipped with a liquid storing member, which stores liquid; a liquid injecting head, which injects liquid; a liquid supply passage, which supplies liquid to the liquid injecting head from the liquid storing member; a valve unit, which is provided on the liquid supply passage and temporarily stores liquid; and a passage valve, which is arranged in the liquid supply passage at upstream of the valve unit to open and close the liquid supply passage. The valve unit has a supply chamber, into which liquid to be supplied from the liquid storing member flows; a pressure chamber, in which liquid to be lead out to the liquid injecting head is stored; and a valve, which connects the supply chamber to the pressure chamber by a negative pressure generated in the pressure chamber as liquid is injected from the liquid injecting head. A liquid outlet, which is led out to the liquid injecting head, is provided in the pressure chamber at a position equal to or below 40% of a volume of the pressure chamber in a gravitational direction.

According to a further aspect of the present invention, a liquid injecting apparatus is provided comprising a carriage, which adheres liquid to a target by injecting liquid from a plurality of nozzles of a liquid injecting head while moving relative to the target; a liquid retainer, which is provided at a position apart from the carriage and which stores liquid to be supplied to the carriage; a flexible supply tube, which is located between the liquid retainer and the carriage and which forms a liquid passage extending from the liquid retainer to the carriage; and a valve mechanism mounted on the carriage and provided in a liquid passage extending to the liquid injecting head from the supply tube. The liquid retainer is arranged above the discharge port of the nozzle of the liquid injecting head by a predetermined height within a range over which the carriage moves.

According to another aspect of the present invention, a liquid injecting apparatus is provided that is equipped with a carriage provided with a liquid injecting head and a liquid retaining portion mounted on the carriage and retaining liquid to be supplied to the liquid injecting head. The liquid injecting apparatus injects liquid to a target from the liquid injecting head. A valve unit is provided between the liquid injecting head and the liquid retaining portion. The valve unit has a valve, which connects or disconnects a supply chamber defined on the liquid retaining portion side to or from a pressure chamber defined on the liquid injecting head side; an urging member, which urges the valve in a direction of closing the supply passage; and a drive body, which senses a negative pressure originated from a decrease in liquid in the pressure chamber and connects the supply chamber to the pressure chamber by means of the valve against urging force of the urging member.

BRIEF DESCRIPTION OF DRAWINGS

FIG. 31(*b*) is a cross-sectional view of a valve unit according to another modification.

FIG. 32(*b*) is a perspective view of a plate spring that is used in the valve unit in FIG. 32(*a*).

FIG. 41 is a diagram showing the relationship between the position of a liquid outlet and the density of the residual ink.

FIGS. 60(*a*) and 60(*b*) are cross-sectional views along the line 60-60 in FIG. 59(*a*), FIG. 60(*a*) shows a valve-closed state and FIG. 60(*b*) shows a valve-open state.

FIG. 61 is a partly enlarged cross-sectional view showing a support hole of the valve unit.

DETAILED DESCRIPTION OF THE PREFERRED EMBODIMENT

Figure 1:
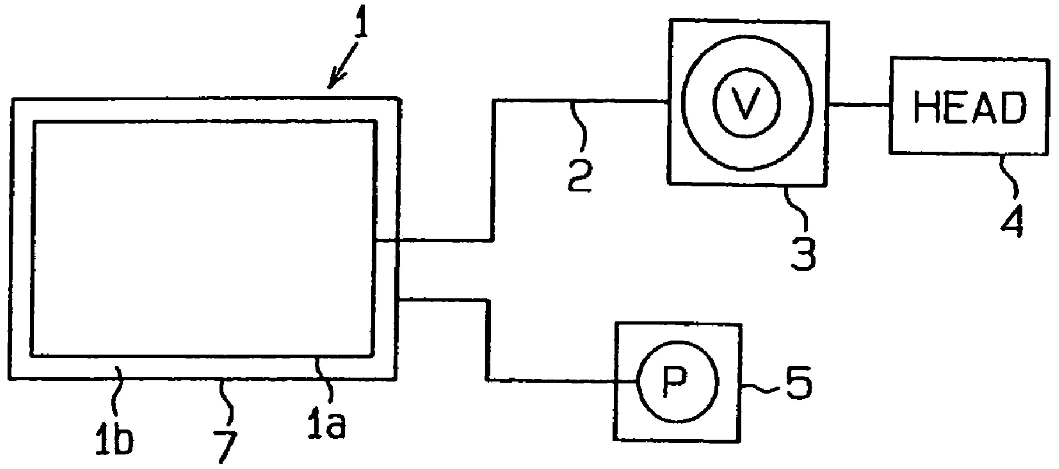
FIG. 1 is an exemplary diagram illustrating a first ink supply system that can be used suitably in working the invention.
Figure 2:
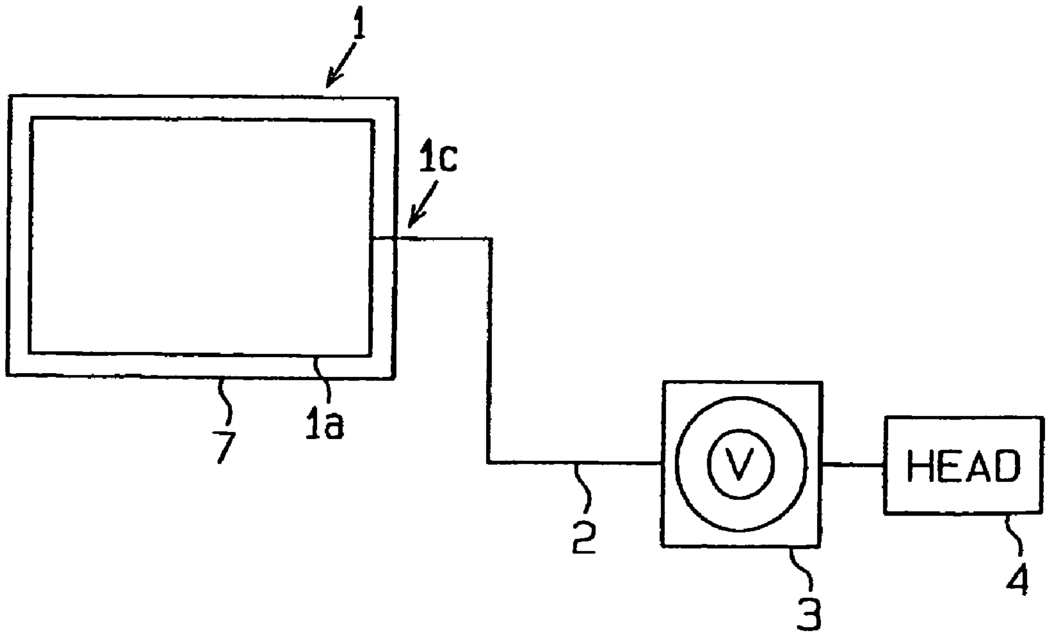
FIG. 2 is an exemplary diagram likewise illustrating a second ink supply system.

An ink jet type recording apparatus embodying a liquid injecting apparatus according to the first embodiment of the present invention will be described below with reference to the accompanying drawings. To begin with, FIGS. 1 and 2 illustrate the fundamental structures of ink supply systems of a recording apparatus as a liquid injecting apparatus, which can be used suitably in case of working this invention. As shown in FIGS. 1 and 2, an ink cartridge 1 as a liquid retainer is secured to the main body side of the recording apparatus, and is connected to a valve unit 3 mounted on a carriage to be discussed later via a flexible tube which constitutes an ink supply passage. The ink in the ink cartridge 1 is supplied to a recording head 4 mounted on the carriage via the valve unit 3.

The ink supply system shown in FIG. 1 is an air-pressurized supply type. That is, the ink cartridge 1 has an outer case 7 formed to be airtight, and an ink pack 1*a* of a flexible material, having ink sealed therein, is retained in the outer case 7. Then, pressurized air, which is produced by an air-pressurizing pump 5, is supplied to a space portion 1*b* formed between the outer case 7 and the ink pack 1*a*. Accordingly, the ink pack 1*a* receives pressurized air, and the ink sealed in the ink pack 1*a* is supplied to the valve unit 3 on the carriage via the tube 2. Then, the ink supplied to the valve unit 3 is fed to the recording head 4, from which the ink is discharged.

Meanwhile, the ink supply system shown in FIG. 2 is of the type that supplies ink from the ink cartridge 1 by a head difference. That is, an ink pack 1*a* of a flexible material having ink sealed therein is retained in the ink cartridge 1. A lead-out portion 1*c* of the ink cartridge 1 is arranged along a gravitational direction and above the valve unit 3. A positive pressure based on a head difference generated accordingly causes the ink in the ink pack 1*a* to be supplied to the valve unit 3 mounted on the carriage via the flexible tube 2.

Figure 3:
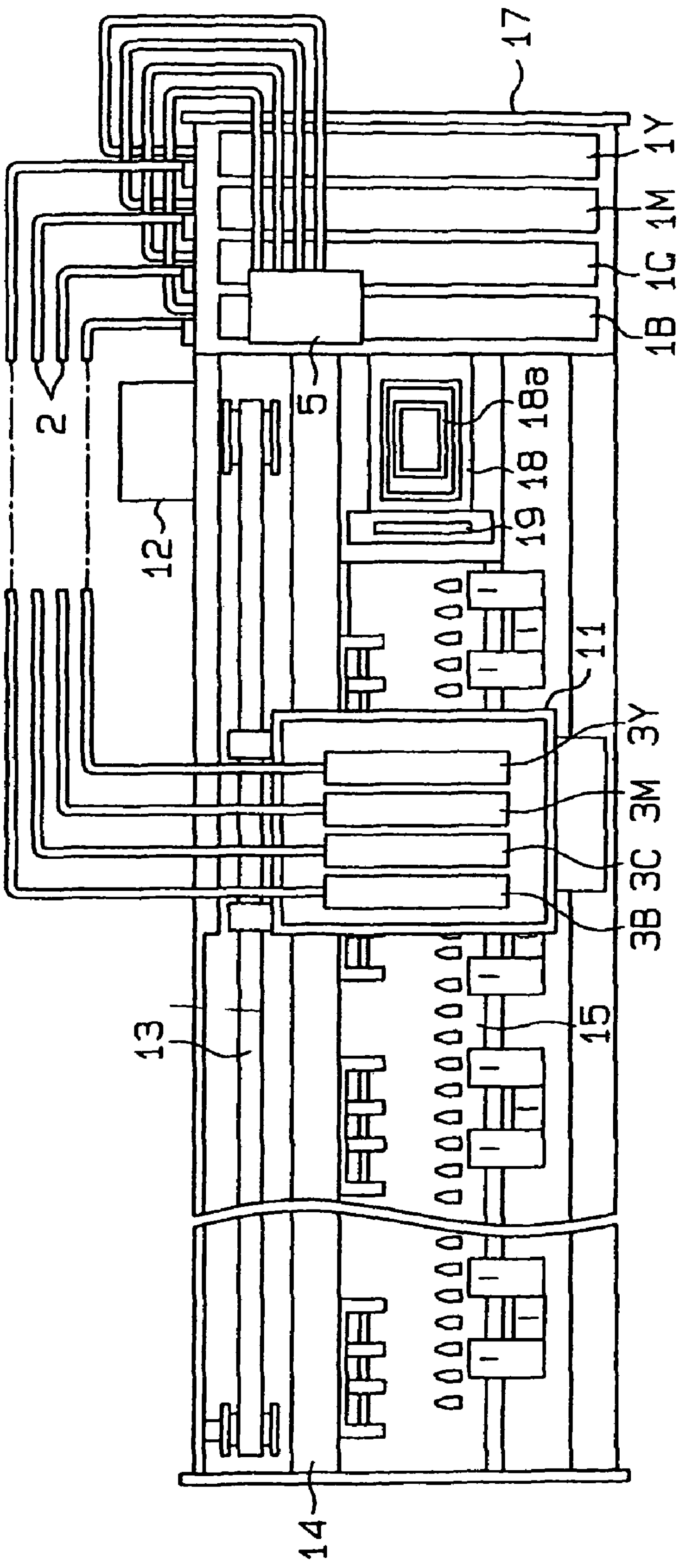
FIG. 3 is a plan view showing the general structure of a printer according to a first embodiment of the present invention in a case where the first ink supply system shown in FIG. 1 is employed.

The ink jet type recording apparatus according to the present invention can be used in either of the above-described ink supply systems. FIG. 3 shows the fundamental structure of an ink jet type recording apparatus that employs the ink supply system shown in FIG. 1. In FIG. 3, the carriage is indicated by reference numeral 11. This carriage is guided to a scan guide member 14 via a timing belt 13, which is driven by a carriage motor 12, and the carriage 11 is moved reciprocally in the lengthwise direction of a paper-feeding member 15, i.e., the main scan direction or the widthwise direction of recording paper. An ink jet type recording head 4 (see FIG. 4) is mounted on the side of the carriage 11 that faces the paper-feeding member 15, though not shown in FIG. 3.

Mounted on the carriage 11 are valve units 3B, 3C, 3M, and 3Y for supplying inks to the recording head 4. In the following description, each valve unit may be illustrated by simply using reference numeral 3. In this embodiment, four valve units 3B, 3C, 3M, and 3Y are provided in association with the respective inks (e.g., black ink B and individual color inks of cyan C, magenta M, and yellow Y) to temporarily store the respective inks inside.

The black ink and the individual color inks are supplied to the valve units 3B, 3C, 3M, and 3Y from ink cartridges 1B, 1C, 1M, and 1Y set in a cartridge holder 17 arranged on the main body side of the recording apparatus via respective flexible tubes 2, which constitute the ink supply passages. In the following description, each ink cartridge may be illustrated by simply using reference numeral 1.

Capping means 18, which can seal the nozzle-forming surface of the recording head 4, is located in a non-print area (home position) on the moving passage of the carriage 11. Arranged on the capping means 18 is a cap member 18*a* formed of an elastic material, such as rubber, which comes in close contact with the nozzle-forming surface of the recording head 4 to be able to seal the nozzle-forming surface. When the carriage 11 moves to the home position, the capping means 18 moves (rises) toward the recording head 4, so that the nozzle-forming surface of the recording head 4 is sealed by the cap member 18*a*.

The cap member 18*a* seals the nozzle-forming surface of the recording head 4 while the recording apparatus is at rest and prevents the nozzle opening from being dried. Connected to the bottom portion of the cap member 18*a* is one end of a tube of a suction pump (tube pump) for performing a cleaning operation. At the time of the cleaning operation, a negative pressure produced by the suction pump is caused to act on the recording head 4 to suck and discharge ink from the recording head 4.

A wiping member 19 of an elastic material, such as rubber, formed into a rectangular slice, is arranged adjacent to the capping means 18 on the print area side of the capping means 18, and moves to the moving passage of the recording head 4, as needed, to wipe the nozzle-forming surface clean. Reference numeral 5 indicates an air-pressurizing pump, and with that attached to the cartridge holder 17, the air pressurized by the air-pressurizing pump 5 is led into the outer case 7 in each ink cartridge 1B, 1C, 1M, and 1Y. Then, the positive pressure of the pump 5 causes the ink from each ink cartridge 1B. 1C, 1M, and 1Y to be supplied to each of the valve units 3B, 3C, 3M, and 3Y on the carriage 11 via each tube 2.

Figure 4:
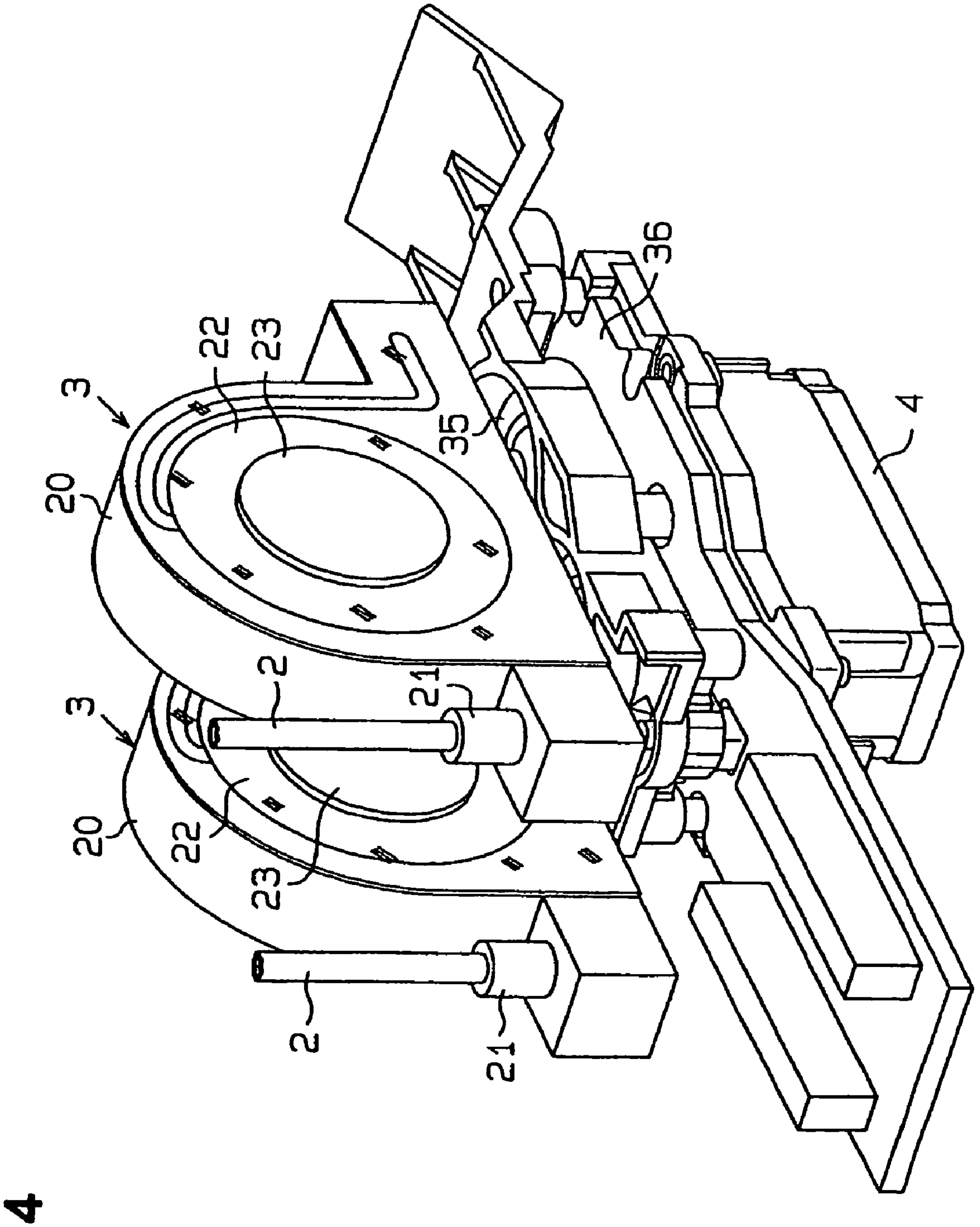
FIG. 4 is a perspective view showing a valve unit and a recording head from the left side of the valve unit.
Figure 5:
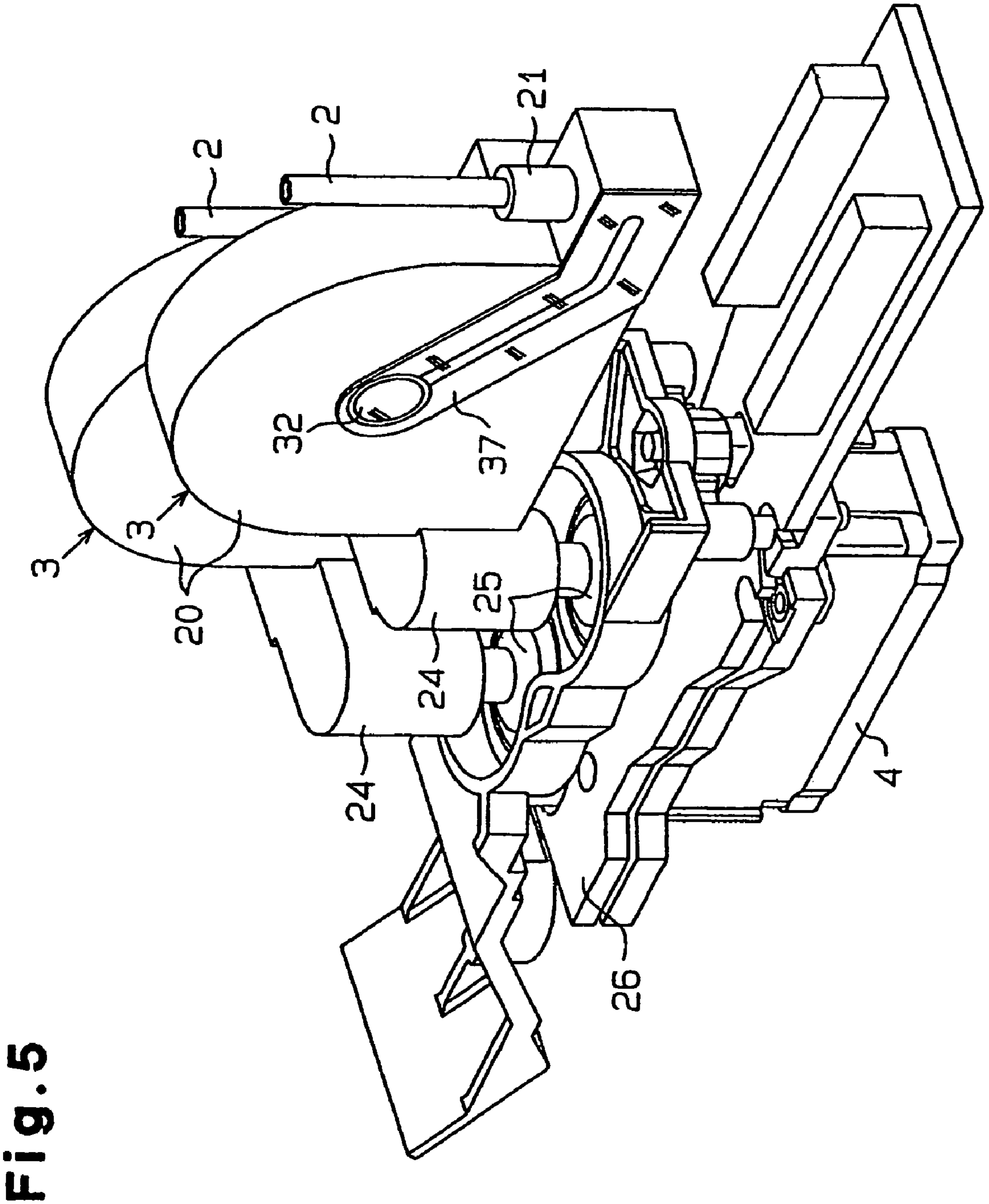
FIG. 5 is a perspective view as seen from the right side of the valve unit.

FIGS. 4 and 5 show the structures of the aforementioned valve unit 3 and the recording head 4 that receives the ink from the valve unit 3. Although FIGS. 4 and 5 illustrate the state where two valve units 3 are mounted on the top portion of the recording head 4 for the sake of descriptive convenience, there may be a case where a plurality of valve units 3 are further mounted in association with the ink colors spurted from a single recording head 4. Further, a plurality of sets may be prepared, each having two valve units 3 with respect to a single recording head 4, as shown in FIGS. 4 and 5.

As shown in FIGS. 4 and 5, the outline of the valve unit 3 is constituted by a unit case 20 of a synthetic resin formed in a flat shape, and a connection portion 21 is formed at one end. The tube 2 is connected to the connection portion 21. The ink supplied from each ink cartridge 1 is led into the valve unit 3 via the connection portion 21. As shown in FIG. 4, a flexible film member 22 is adhered to one side of the valve unit 3 by thermal deposition and constitutes a part of a pressure chamber 34, to be discussed later.

It is important that the film member 22 be soft so that it can efficiently sense the negative pressure state, does not chemically influence the ink properties, and is of a material with low water transmittance and low oxygen and nitrogen transmittance. It is therefore desirable that the film member 22 should be able to adhere and laminate a nylon film coated with vinylidene chloride (saran) on a high-density polyethylene film or polypropylene film.

Further, a pressure-receiving plate 23 formed of a hard material, as compared with the film member 22, is attached to the center portion of the film member. This pressure-receiving plate 23 should be light so that, when the carriage moves due to the printing operation or the like, the dead weight of the pressure-receiving plate 23 and the acceleration of the carriage do not move the film member 22 to otherwise change the pressure in the pressure chamber 34. Thus, the pressure-receiving plate 23 should desirably be formed of a plastic material, such as polyethylene or polypropylene.

The pressure-receiving plate 23 may be attached to the film member 22 by thermal deposition before the film member is attached to the unit case 20, or the pressure-receiving plate 23 may be attached to the film member 22 by an adhesive or by a double-faced adhesive tape or the like after the film member 22 is attached to the unit case 20. Although this pressure-receiving plate 23 is formed like a disk in the embodiment illustrated in the drawings, it is not particularly limited to a disk shape. In a case where the pressure chamber 34 to be formed inside the valve unit 3 forms a thin cylindrical space as will be discussed later, however, it is desirable to use a disk-like pressure-receiving plate 23 and arrange the pressure-receiving plate 23 concentrically with respect to the pressure chamber 34.

As shown in FIG. 5, an ink lead-out portion 24 is formed in the valve unit 3 and a ring-like connection member 25 is between the ink lead-out portion 24 and a head support 26 of the recording head 4. Then, the inks are supplied to the recording head 4 from the valve units 3 via the connection members 25, respectively.

Figure 7:
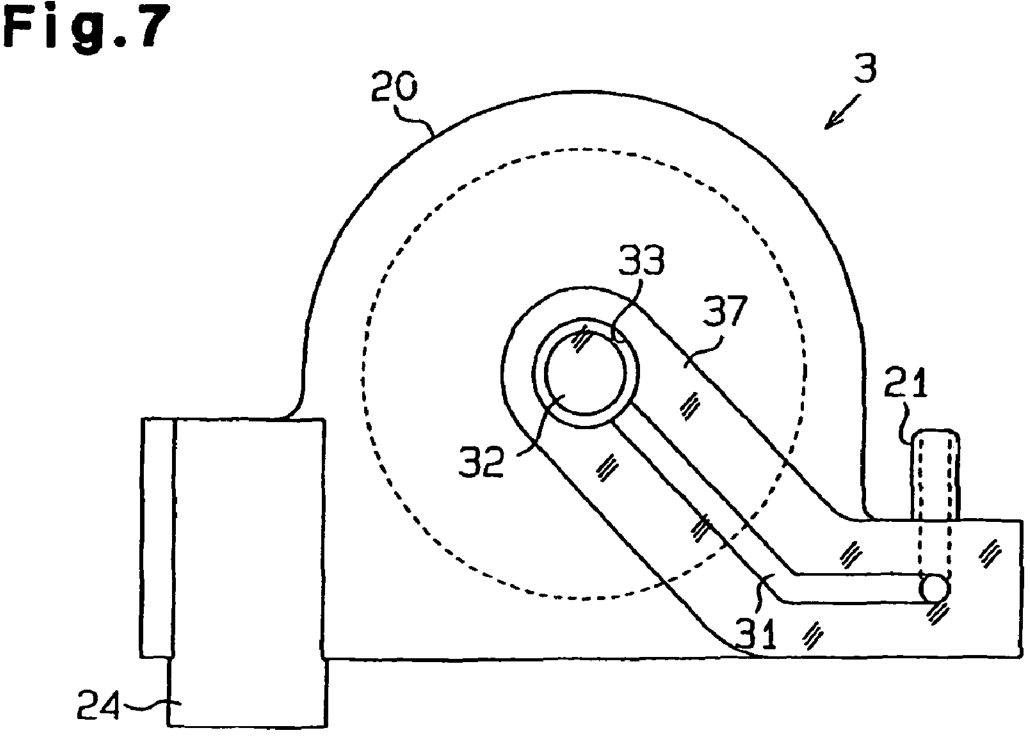
FIG. 7 is a right side view of the valve unit.

A groove-like ink lead-in passage 31 is formed in the unit case 20 that constitutes the outline of the valve unit 3 as shown in FIG. 7. The ink that is supplied from the connection portion 21 via the tube 2 is supplied to an ink supply chamber 32, formed nearly in the center of the unit case 20, via the ink lead-in passage 31.

Figure 8B:
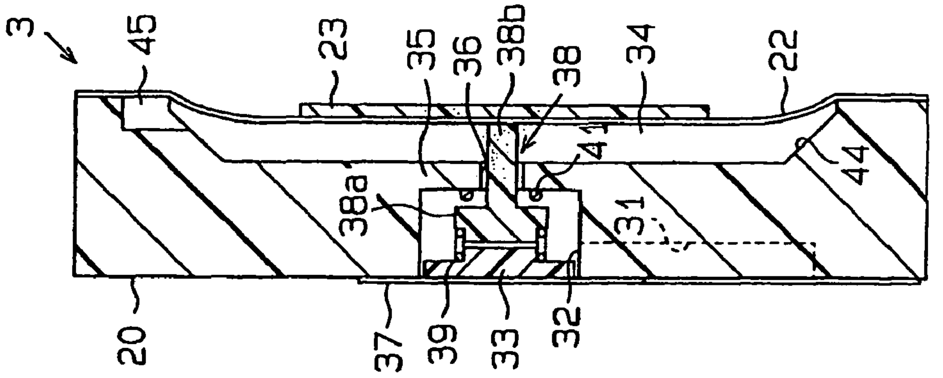
FIGS. 8(*a*) and 8(*b*) are cross-sectional views along the line 8-8 in FIG. 6, FIG. 8(*a*) shows a valve-closed state and FIG. 8(*b*) shows a valve-open state.
Figure 8A:
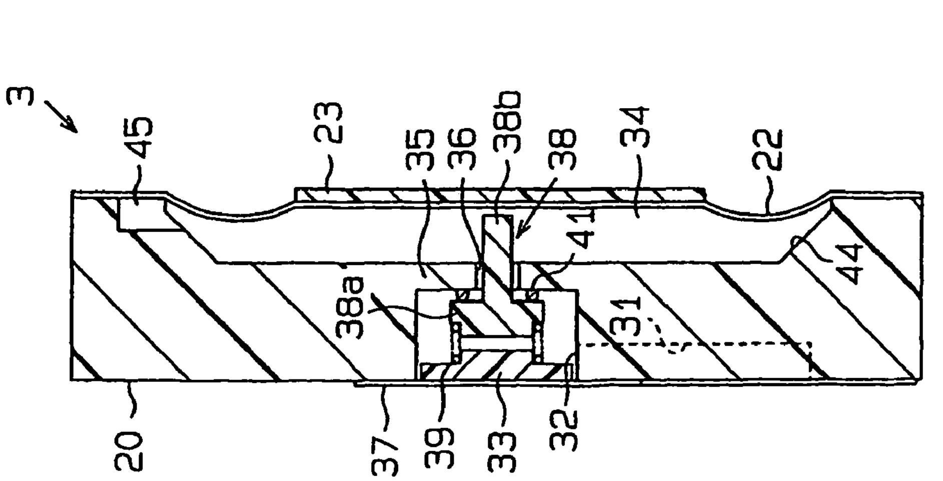
Figure 10A:
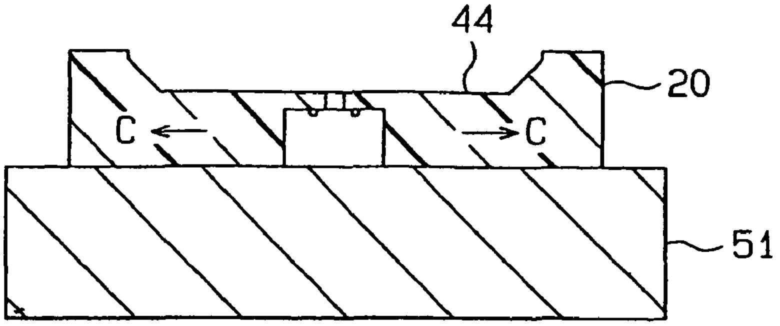
FIGS. 10(*a*) to 10(*d*) are first preferable fabrication step diagrams in a case where a flexible film member is thermally deposited to a unit case, FIG. 10(*a*) shows a state where the unit case is thermally expanded, FIG. 10(*b*) shows a state where the film member is placed, FIG. 10(*c*) shows a state where the film member is thermally deposited, and FIG. 10(*d*) shows a state where the film member and the unit case are cooled.
Figure 10B:
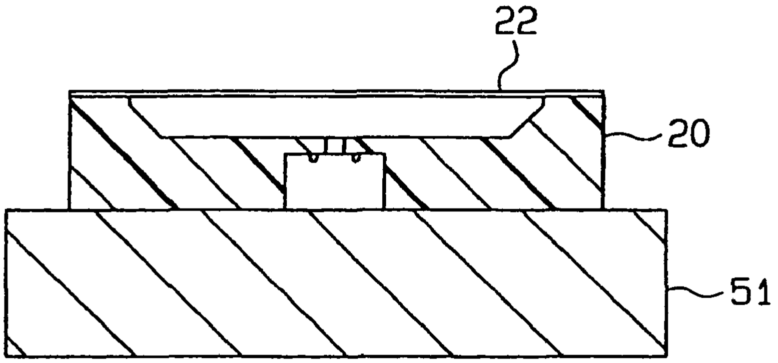
Figure 10C:
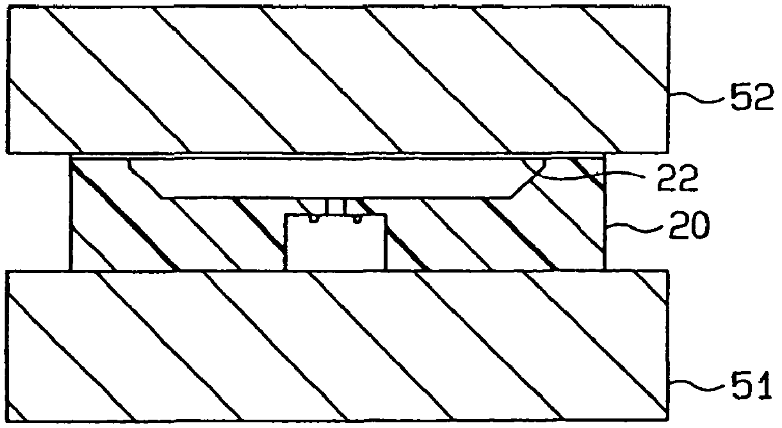
Figure 10D:
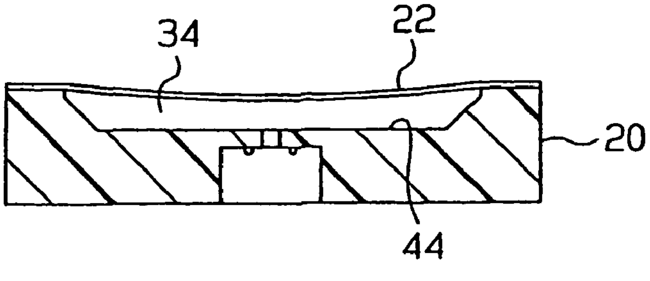

This ink supply chamber 32 is constructed by a small-capacity cylindrical space as shown in FIG. 8, and a spring seat 33 is fitted in the ink supply chamber 32 at the side of the unit case 20. Then, with the spring seat 33 fitted, a film member 37 is thermally deposited with respect to the unit case 20 in such a way as to cover the ink supply chamber 32 and the ink lead-in passage 31, thereby sealing the ink supply chamber 32 and the ink lead-in passage 31.

A partition 35 is formed between the ink supply chamber 32 and the pressure chamber 34 in such a way as to define both, and a support hole 36 for slidably supporting a movable valve 38, which constitutes an open/close valve, is formed in this partition 35. The movable valve 38 comprises a plate-like member 38*a* and a rod member 38*b*, which is formed integrally in the center portion of the plate-like member 38*a* and slides in the support hole 36.

Further, a coil-shaped seal spring 39, as an urging member, is located between the plate-like member 38*a* and the spring seat 33, and the action of the seal spring 39 urges the plate-like member 38*a*, with slight pressing force, toward the partition 35, i.e., in the direction of closing an ink supply hole 42.

A rubber seal member 41 formed like a ring is attached to the partition 35 by thermal deposition or the like in such a way as to surround the support hole 36. Therefore, the plate-like member 38*a* of the movable valve 38 abuts on the seal member 41 by the urging force of the seal spring 39. The seal member 41 may be an O-ring or the like, but elastomer resin or the like may be formed integral with the unit case 20 by dichroic formation to be used as the seal member.

Figure 9:
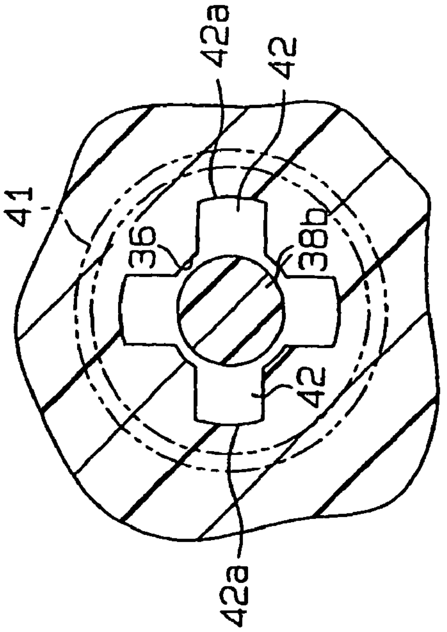
FIG. 9 is a partly cross-sectional view showing the structure of a support hole formed in the partition of the valve unit.

A plurality of cutaway holes 42*a* are intermittently formed around the support hole 36 of the partition 35, as shown in the enlargement in FIG. 9, and those cutaway holes 42*a* constitute the ink supply hole 42 extending from the ink supply chamber 32 to the pressure chamber 34. In the embodiment shown in FIG. 9, four cutaway holes 42*a* are formed around the support hole 36. The seal member 41 is provided on the partition 35 in such a way as to surround the outside of the ink supply hole 42.

The pressure chamber 34 of the unit case 20 is constituted by a recess portion 44, which has a cylindrical shape cut away from the unit case 20. The film member 22 is tightly attached by thermal deposition means to that side of the unit case 20 where the recess portion 44 is formed. That is, the pressure chamber 34 is constructed by the recess portion 44 formed in the unit case 20 and the film member 22 covering it.

Figure 6:
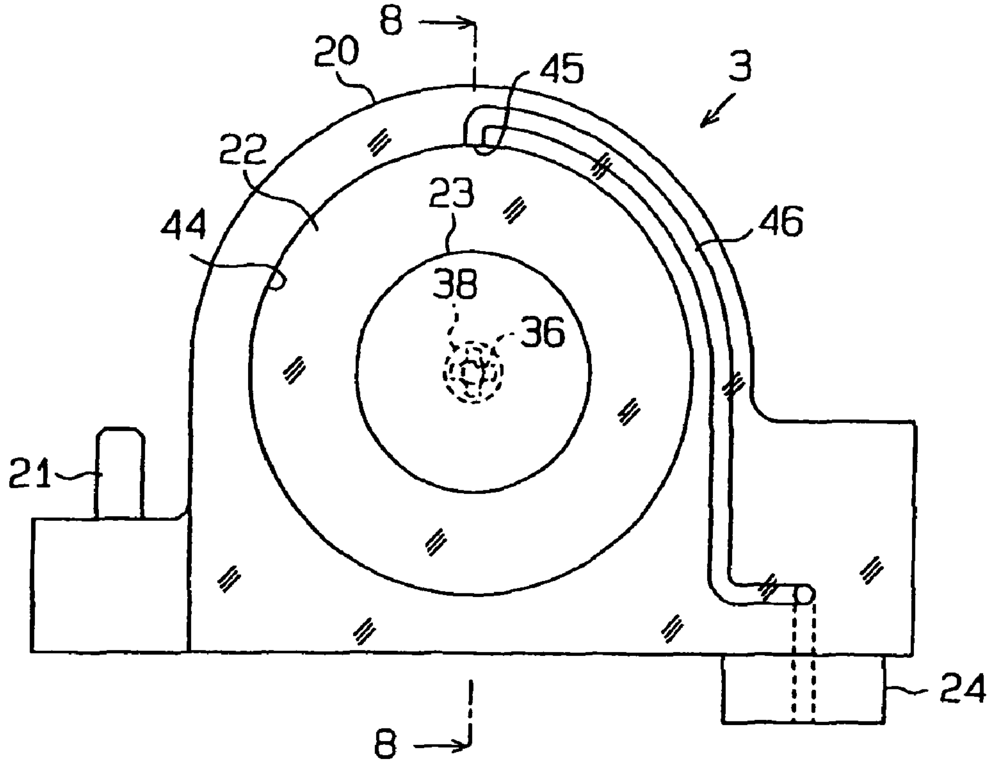
FIG. 6 is a left side view of the valve unit.

An outlet 45 of the pressure chamber 34 is formed in the topmost portion in the gravitational direction as shown in FIG. 6. An ink lead-out passage 46, which connects to the outlet 45 of the pressure chamber, is formed in an arc shape along the recess portion 44. The outlet 45 of the pressure chamber 34 and the ink lead-out passage 46 are constituted by groove portions formed in the unit case 20 in association with them and the film member 22, which covers those groove portions. The ink lead-out passage 46 penetrates through the unit case 20 in the proximity of the ink lead-out portion 24 and is connected to the ink lead-out portion 24. The ink is lead out vertically at the ink lead-out portion 24 and is supplied to the recording head 4, as mentioned earlier.

In the above-described structure, the ink is supplied to the valve unit 3 by a positive pressure by using the ink supply system shown in FIG. 1 or FIG. 2. The supply flow rate of the ink in this case has only to be set to a level that copes with the amount of ink the recording head 4 consumes in the printing operation. When the aforementioned cleaning operation is executed, as the nozzle-forming surface of the recording head 4 is sucked by using the capping means 18, the flow rate of the ink to be supplied to the valve unit 3 increases.

In the non-print state of the recording head 4, i.e., in the state where the ink is not consumed, a spring load W1 (not shown) by the seal spring 39 in the valve unit 3 is applied to the plate-like member 38*a* of the movable valve 38 and pressure P1 (not shown) of the ink to be supplied to the ink supply chamber 32 is also applied to the plate-like member 38*a*. Accordingly, the plate-like member 38*a* abuts on the seal member 41 as shown in FIG. 8(*a*), rendering the movable valve 38 in a valve-closed state. That is, the valve unit 3 is in a self-sealing state.

On the other hand, in the print state of recording head 4, where ink is consumed, the film member 22 is displaced toward the recess portion 44 of the unit case 20 in accordance with a decrease in the ink in the pressure chamber 34 so that the center portion of the film member 22 abuts on the end portion of the rod member 38*b* of the movable valve 38. Wd (not shown) represents displacement reaction force with respect to the displacement of the film member 22 at that time. As the ink is further consumed by the recording head 4, a negative pressure P2 (not shown) is generated in the pressure chamber 34. In a case where the negative pressure P2 becomes greater than the sum of the spring load W1, the ink's pressure P and the displacement reaction force Wd of the film member 22, i.e., in a case where the relationship of P2>W1+P1+Wd is met, the film member 22 pushes the rod member 38*b*, releasing the abutment of the plate-like member 38*a* to the seal member 41 so that the movable valve 38 becomes a valve-open state as shown in FIG. 8(*b*).

Therefore, the ink in the ink supply chamber 32 is supplied into the pressure chamber 34 via the ink supply hole 42, canceling the negative pressure in the pressure chamber 34. Accordingly, the movable valve 38 moves and is switched to the valve-closed state again as shown in FIG. 8(*a*), stopping the supply of the ink to the pressure chamber 34 from the ink supply chamber 32.

The movable valve 38 is not frequently switched between the states shown in FIG. 8(*a*) and FIG. 8(*b*), and the film member 22 keeps the balanced state of abutting on the end portion of the rod member 38*b* of the movable valve 38 during the printing operation, while as the ink is consumed, it works on the pressure chamber 34 in such a way as to successively supplement the ink by opening the valve slightly.

The pressure-receiving plate 23 can receive the displacement action of the film member 22 on its entire surface. Therefore, the displacement action of the film member 22 can be transmitted surely to the movable valve 38, so that the reliability of the operation of the movable valve 38 can be improved. In the above-described embodiment, because the outlet 45 of the pressure chamber 34 is formed at its topmost portion along the gravitational direction, the pressure chamber 34 can be filled with the ink without leaving air (bubbles) at the time of, for example, the initial filling to feed the ink to the recording apparatus.

In other words, in a case where air is present in the pressure chamber 34, the volume of bubbles changes due to a change in environmental temperature, raising a problem that the inner pressure of the pressure chamber 34 changes based on the change, so that the proper valve operation cannot be expected. Therefore, the formation of the outlet 45 of the pressure chamber 34 at its topmost portion along the gravitational direction is an important factor in this type of ink-supply valve unit.

According to the first embodiment, the ink supply system from the ink cartridge 1 to the recording head 4 is constituted by a closed passage into which the ink can be filled. With this structure, therefore, slight bubbles or the like which remain in the ink supply system can be absorbed by the ink by using deaerating ink. It is therefore possible to overcome reduction in the reliability of the valve open/close operation that occurs based on a change in environmental temperature originated from the presence of bubbles and to significantly reduce the degree of occurrence of poor printing or so-called dot falling which is originated from the bubbles remaining in the ink supply system.

Next, FIGS. 10(*a*) to 10(*d*) show a preferable fabrication process in the manufacturing method for the valve unit 3, particularly, in a case where the flexible film member 22, which constitutes part of the pressure chamber 34 of the valve unit 3, is thermally deposited to the unit case 20. To reduce a variation in detection of a negative pressure and make the pressure chamber 34 compact, it is important that the film member 22 is thermally deposited to the unit case 20 with the adequate flexibility.

According to the fabrication process shown in FIGS. 10(*a*) to 10(*d*), as the unit case 20 is expanded by heating and the film member 22 is thermally deposited to the unit case 20 in that state, the film member 22 is rendered in a state with the adequate flexibility in the usage at normal temperature.

That is, as shown in FIG. 10(*a*), first, the unit case 20 is placed on a heater block 51 for heating with the recess portion 44 constituting the pressure chamber 34 being the top surface. Accordingly, the unit case 20 is heated by the heater block 51 and is thermally expanded in the direction of an arrow C shown in FIG. 10(*a*), i.e, toward both outer sides. Subsequently, the film member 22 is placed in such a way as to cover the recess portion 44 of the heated unit case 20 as shown in FIG. 10(*b*).

Next, as shown in FIG. 10(*c*), a heater block 52 for thermal deposition is moved down from above the film member 22 to apply the proper pressure, thereby thermally depositing the film member 22 to the unit case 20. Then, as shown in FIG. 10(*d*), the unit case 20 is removed from the individual heater blocks 51 and 52 and is naturally cooled down to the normal temperature, so that the thermal expansion of the unit case 20 is absorbed and it contracts slightly. This can provide the unit case to which the film member 22 is thermally deposited with the adequate flexibility.

Figure 11:
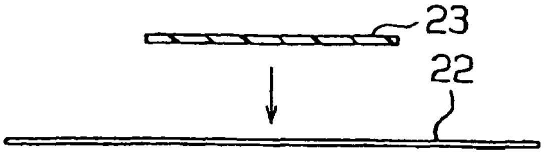
FIGS. 11(*a*) to 11(*c*) are second preferable fabrication step diagrams, FIG. 11(*a*) shows a state where a pressure-receiving plate is bonded to the film member, FIG. 11(*b*) shows a state where the film member to which the pressure-receiving plate is bonded is placed on the unit case, and FIG. 11(*c*) shows a state where the film member is thermally deposited.
Figure 11:
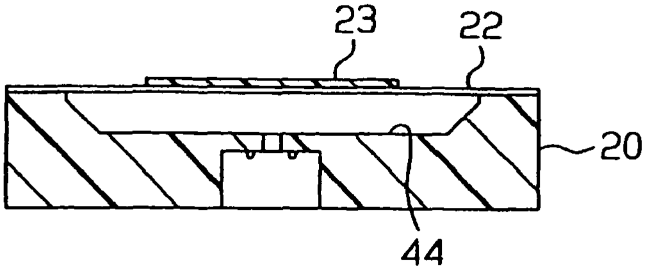
Figure 11:
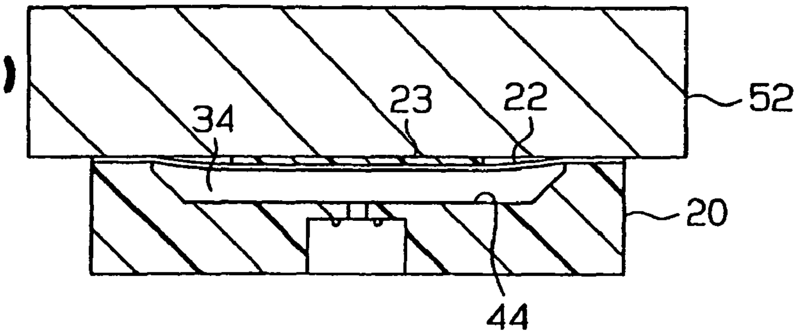

Next, FIGS. 11(*a*) to 11(*c*) show another preferable fabrication process in case of thermally depositing the flexible film member 22 to the unit case 20. In the fabrication process shown in FIGS. 11(*a*) to 11(*c*), the film member 22 can be thermally deposited to the unit case 20 while the film member 22 is bent adequately by using the thickness of the pressure-receiving plate attached to the film member 22.

That is, as shown in FIG. 11(*a*), first, the pressure-receiving plate 23 is attached to one side of the film member 22. In this case, while the pressure-receiving plate 23 may be attached to the film member 22 by an adhesive or by a double-faced adhesive tape or the like, it is preferable to attach the film member 22 to the pressure-receiving plate 23 by thermal deposition.

The film member 22 to which the pressure-receiving plate 23 is attached is placed with the pressure-receiving plate 23 being the top with respect to the unit case 20, which is placed with the recess portion 44 being the top surface. In this situation, the heater block 52 for thermal deposition is moved down from above the film member 22, as shown in FIG. 11(*c*), to apply the proper pressure, thereby thermally depositing the film member 22 to the unit case 20.

In this case, as the bottom surface of the heater block 52 shown in FIG. 11(*c*) is formed by a single flat surface, the center portion of the film member 22 with the pressure-receiving plate 23 attached thereto is pressed into the recess portion 44 side in association with the thickness of the pressure-receiving plate 23 in the process of thermal deposition. In this state, the peripheral portion of the film member 22 is thermally deposited to the unit case 20 by the heater block 52. This can provide the unit case 20, to which the film member 22 is thermally deposited, with the adequate flexibility.

Next, the movable valve 38 shown in FIG. 8 and the seal spring 39 are inserted in the ink supply chamber 32 of the unit case 20 to which the film member 22 is thermally deposited, the spring seat 33 is fitted in the end face of the ink supply chamber 32, and the ink supply chamber 32 and the ink lead-in passage 31 are sealed by the film member 37, thus yielding the valve unit 3.

Figure 12:
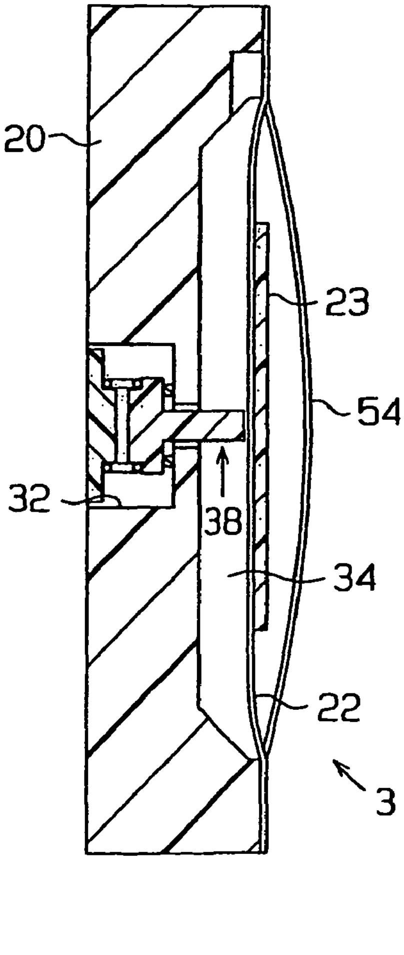
FIG. 12 is a cross-sectional view showing another preferable ink-supply valve unit.

FIG. 12 shows another preferable mode of the valve unit 3. Note that the basic structure of the valve unit 3 shown in FIG. 12 is also shown in FIG. 8 that has already been discussed, and its main essential portions are indicated by the same numerals. In the valve unit 3 shown in FIG. 12, the outer surface of the film member 22 thermally deposited to the unit case 20 is further covered with a non-water-transmittive film member 54.

That is, a soft material is used for the film member 22 that constitutes a part of the pressure chamber 34 so that the negative pressure state can be sensed efficiently, and the soft material does not chemically influence the ink property. Therefore, high-density polyethylene or polypropylene can be suitably used for the film member 22, as mentioned earlier. Because the material has a slight water transmittance, however, there is a technical problem such that moisture evaporated from the ink in the pressure chamber 34 is scattered outside from the pressure chamber 34.

Thus, the degree of scattering of moisture evaporated from the ink in the pressure chamber 34 outside the pressure chamber 34 is reduced by further coating the outer surface of the film member 22 with the non-water-transmittive film member 54 as shown in FIG. 12. An aluminum foil or high polymer film with aluminum vapor deposited thereon can be used as the non-water-transmittive film member 54.

Figure 13B:
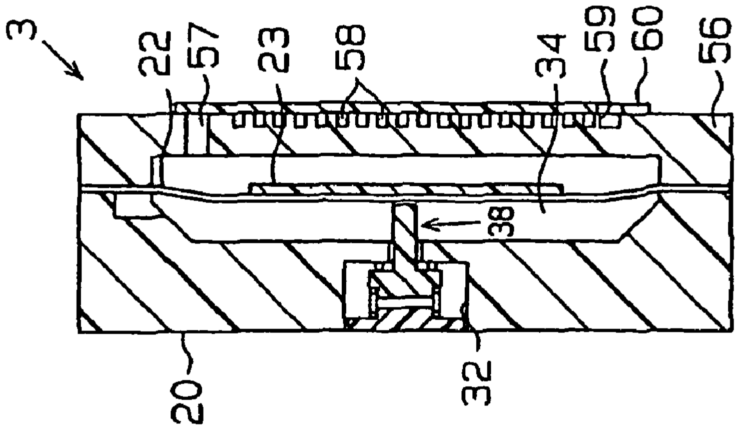
FIGS. 13(*a*) and 13(*b*) are diagrams showing a further preferable ink-supply valve unit, FIG. 13(*a*) is its front view and FIG. 13(*b*) is a cross-sectional view along the line **13*b*-13*b* in FIG. 13**(*a*).
Figure 13A:
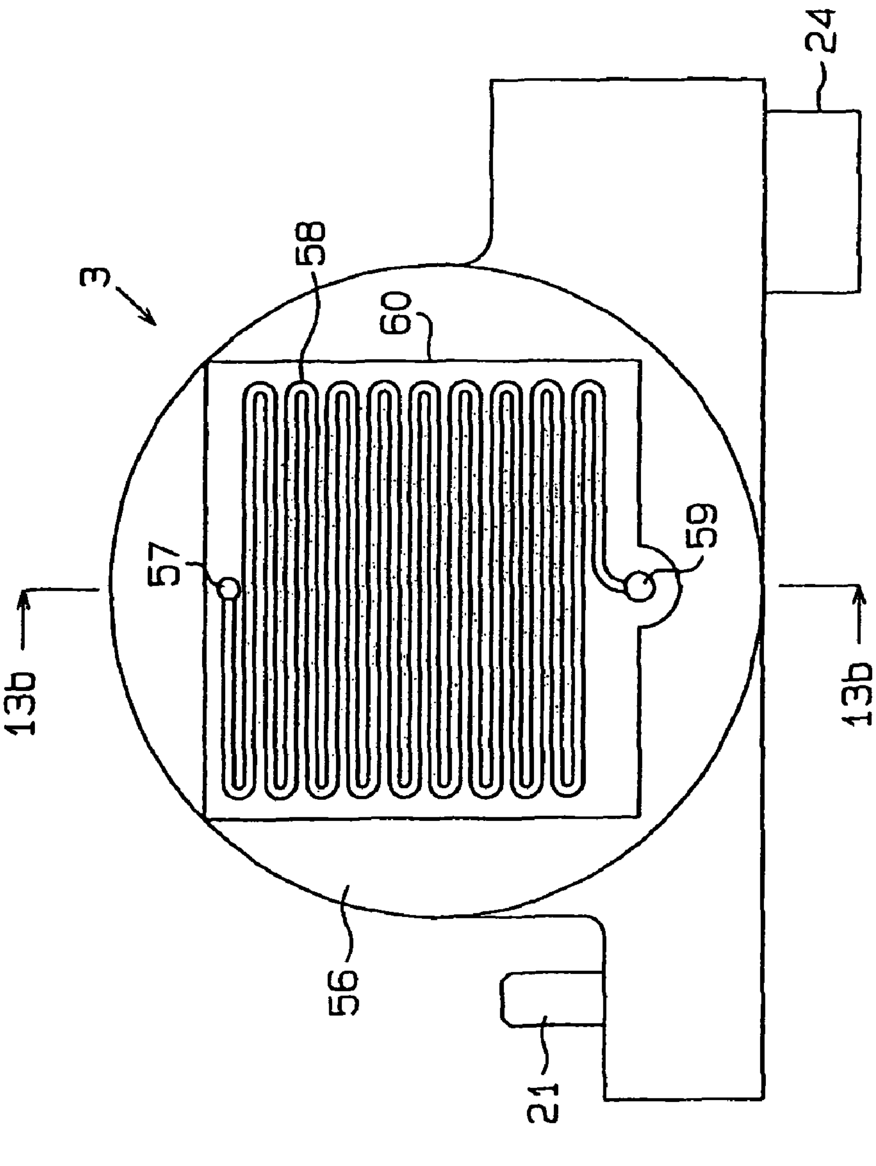

For the same purpose, the valve unit 3 shown in FIGS. 13(*a*) and 13(*b*) can be employed suitably. It is to be noted that the basic structure of the valve unit 3 shown in FIGS. 13(*a*) and 13(*b*) is illustrated in FIGS. 6 to 8 that have already been discussed, and its main essential portions are indicated by the same numerals.

That is, in the mode shown in FIG. 13, the mode shown in FIGS. 6 to 8 is provided with a lid 56, which seals the outer surface of the film member 22. A through hole 57 is formed in a part of the lid 56, and a single zigzagging groove portion 58, which communicates with this through hole 57, is formed on the surface of the lid 56. The end portion of the groove portion 58 is connected to a bottomed hole 59 formed in the lid 56. The through hole 57, the groove portion 58, and the hole 59 are covered with a single film member 60. In this case, the film member 60 is preferably adhered to the lid 56 by thermal deposition means. Then, an air release port is formed by breaking the film member 60 covering the hole 59 with a sharp tool or the like.

Therefore, the film member 22, which constitutes a part of the pressure chamber 34 in the valve unit 3, is covered with the lid 56 in an airtight state and is connected to the air release port (indicated by the same reference numeral 59 as that of the bottomed hole) via the air flow passage (indicated by the same reference numeral 58 as that of the groove portion) that is formed by covering the through hole 57 and groove portion 58, formed in the lid 56, with the film member 60.

With this structure, as the inside of the lid 56 is such that the pressure chamber 34 is open to the air via the through hole 57, air flow passage 58 of the lid 56, and the air release port 59, the pressure inside the lid 56 is kept constant, and no problem would arise. Scattering of moisture via the film member 22, which constitutes a part of the pressure chamber 34, goes through the long air flow passage 58, and is thus suppressed effectively.

The liquid injecting apparatus that embodies second embodiment of the present invention will now be described referring to FIGS. 14 to 22. Because this embodiment differs only in the structure of the valve unit 3 of the first embodiment, the same reference numerals will be given to those portions of the embodiment that are similar to those of the above-described embodiment and their detailed description will be omitted.

In the valve unit 3 of the second embodiment, as shown in FIGS. 14 to 17, the connection portion 21 for connecting the tube 2 is formed on the top portion of its unit case 20, and the ink lead-out portion 24 is formed at the bottom portion of the unit case 20. Formed on the first side surface of the unit case 20 are a filter-chamber recess portion 61, a center recess portion 62, a first groove portion 63 that communicates with the center recess portion 62, and a second groove portion 64 located apart from them. The film member 37 is thermally deposited to the first side surface of the unit case 20 in such a way as to cover the filter-chamber recess portion 61, the center recess portion 62, and the first and second groove portions 63, 64. Therefore, the filter-chamber recess portion 61 becomes a filter-retaining chamber 66, the first groove portion 63 becomes an ink lead-in passage 31, and the second groove portion 64 becomes an ink lead-out portion 46.

Figure 18:
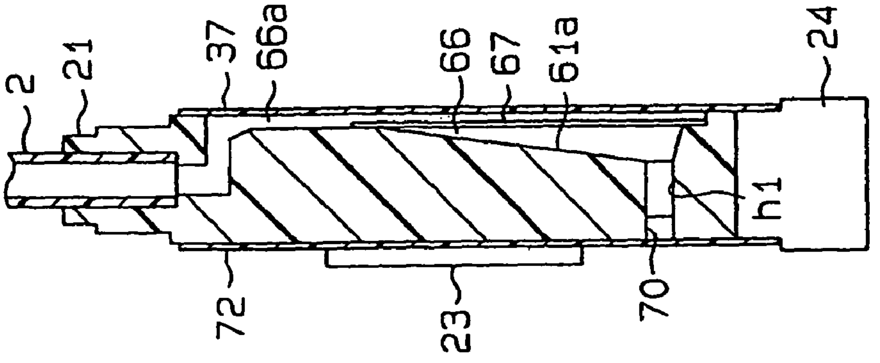
FIG. 18 is a cross-sectional view along the line 18-18 in FIG. 17.

As shown in FIG. 18, formed at the lower portion of the filter-chamber recess portion 61 are a through hole h1, and an inclined portion 61*a* with an inclined surface whose depth from the first side surface increases toward the through hole h1. A filter member 67 is secured to the lower portion of the filter-chamber recess portion 61 along the gravitational direction by thermal deposition in such a way as to cover the inclined portion 61*a*. Therefore, a bubble remaining portion 66*a* where bubbles remain is formed above the filter member 67 in the filter-retaining chamber 66. The filter member 67 is formed of twill-woven stainless steel or unwoven fabrics or the like.

Figure 14:
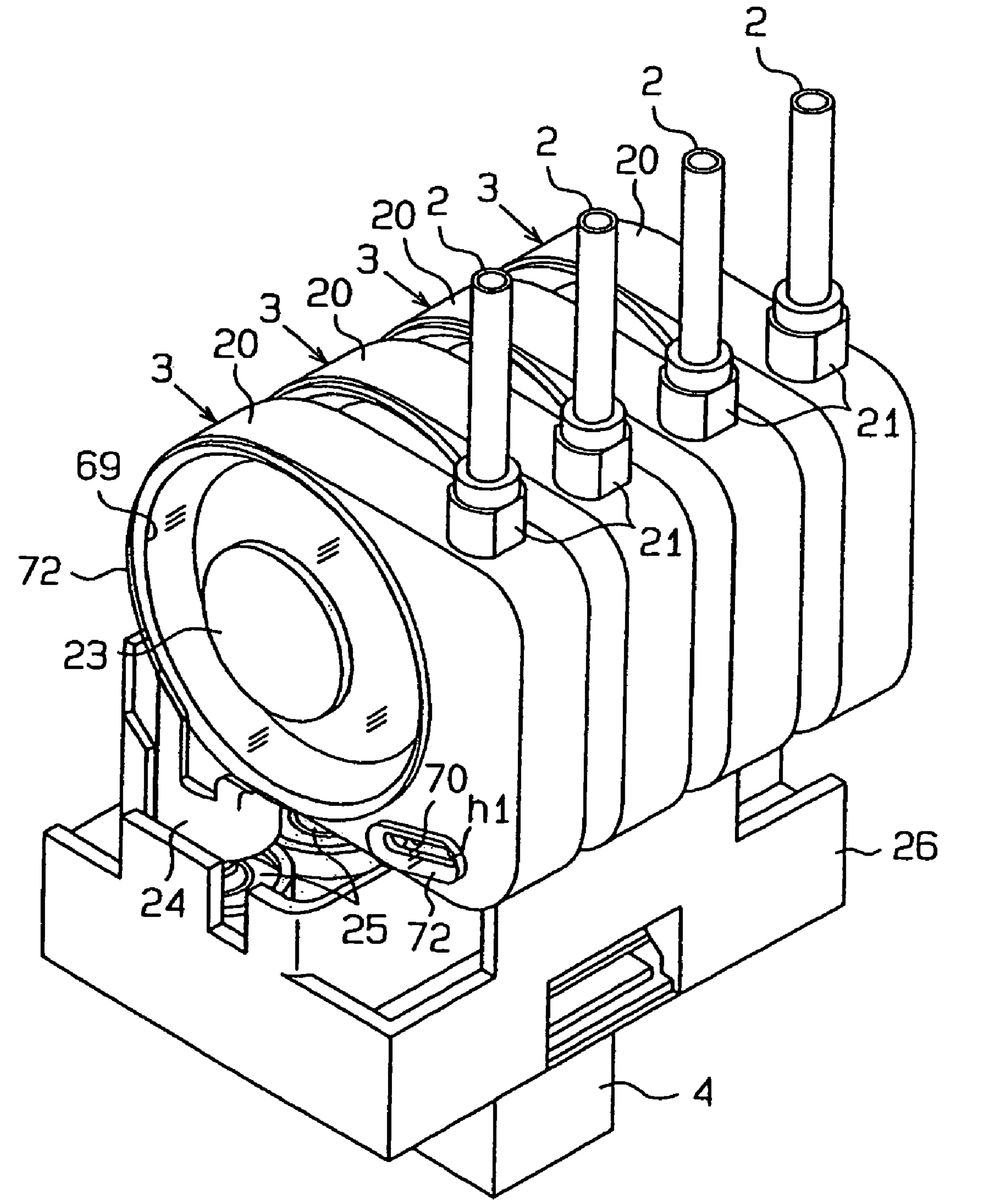
FIG. 14 is a perspective view showing a valve unit according to a second embodiment of the invention from the right side.
Figure 15:
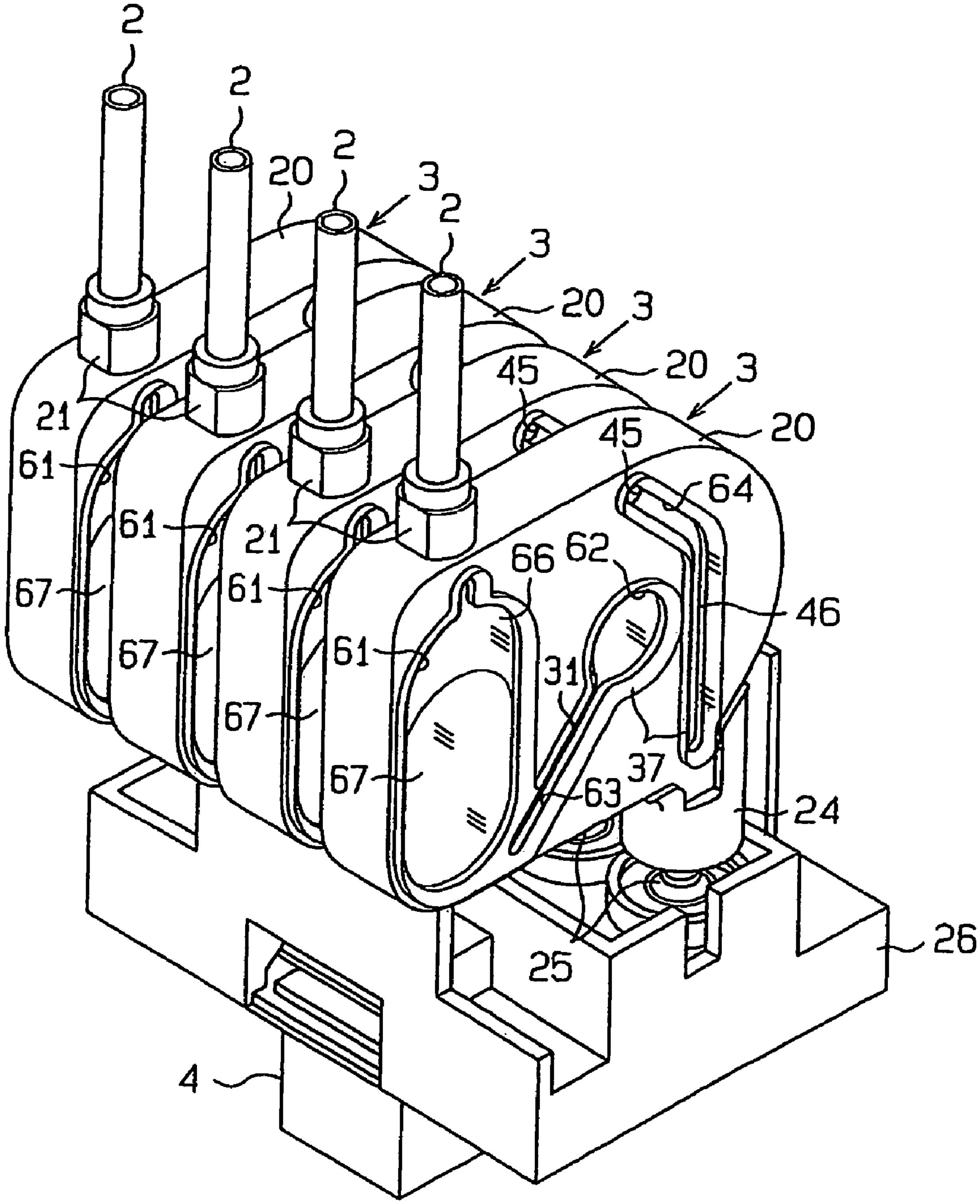
FIG. 15 is a perspective view likewise showing the valve unit from the left side.
Figure 16:
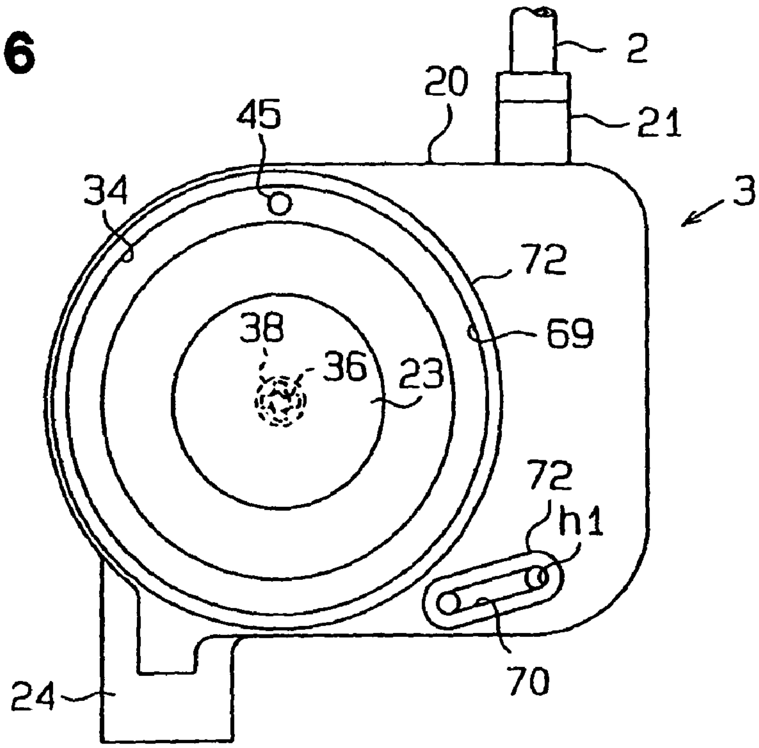
FIG. 16 is a right side view of the valve unit in FIG. 14.
Figure 19:
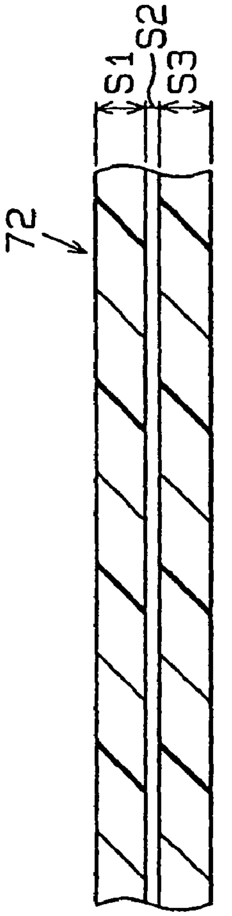
FIG. 19 is an essential portion enlarged cross-sectional view showing a film member to be used in the valve unit according to the second embodiment.

As shown in FIGS. 14 and 16, a recess portion 69 that forms the pressure chamber 34 and a third groove portion 70 that communicates with filter-chamber recess portion 61 and the first groove portion 63 are formed in the second side surface of the unit case 20 opposite to the first side surface. A film member 72 is thermally deposited to the second side surface, which allows the recess portion 69 to be the pressure chamber 34, and allows the third groove portion 70 to be a part of the ink lead-in passage 31. In this embodiment, the film member 72 is made of alumina ($Al_2O_3$) vapor-deposited PET (polyethylene-terephthalate) bonded to high-density polyethylene or polypropylene. The alumina vapor-deposited on the PET is equivalent to a gas barrier layer. PET is the material that remains relatively unchanged in size and rigidity with respect to an environmental change, such as a humidity change, and demonstrates a similar flexibility with respect to the same pressure. In this embodiment, as shown in FIG. 19, the film member 72 in use has a 20-μm thick film S1 of high-density polyethylene or polypropylene, an alumina vapor-deposited layer S2 of 500 angstroms, and a 12 μm thick PET film S3.

Figure 20:
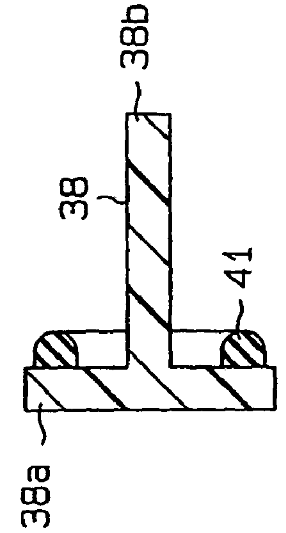
FIG. 20 is a cross-sectional view of a valve body of the valve unit according to the second embodiment.

The seal member 41 provided on the unit case 20 in the first embodiment is formed integral with the movable valve 38 in the second embodiment, as shown in FIG. 20. Further, a pressure-receiving plate is formed of a plastic material, such as polyethylene or polypropylene, as per the first embodiment, and its thickness is, for example, about 0.8 mm.

A manufacturing method for the valve unit 3 of the second embodiment will be described next referring to FIGS. 21(*a*) and 21(*b*) and FIGS. 22(*a*) and 22(*b*). First, referring to FIGS. 21(*a*) and 21(*b*), a description will be given of a manufacturing method that thermally deposits the flexible film member 72, which constitutes a part of the valve unit 3, to the unit case 20.

Figure 21:
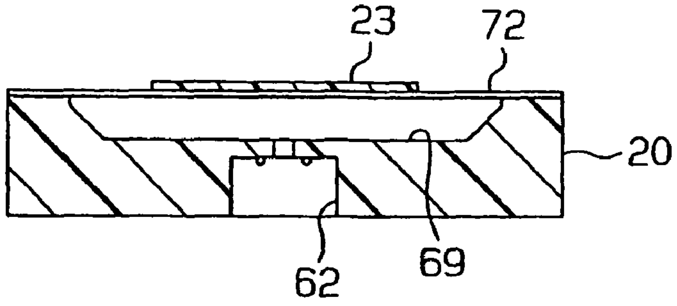
FIGS. 21(*a*) and 21(*b*) are third fabrication step diagrams in a case where a film member is thermally deposited to a unit case, FIG. 21(*a*) shows a state where the film member to which a pressure-receiving plate is bonded is placed on the unit case, and FIG. 21(*b*) shows a state where the film member is thermally deposited.
Figure 21:
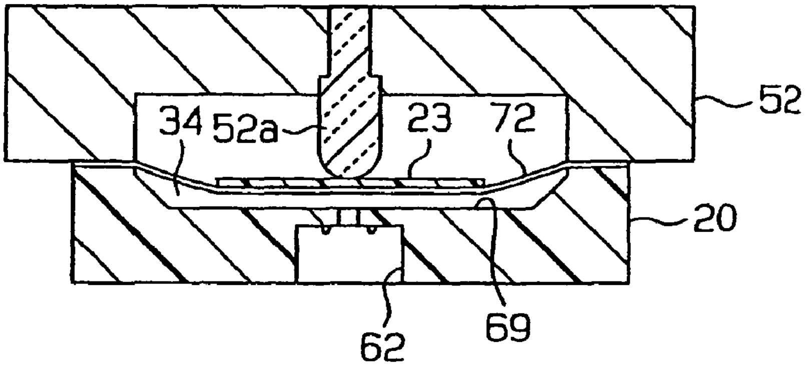

As shown in FIG. 21(*a*), the film member 72 to which the pressure-receiving plate 23 is bonded is placed on the unit case 20, and the heater block 52 is moved down with respect to the film member 72. The heater block 52 in the present embodiment is provided with a projection 52*a* of a heat insulating material at its center. That is, when the heater block 52 is lowered, and the adequate pressure is applied to the film member 72, the projection 52*a* presses the pressure-receiving plate as shown in FIG. 21(*b*). In this state, the heater block 52 presses the film member 72 against the unit case 20, thermally depositing the film member 72 to the unit case 20. Removing the heater block 52 from the unit case 20 yields a unit case 20 to which is thermally deposited a film member 72 having a sufficient flexibility.

Figure 22A:
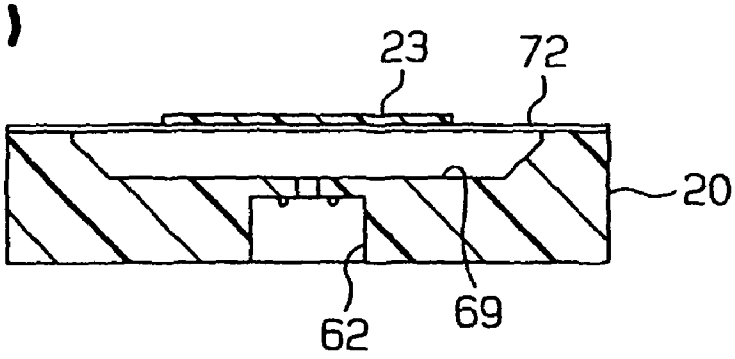
FIGS. 22(*a*) and 22(*b*) are fourth preferable fabrication step diagrams, FIG. 22(*a*) shows a state where the film member to which a pressure-receiving plate is bonded is placed on the unit case, and FIG. 22(*b*) shows a state where the film member is thermally deposited.
Figure 22B:
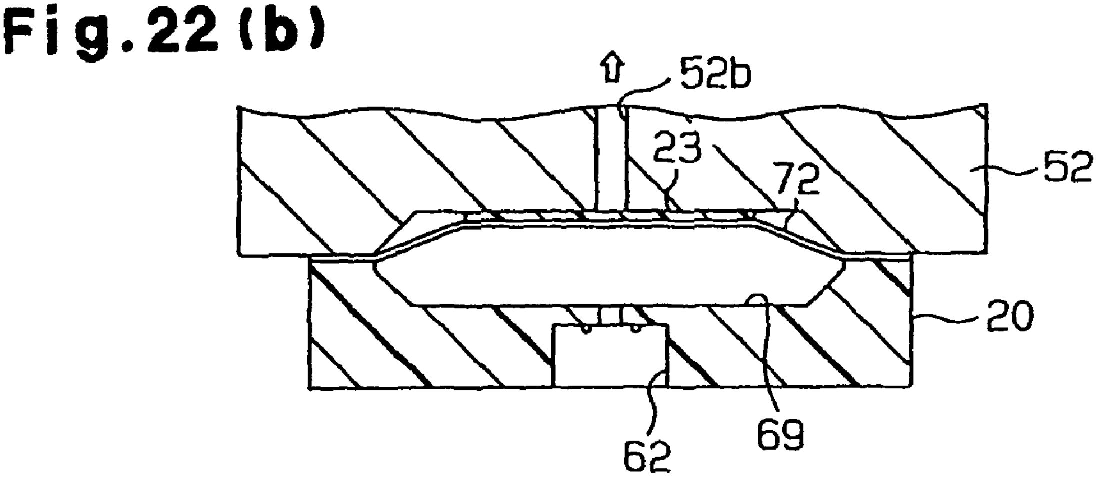

Alternatively, in manufacturing the valve unit 3, the heater block 52 having a chuck hole 52*b* formed in the center can be used as shown in FIG. 22(*b*). In this case too, first, the film member 72, to which the pressure-receiving plate 23 is adhered, is placed on the unit case 20 as shown in FIG. 22(*a*).

Then, as shown in FIG. 22(*b*), the heater block 52 is moved down, and air between the heater block 52 and the unit case 20 is discharged through the chuck hole 52*b*. Accordingly, the pressure-receiving plate 23 is chucked to the chuck hole 52*b*. In this state, the heater block 52 presses the film member 72 against the unit case 20 to thermally deposit it to the unit case 20. As the heater block 52 is removed, the unit case 20 to which the film member 72 having a sufficient flexibility is thermally deposited is yielded.

As described above, the second embodiment affords the same effects as the first embodiment, and can provide the following effects.

In the second embodiment, the filter-retaining chamber 66 is provided midway between the ink lead-out portion 24 and the ink supply chamber 32, and the filter member 67 is provided in the filter-retaining chamber 66. As the filter member 67 can catch foreign matters, such as dust, it is possible to reduce poor sealing of the seal member 41 caused by mixture of foreign matters.

Figure 17:
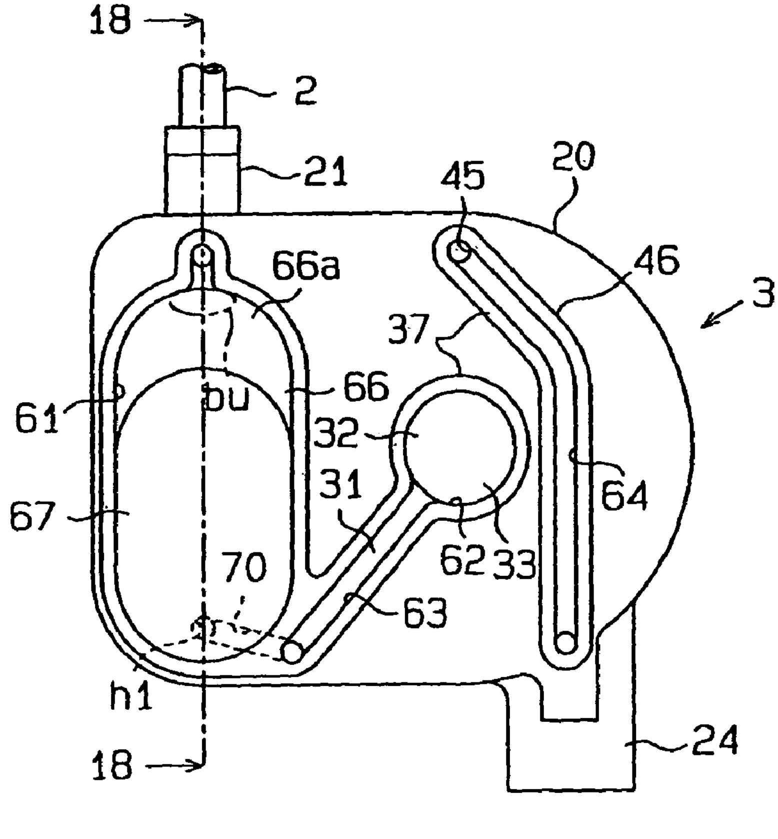
FIG. 17 is a left side view of the valve unit.

As the filter member 67 is located at the lower portion of the filter-retaining chamber 66, and space is formed above the filter member 67, bubbles bu remain in the bubble remaining portion 66*a* above the filter member 67 by buoyancy, as indicated by a two-dash chain line in FIG. 17. Therefore, it is hard for the bubbles in the filter-retaining chamber 66 to enter the through hole h1, thus the ink can be supplied to the ink supply chamber 32 and the pressure chamber 34 more surely, and the movement of the movable valve 38 can be made more reliably.

In the second embodiment, the through hole h1 leading to the ink supply chamber 32 is connected to the lower portion of the filter-retaining chamber 66, where the filter member 67 is provided. The bubbles bu receive a large resistance in passing the filter member 67, so that if the bubbles bu remain in the filter-retaining chamber 66, it is hard for them to move downward even if certain shocks are applied to them. It is therefore more difficult for the bubbles bu remaining in the filter-retaining chamber 66 to enter the ink supply chamber 32 via the through hole h1 positioned in the lower portion of the filter-retaining chamber 66. This makes it possible to supply the ink to the ink supply chamber 32 and the pressure chamber 34 more surely, and to prevent the bubbles bu from flowing out to the recording head 4 during printing.

The film member 72 in the second embodiment, as shown in FIG. 19, has the alumina-vapor-deposited layer sandwiched between synthetic resin films (the high-density polyethylene or polypropylene film, and the PET film). As the film member 27 is formed of a soft synthetic resin, and easily deforms by a small negative pressure produced by discharging of a liquid, therefore, the open/close valve can be opened reliably. Since the alumina vapor-deposited layer S2 is provided between the synthetic resin films, the film member 72 can be formed of a material of a low gas transmittance, and the properties of liquid, such as viscosity, in the pressure chamber 34 have less moisture-evaporation originated changes. Further, as the alumina vapor-deposited layer S2 is formed of aluminum oxide, the material is likely to influence the ink in the pressure chamber 34, but it is sandwiched between the synthetic resin films, and thus it does not cause a chemical change on the property of liquid. The operational reliability of the valve unit 3 can therefore be improved.

The film member 72 of the second embodiment is an alumina-vapor-deposited PET film bonded to a high-density polyethylene or polypropylene film. The use of the film member 72 of such a material can make changes in size and rigidity small with respect to an environmental change, such as a humidity change, and can always provide a similar flexibility with respect to the same pressure. As the film member 72 has a low gas transmittance and moisture transmittance, it is possible to suppress evaporation of moisture, mixture of gas, and the like via the film member 72. It is therefore possible to suppress a change in the viscosity of the ink in the pressure chamber 34 defined by the film member 72 and the generation of bubbles.

In the second embodiment, as shown in FIG. 20, the seal member 41 is formed integral with the movable valve 38. The seal member 41 is formed integral with the movable valve 38 without being deposited on the unit case 20. In general, to deposit the seal member 41 and the film members 22, 37 on the unit case 20, it is desirable that their materials should be the same. As the seal member 41 is formed integral with the movable valve 38 as in this embodiment, however, good sealing can be guaranteed if the unit case 20 is formed of a material quite different from that of the seal member 41. This can widen the range of selection of the materials for the unit case 20 and the film members 72, 37 to be deposited thereto, thus enabling selection of materials of lower costs.

The pressure-receiving plate 23 of the second embodiment is formed of a plastic material, such as polyethylene or polypropylene, with a thickness of 0.8 mm or more. A sufficient rigidity can be obtained even if the pressure-receiving plate 23 is formed of a flexible material, which is approximately the same as that of the film members 72, 37 to easily thermally deposit the pressure-receiving plate 23 to the film members 72, 37. Accordingly, the pressure-receiving plate 23 does not deform itself, and receives a change in pressure in the pressure chamber 34 so that the movable valve 38 can be operated more reliably.

In the manufacturing method according to the second embodiment shown in FIGS. 21(*a*) and 21(*b*), the heater block 52 which is used to thermally deposit the film member 72 to the unit case 20 has the projection **52*a* in its center. With the projection 52*a* pressing the pressure-receiving plate 23, therefore, the film member 72 is deposited to the unit case 20. That is, it is possible to acquire the valve unit 3 that has the film member 72 deposited to the unit case 20 with some flexibility. The flexibility can thus suppress the reaction force at the time a negative pressure is generated in the pressure chamber 34, and the film member 72 presses the movable valve 38. Even if an environmental change occurs, the film member 72 does not get strained, and the operational pressure of the film member 72 can be kept uniform by suppressing the reaction force of the film member 72** as much as possible.

In the second embodiment, the projection **52*a* of the heater block 52 that presses the pressure-receiving plate 23 is formed of a heat insulating material. It is therefore hard for the heat to be transmitted to the film member 72 via the pressure-receiving plate 23**, so that only the necessary portion can be thermally deposited easily.

As shown in FIGS. 22(*a*) and 22(*b*), the chuck hole **52*b* is provided in the center of the heater block 52 in the second embodiment. Therefore, the air is evacuated from the chuck hole 52*b*, causing the pressure-receiving plate 23 to be chucked to the chuck hole 52*b*. As the film member 72 is deposited to the unit case 20 in this situation, the film member 72 given with a sufficient flexibility can be deposited to the unit case 20 by a simple structure. Therefore, it is possible to suppress, as much as possible, the reaction force at the time a negative pressure is generated in the pressure chamber 34, and the film member 72 presses the movable valve 38, and possible to keep the operational pressure of the film member 72** uniform.

The first and second embodiments may be modified as follows.

In the second embodiment, the size and shape of the filter member 67 provided in the filter-retaining chamber 66 may be changed.

In the second embodiment, the pressure-receiving plate 23 may be provided inside the film member 72 (on the unit case 20 side) instead of being provided on the outside.

Figure 23:
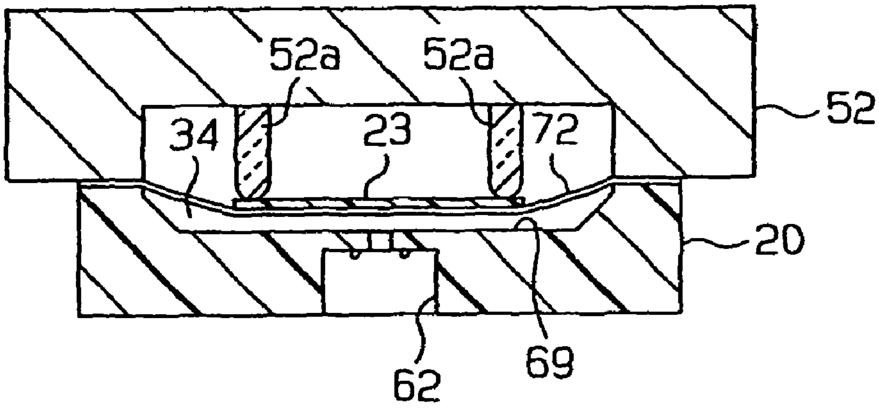
FIG. 23 is a cross-sectional view of a heater block to be used in a manufacturing method according to a modification.

In the second embodiment, as shown in FIG. 23, a plurality of projections **52*a* may be provided on the heater block 52 and, with those projections 52*a* pressing the pressure-receiving plate 23 at plural locations, the film member 72 may be thermally deposited to the unit case 20. Further, the unit case 20 may be provided with an annular projection so that the film member 72 is thermally deposited to the unit case 20 by pressing the pressure-receiving plate 23** with this projection.

Figure 25:
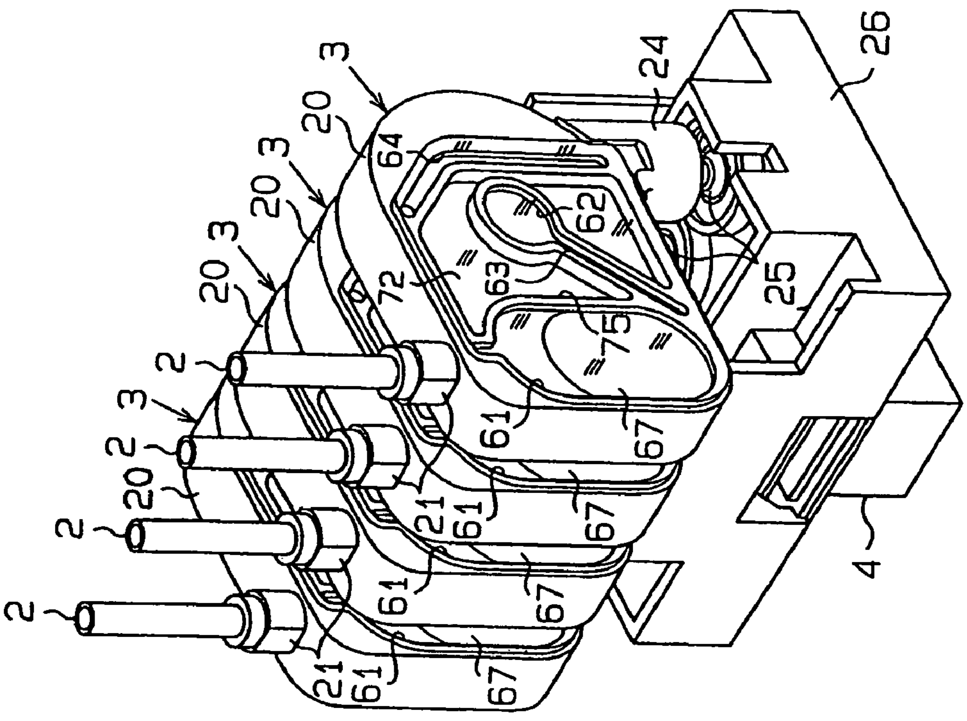
FIG. 25 is a perspective view likewise showing the valve unit from the right side.
Figure 24:
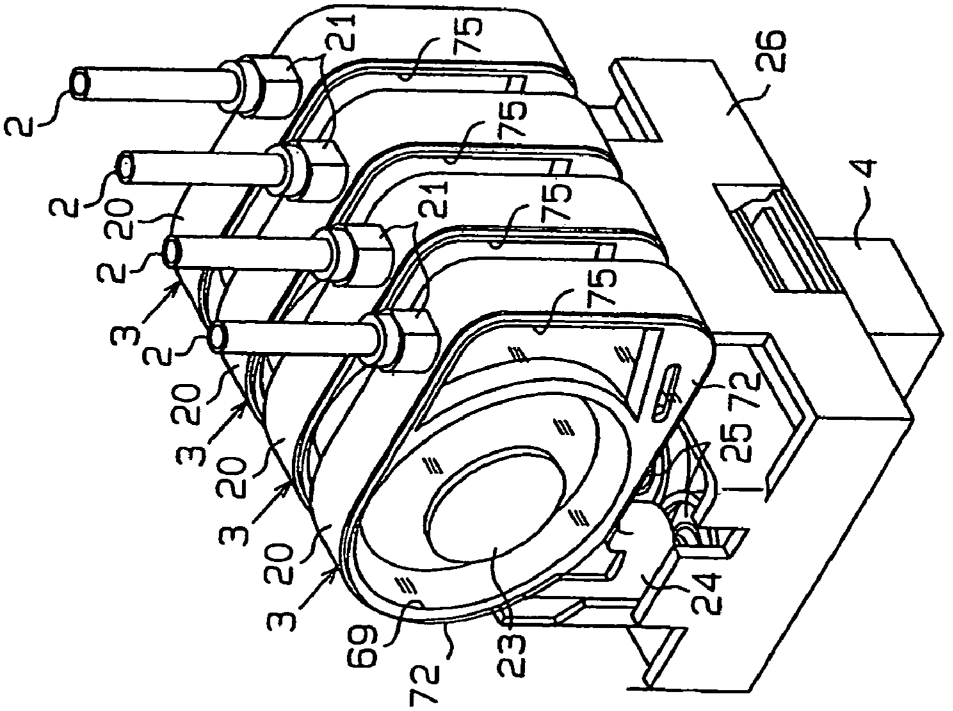
FIG. 24 is a perspective view showing a valve unit according to a modification from the left side.

In the second embodiment, as shown in FIGS. 24 and 25, recess portions 75 may be provided between the filter-chamber recess portion 61, the recess portion 62, and the groove portions 63, 64; outside the groove portion 64; and outside the recess portion 69 in order to reduce the weight. In this case, the carriage 11 becomes lighter accordingly, thus making it possible to reduce the load of the mechanism that activates the carriage, and to make the recording apparatus smaller.

Although the projection **52*a* is formed of a heat insulating material in the second embodiment, the projection 52*a* may be integrally formed of the same material as the portions other than the projection 52*a***.

The film member 72 in the second embodiment may be high-density polyethylene or polypropylene, to which PET vapor-deposited with silica (SiOx) is bonded. Alternatively, high-density polyethylene or polypropylene, to which PS (polystyrene) vapor-deposited with silica or with alumina is bonded, may be used.

Although the descriptions of the individual embodiments have been given of a printer which ejects ink (printing apparatus including a facsimile, copying machine or the like) as a liquid injecting apparatus, the embodiments may be a liquid injecting apparatus that injects another liquid. For example, it may be a liquid injecting apparatus that injects liquid, such as an electrode material or coloring material, which is used in manufacturing a liquid crystal display, EL display, and surface emission display; a liquid injecting apparatus that injects a bioorganic substance, which is used in fabricating bio chips; or a sample injecting apparatus, such as a precision pipet.

Figure 27:
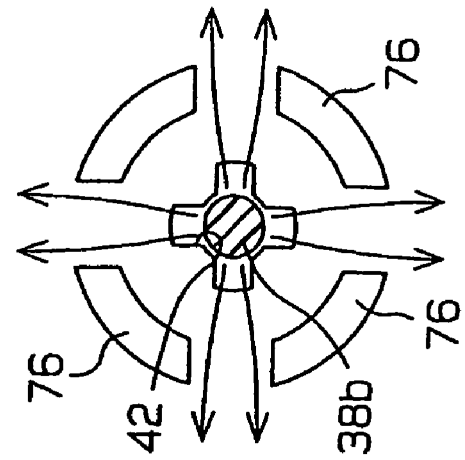
FIG. 27 is a diagram showing the layout state of restriction pieces that restrict the movement of the film member.
Figure 26B:
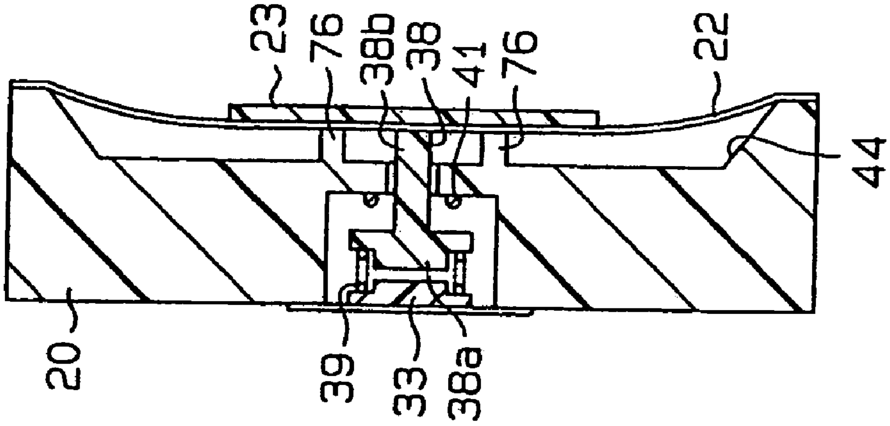
FIGS. 26(*a*) and 26(*b*) are cross-sectional views showing a modification of the valve unit, FIG. 26(*a*) shows a valve-closed state and FIG. 26(*b*) shows a valve-open state.
Figure 26A:
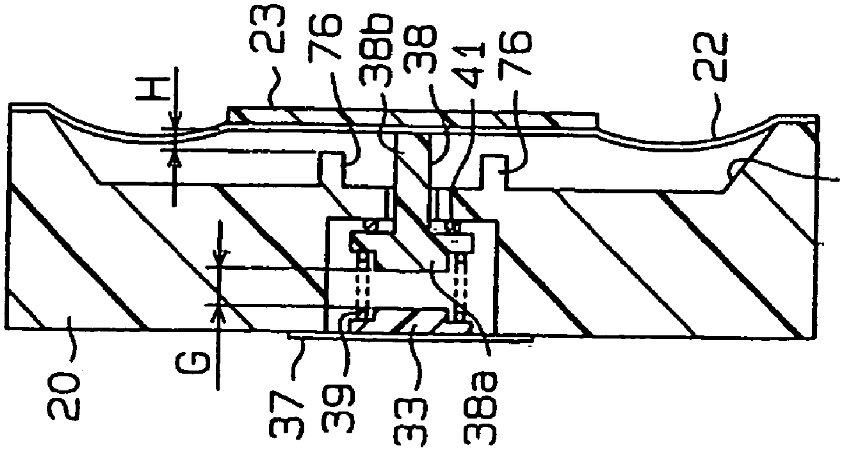

Further, as shown in FIGS. 26(*a*), (*b*) and FIG. 27, a plurality of restriction projections 76 may be formed on the bottom of the recess portion 44, facing the pressure-receiving plate 23, in order to restrict the displacement of the film member 22 when the pressure in the pressure chamber 34 is significantly reduced, for example, at the time of the cleaning operation. The projection 76 in this modification comprises four arcuate projections, which protrude from the bottom of the recess portion 44 in such a way as to surround the rod member 38*b*. An ink passage is formed between the adjoining restriction projections 76. Those restriction projections 76 are arranged on the circumference concentric to the axial line of the rod member 38*b*. The interval, H, between each restriction projection 76 and the film member 22 is set smaller than a clearance G, which is formed between the plate-like member 38*a* and the spring seat 33 when the plate-like member 38*a* of the movable valve 38 in the valve-closed state abuts on the seal member 41.

When the film member 22 is displaced, as a result of depressurizing the interior of the pressure chamber 34, therefore, the pressure-receiving plate 23 abuts on the rod member 38*b* via the film member 22, moving the movable valve 38 against the urging force of the seal spring 39 so that the movable valve 38 is switched to the valve-open state. In this state, the ink that has passed the support hole 36 has moved to near the rod member 38*b* from the ink supply chamber 32, passing through the support hole 36, passes through the passage between the restriction projections 76, and is dispersed in nearly the entire portion of the pressure chamber 34.

When the pressure-receiving plate 23 abuts on the restriction projections 76 via the film member 22 thereafter, further displacement of the film member 22 is restricted. According to the modification, therefore, a large load is not applied to the rod member 38*b* of the movable valve 38, even when the interior of the pressure chamber 34 is considerably depressurized, for example, at the time of cleaning, and deformation or breaking of the rod member 38*b* can be prevented.

Because the height H of each restriction projection 76 is formed smaller than the clearance G in this modification, a clearance is secured between the plate-like member 38*a* of the movable valve 38 and the spring seat 33 even when the displacement of the film member 22 is restricted, so that the seal spring 39 will not compressed more than needed.

Figure 28B:
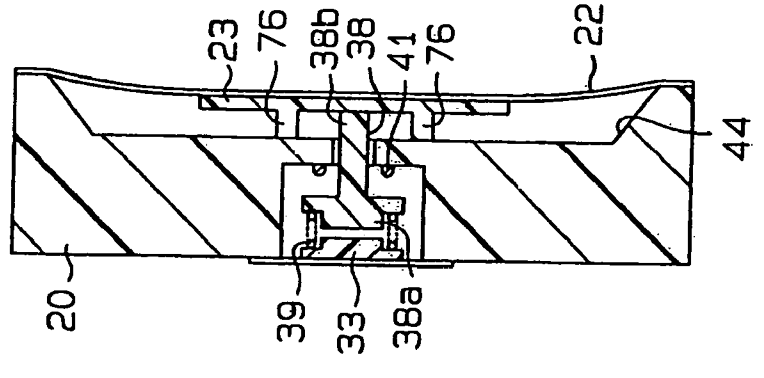
FIGS. 28(*a*) and 28(*b*) are cross-sectional views showing a further modification of the valve unit, FIG. 28(*a*) shows a valve-closed state and FIG. 28(*b*) shows a valve-open state.
Figure 28A:
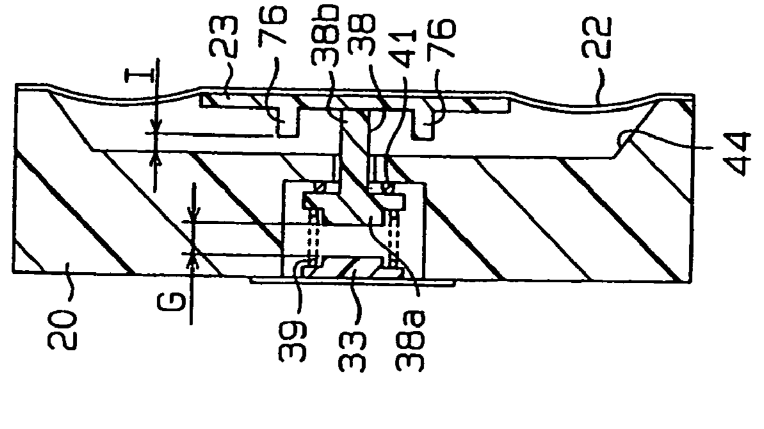

In a further modification shown in FIGS. 28(*a*) and 28(*b*), the structures of the pressure-receiving plate and each restriction projection differ from those of the modification in FIGS. 26(*a*) and 26(*b*). That is, in the further modification, the pressure-receiving plate 23 is attached to the inner surface of the film member 22, and the individual restriction projections 76 protrude from the pressure-receiving plate 23 toward the bottom of the recess portion 44. The clearance, I, between each restriction projection 76 and the bottom of the recess portion 44 is set smaller than the clearance G, which is formed between the plate-like member 38*a* and the spring seat 33 when the plate-like member 38*a* of the movable valve 38 in the valve-closed state abuts on the seal member 41.

In this modification, therefore, further displacement of the film member 22 is restricted when the restriction projections 76 on the pressure-receiving plate 23 abut on the bottom of the recess portion 44, as shown in FIG. 28(*b*), after the movable valve is switched to the valve-open state in accordance with the displacement of the film member 22. This modification therefore provides the same effect as the modification in FIGS. 26(*a*) and 26(*b*).

The third embodiment, which embodies the present invention, will be discussed, centering on the differences from the individual embodiments described above, according to FIGS. 29(*a*) and 29(*b*) and FIG. 30.

Figure 29B:
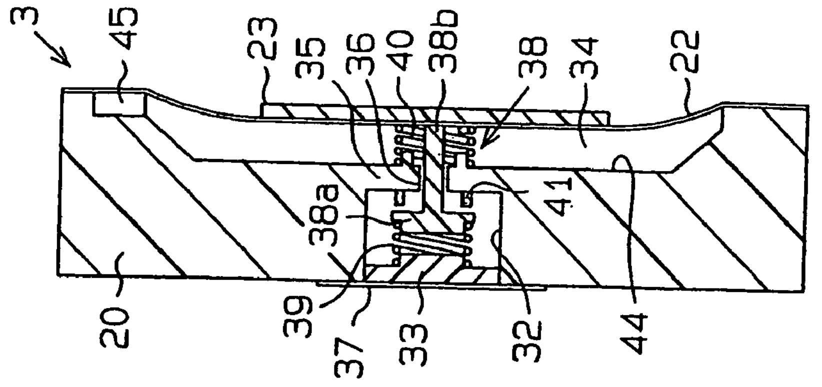
FIGS. 29(*a*) and 29(*b*) illustrate a valve unit according to a third embodiment, FIG. 29(*a*) shows a valve-closed state and FIG. 29(*b*) shows a valve-open state.
Figure 29A:
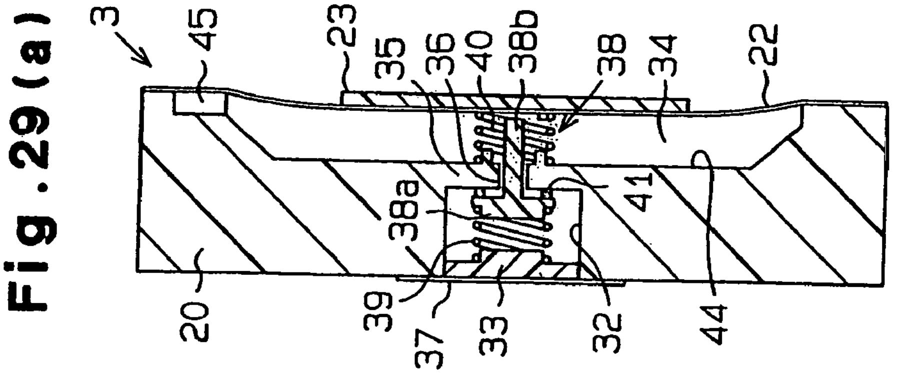

As shown in FIGS. 29(*a*) and 29(*b*), a negative-pressure holding spring 40 is arranged in the pressure chamber 34 in such a way as to encircle the rod member 38*b* of the movable valve 38. This negative-pressure holding spring 40 has one end held by a ring-shaped projection formed on the partition 35 and the other end abutting on the film member 22. The urging direction of the negative-pressure holding spring 40 therefore matches with the moving direction of the pressure-receiving plate 23, which is attached to the film member 22, and the urging force acts in the direction of expanding the volume of the pressure chamber 34.

The coil diameter of the negative-pressure holding spring 40 is about the same as the coil diameter of the aforementioned seal spring 39 and is relatively small. Therefore, the negative-pressure holding spring 40 abuts on nearly the center of the pressure-receiving plate 23 via the film member 22.

As the ink supply system illustrated in FIG. 1 or FIG. 2 is used in the ink-supply valve unit 3 of the third embodiment, the ink is supplied to by a positive pressure as per the individual embodiments described above. At the time the cleaning operation is carried out, the flow rate of the ink to be supplied to the valve unit 3 is increased to suck the nozzle-forming surface of the recording head 4 by using the capping means 18.

Here, with the recording head 4 in the non-printing state, i.e., in the state where the ink is not consumed, the spring load W1 (not shown) by the seal spring 39 in the valve unit 3 is applied to the plate-like member 38*a* of the movable valve 38 and pressure P1 (not shown) of the ink to be supplied to the ink supply chamber 32 is also applied to the plate-like member 38*a*. Accordingly, the plate-like member 38*a* abuts on the seal member 41 as shown in FIG. 29(*a*), rendering the movable valve 38 in a valve-closed state. That is, the valve unit 3 is in a self-sealing state.

On the other hand, in a case where the recording head 4 becomes a print state and consumes the ink, the film member 22 is displaced toward the recess portion 44, in accordance with a decrease in the ink in the pressure chamber 34, so that the pressure-receiving plate 23 attached to it moves in the direction of reducing the volume of the pressure chamber 34. At this time, the negative-pressure holding spring 40 is compressed, and the center portion of the pressure-receiving plate 23 abuts on the end portion of the rod member 38*b* of the movable valve 38 via the film member 22.

W2 (not shown) represents the spring load of the negative-pressure holding spring 40 at that time, and Wd (not shown) represents displacement reaction force with respect to the displacement of the film member 22. As the ink is further consumed by the recording head 4, a negative pressure P2 is generated in the pressure chamber 34. In a case where the relationship of P2>W1+P1+Wd+W2 is met, the film member 22 pushes the rod member 38*b*, releasing the abutment of the plate-like member 38*a* to the seal member 41 so that the movable valve 38 becomes a valve-open state as shown in FIG. 29(*b*).

Therefore, the ink in the ink supply chamber 32 is supplemented into the pressure chamber 34 via the ink supply hole 42 extending from the ink supply chamber 32 to the pressure chamber 34, and the flow of the ink into the pressure chamber 34 cancels the negative pressure in the pressure chamber 34. Accordingly, the movable valve 38 moves and is rendered in the valve-closed state again as shown in FIG. 29(*a*), stopping the supplement of the ink to the pressure chamber 34 from the ink supply chamber 32.

As mentioned above, the negative-pressure holding spring 40 abuts on the film member 22, presses the pressure-receiving plate, and urges in the direction of increasing the volume of the pressure chamber 34. Even if the pressure-receiving plate 23 experiences slight acceleration/deceleration by the reciprocal movement of the carriage, for example, the pressure-receiving plate 23 does not recklessly move. This can effectively reduce the possible occurrence of the erroneous operation of the movable valve 38.

Further, the negative-pressure holding spring 40 also effectively suppresses the phenomenon such that the ink gathers in the lower portion of the pressure chamber 34 due to its gravitational force and expands the film member 22 further outward. That is, as the negative-pressure holding spring 40 has an action to always keep the pressure chamber 34 in a slight negative pressure state, it works so as to always keep the pressure-receiving plate 23, attached to the film member 22, in a vertical state. This can effectively reduce the erroneous operation of the movable valve 38.

Further, in a case where the ink is supplemented into the pressure chamber 34, the negative-pressure holding spring 40 expands and works to keep the pressure chamber 34 in a slight negative pressure state, a variation in pressure in the pressure chamber 34 can be reduced. This can guarantee the proper discharge operation of ink droplets from the recording head.

In addition, according to this embodiment, as the spring load originated from the negative-pressure holding spring 40 and the seal spring 39 is applied to the movable valve, the negative pressure state of the pressure chamber 34 is secured. In other words, the spring load can be divided to the negative-pressure holding spring 40 and the seal spring 39. It is therefore possible to select a small spring load for the seal spring 39 for abutting the movable valve 38 in the valve-closed state on the seal member 41.

Therefore, the abutment pressure on the seal member 41 of an elastomer resin or the like can be lowered, thereby making it possible to prevent abnormal deformation of the seal member 41. Because application of an excess spring load onto the seal member 41 can be suppressed, it is possible to avoid the problem such that an impurity, such as oil and fat, contained in the elastomer resin constituting the seal member 41 enters the ink.

In the above-described third embodiment, it is desirable that the size relationship should be set in such a way as to leave a stroke where the negative-pressure holding spring 40 is further contractible in a case where the movable valve 38 moves the maximum, based on the contraction of the volume of the pressure chamber. FIG. 30 shows that example, and shows, in enlargement, near the center portion of the ink-supply valve unit. FIG. 30 shows a situation where the negative-pressure holding spring 40 is deformed or is contracted the most, based on the contraction of the volume of the pressure chamber 34.

Figure 30:
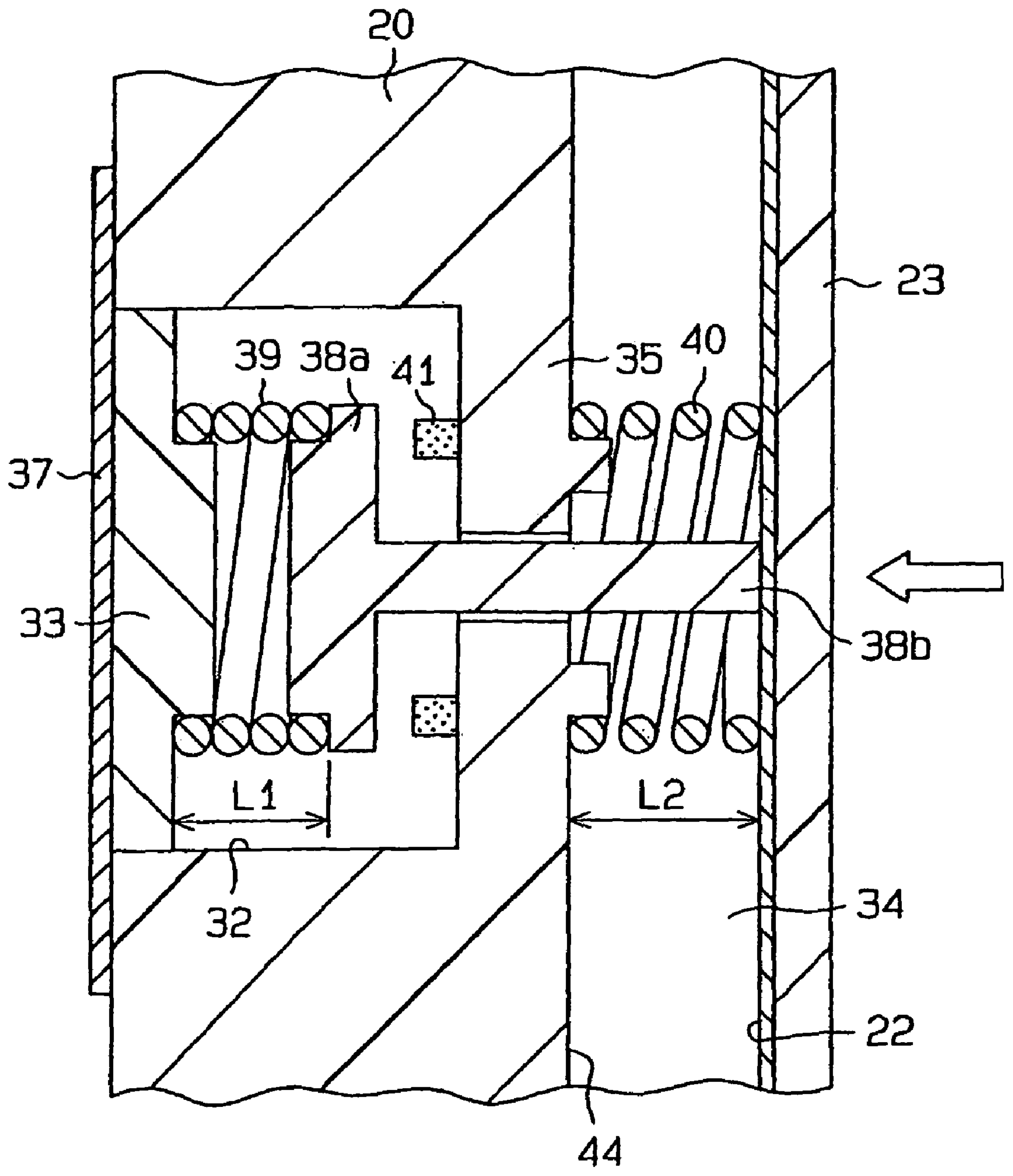
FIG. 30 is an enlarged cross-sectional view showing the relationship between a negative-pressure holding spring and the stroke of a movable valve.

In FIG. 30, L1 indicates the solid height of the seal spring 39 in a case where the movable valve 38 makes the maximum movement, and L2 indicates the contracted height of the negative-pressure holding spring 40 in that state. That is, the size relationship among the individual portions is set in such a way that even when the individual turn portions of the seal spring 39 are tight, the individual turn portions of the negative-pressure holding spring 40 keep a not-tight state. In other words, in a case where spring members with the same standard (size) are used as the seal spring 39 and the negative-pressure holding spring 40, the sizes of the individual portions are set in such a way that the relationship of L1<L2 is satisfied. Because the mode illustrated in this diagram is so designed that the ink flows into the pressure chamber 34 passing the clearance of the negative-pressure holding spring 40, the flow passage of the ink is blocked if the individual turn portions of the negative-pressure holding spring 40 become tight, which may obstruct the supply of the ink. Therefore, this problem can be avoided by setting L1<L2 as mentioned above.

In a case where the ink pressurized supply system shown in FIG. 1 is employed in the third embodiment, for example, the slight open state of the movable valve 38 can lead the ink into the pressure chamber 34 so that the size setting as shown in FIG. 30 is not essential. However, in a case where the system that supplies the ink due to a head difference is used, as illustrated in FIG. 2, the ink supply pressure is low so that the large open state of the movable valve 38 continues to be needed. It is therefore important to set the solid height of the negative-pressure holding spring 40 with some margin with respect to the moving stroke of the movable valve 38 as mentioned above.

Next, ink-supply valve units according to modifications shown in FIGS. 31(*a*) and 31(*b*) will be discussed, mainly on the differences from the embodiment described above.

Figure 31:
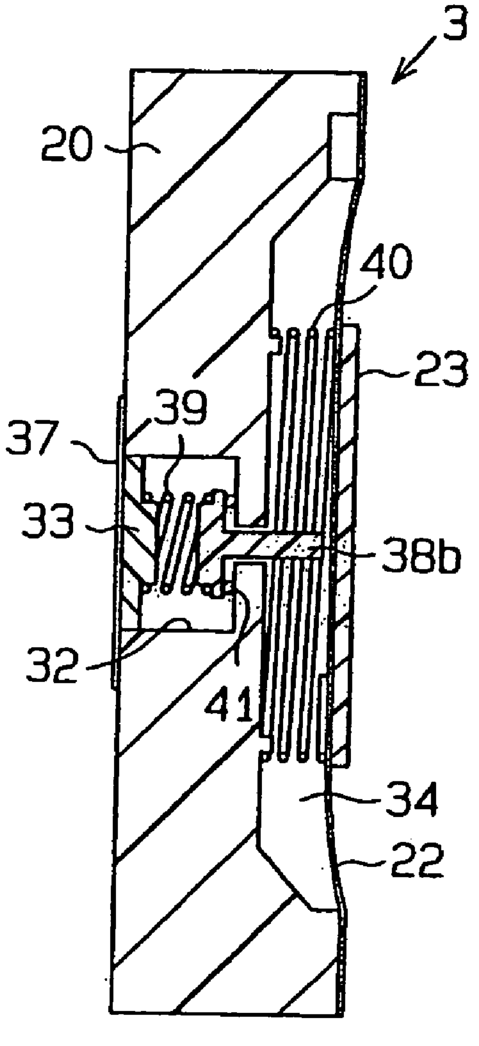
FIG. 31(*a*) is a cross-sectional view of a valve unit according to a modification.
Figure 31:
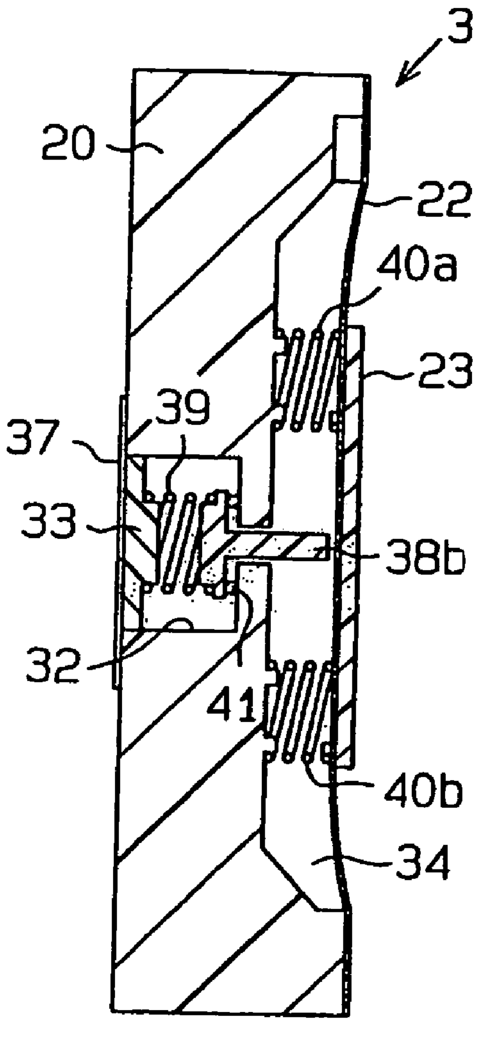

In the modification shown in FIG. 31(*a*), while a coil spring is likewise used as the negative-pressure holding spring 40, the coil diameter is set larger as compared with the mode shown in FIG. 29(*a*). This allows the negative-pressure holding spring 40 to abut on near the periphery of the pressure-receiving plate 23 formed in a disk shape via the film member 22.

Because the pressure-receiving plate 23 abuts, in the vicinity of its periphery, on the negative-pressure holding spring 40 in this structure, the spring 40 works to always keep the pressure-receiving plate 23 in a vertical state. The pressure-receiving plate 23 in a vertical state even if the ink gathers in the lower portion of the pressure chamber 34 due to the gravitational force and causes the film member 22 to expand further outward. It is therefore possible to effectively reduce the erroneous operation of the movable valve 38.

In the modification shown in FIG. 31(*b*), while a coil spring is likewise used as the negative-pressure holding spring, a plurality of coil springs 40*a* and 40*b* with smaller coil diameters are used in this mode. The individual coil springs 40*a* and 40*b* are arranged in such a way as to abut on near the periphery of the pressure-receiving plate 23 formed in a disk shape. In this structure too, the individual coil springs 40*a* and 40*b* work to always keep the pressure-receiving plate 23 in a vertical state, even if the ink gathers in the lower portion of the pressure chamber 34 due to the gravitational force and causes the film member 22 to expand further outward. It is therefore possible to effectively reduce the erroneous operation of the movable valve 38.

Although two coil springs 40a and 40b are used in the modification shown in FIG. 31(b), more coil springs can be used. In a case where an integer number (n) of coil springs are used, therefore, to set the spring load originated from the negative-pressure holding spring to W2, it is necessary to set the spring load originated from a single coil spring to W2/n.

Figure 32A:
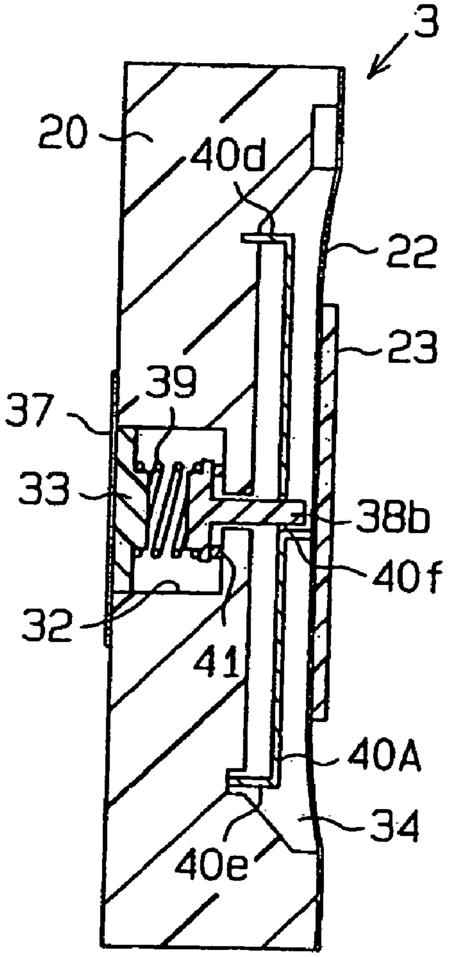
FIG. 32(*a*) is a cross-sectional view of a valve unit according to a further modification.
Figure 32B:
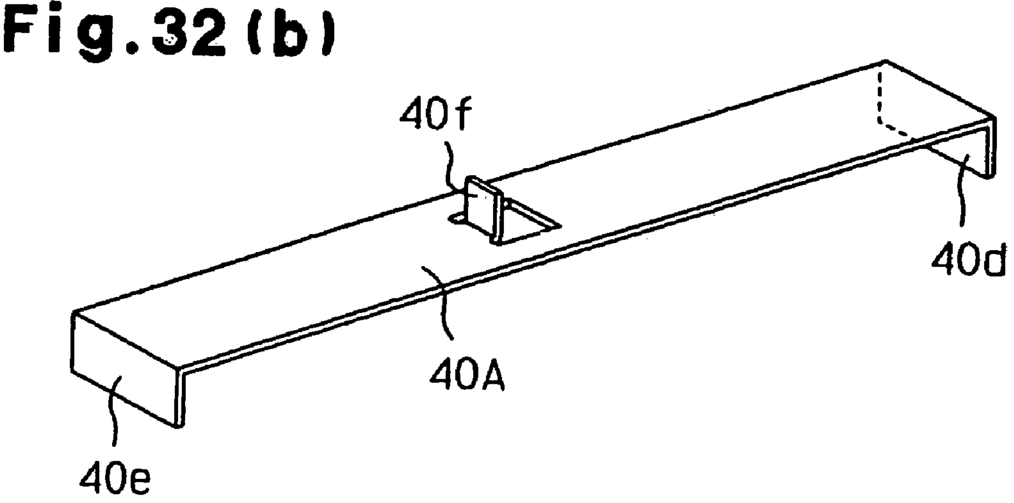

In the modification shown in FIGS. 32(a) and 32(b), a plate spring 40A is used as the negative-pressure holding spring. As shown in FIG. 32(b), the plate spring 40A has both end portions bent in the same direction to constitute a pair of leg portions 40d and 40e. And, a cut and fold portion 40f which protrudes in the opposite direction to the bending direction of the leg portions 40d and 40e is formed in the center portion of the plate spring 40A.

As shown in FIG. 32(a), one leg portion 40d of the plate spring 40A is fixed to the unit case 20 in the pressure chamber 34 while the other leg portion 40e abuts on the inner wall of the pressure chamber 34. The rod member 38b of the movable valve is inserted in the opening that is bored through by forming the cut and fold portion 40f. The distal end portion of the cut and fold portion 40f is arranged in such a way as to abut on almost the center portion of the pressure-receiving plate 23 via the film member 22.

In this structure, the plate spring 40A urges the film member 22 in the direction of increasing the volume of the pressure chamber 34, and works to effectively suppress the erroneous operation of the movable valve 38 even if acceleration/deceleration originated from the reciprocal movement of the carriage, for example, is experienced.

The fourth embodiment of the liquid injecting apparatus that embodies the present invention will be described below with reference to FIG. 33 to FIGS. 38(a) and 38(b).

Figure 33:
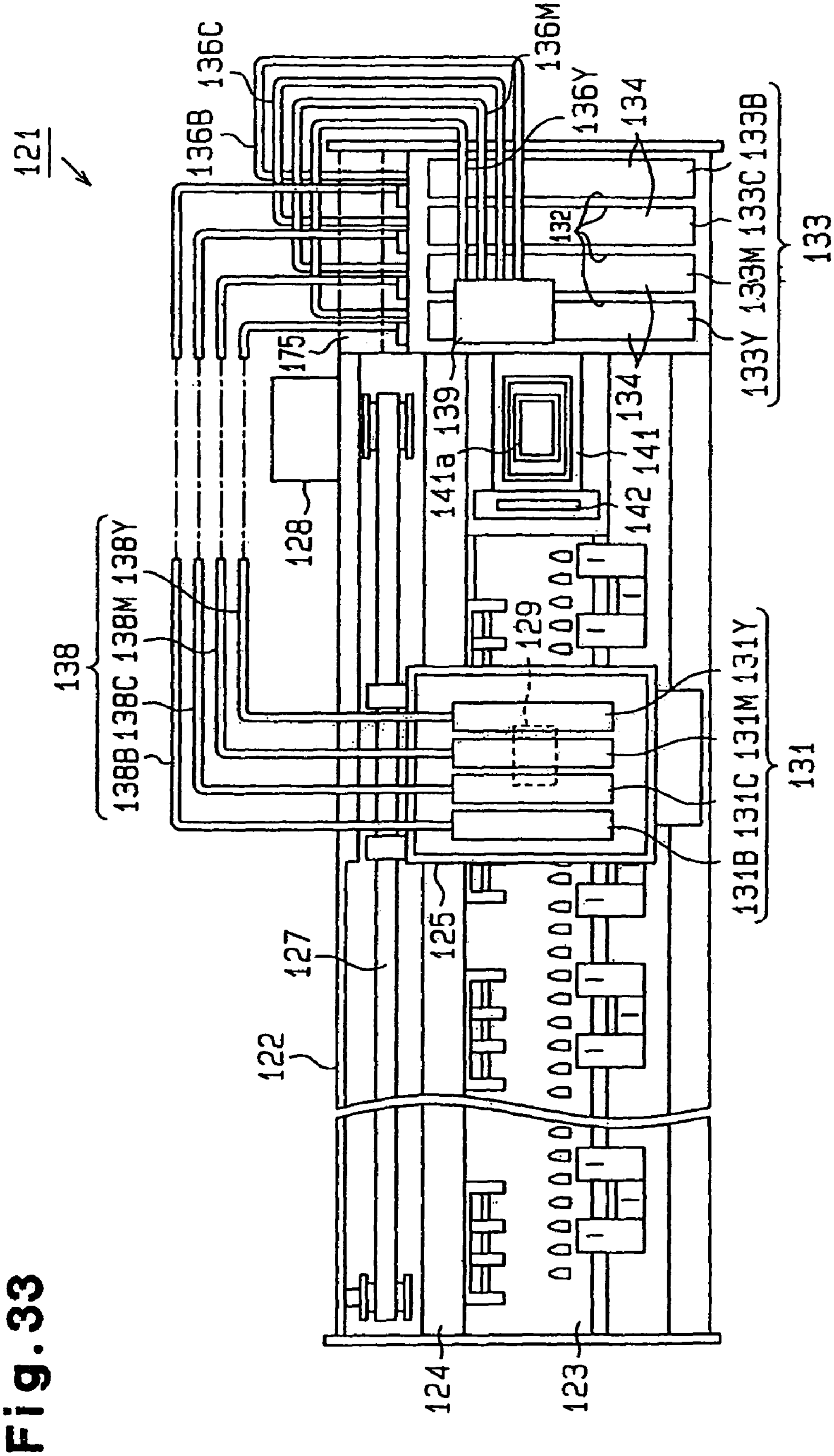
FIG. 33 is a plan view of a printer as a liquid injecting apparatus according to a fourth embodiment.

As shown in FIG. 33, an ink jet type printer (hereinafter called printer) 121 as a liquid injecting apparatus has a frame 122 with a substantially parallelepiped shape and a paper-feeding member 123 hung from the frame 122, so that paper is fed on the paper-feeding member 123 by an unillustrated paper-feeding mechanism. Further, a guide member 124 is hung from the frame 122 in parallel to the paper-feeding member 123, and a carriage 125 is supported on the guide member 124 in such a manner as to be movable along the axial direction of the guide member 124. The carriage 125 is connected via a timing belt 127 to a carriage motor 128, and is moved reciprocally along the guide member 124 by driving of the carriage motor 128.

A liquid injecting head or recording head 129 is mounted on that side of the carriage 125, which faces the paper-feeding member 123. Mounted on the carriage 125 are valve units 131, which supply liquids or inks to the recording head 129. In this embodiment, four valve units 131B, 131C, 131M, and 131Y are provided in association with the colors of the inks (black ink B and individual color inks of cyan C, magenta M, and yellow Y).

Provided in the bottom of the recording head 129 is an unillustrated nozzle discharge port, and the inks are supplied to the recording head 129 from the valve units 131B, 113C, 131M, and 131Y by the driving of an unillustrated piezoelectric element, and ink droplets are spurted onto the paper to perform printing.

Four cartridge holders 132 are formed at the right-hand end of the frame 122. An ink cartridge 133 as liquid storing means is detachably mounted on each cartridge holder 132. In this embodiment, four ink cartridges 133B, 133C, 133M, and 133Y are provided in association with the colors of the inks. Each of the ink cartridges 133B, 133C, 133M, and 133Y comprises an outer case 134, having the interior in an airtight state, and an unillustrated ink pack provided therein, and the aforementioned black ink B and the individual color inks C, M, and Y are respectively stored in the ink packs.

The ink pack of the ink cartridge 133 and the valve unit 131 are connected together via a tube 138 as a flexible liquid supply passage. In this embodiment, four tubes 138B, 138C, 138M, and 138Y are provided in association with the colors of the inks.

An air-pressurizing pump 139 is provided on the ink cartridge 133Y which stores the ink of yellow Y. This air-pressurizing pump 139 is connected to the outer cases 134 of the ink cartridges 133B, 133C, 133M, and 133Y via air-supply tubes 136B, 136C, 136M, and 136Y. Therefore, the air pressurized by the air-pressurizing pump 139 is introduced into the outer cases 134 of the ink cartridges 133B, 133C, 133M, and 133Y, and is led into the spaces formed between the outer cases 134 and the ink packs. That is, as the air-pressurizing pump 139 is driven, letting air go into the outer cases 134, the ink packs are pressed by pressurized air, and the individual inks stored in the ink packs are supplied to the valve units 131B, 131C, 131M, and 131Y via the tubes 138B, 138C, 138M, and 138Y.

Capping means 141, which seals the nozzle-forming surface of the recording head 129, is arranged in a non-print area (home position) on the moving passage of the carriage 125. Further, a cap member 141a formed of an elastic material, such as rubber, which can come in close contact with the nozzle-forming surface of the recording head to seal the nozzle-forming surface is arranged on the top surface of the capping means 141. When the carriage 125 moves to the home position, therefore, the capping means 141 moves up toward the recording head 129 and seals the nozzle-forming surface of the recording head 129 with the cap member 141a, thereby preventing the openings of the nozzles from being dried.

An unillustrated suction pump (tube pump) is provided at the lower portion of the cap member 141a. This suction pump is connected to the lower portion of the cap member 141a via a suction tube. As this suction pump is driven, air is sucked from the cap member 141a covering the recording head 129, which sucks the ink from the recording head 129 and discharges it. Further, a wiping member 142 is arranged adjacent to the printing area side of the capping means 141. This wiping member 142 is formed of an elastic material, such as rubber, into a rectangular slice. The wiping member 142 moves onto the moving passage of the recording head 129, as needed, to wipe the nozzle-forming surface clean.

The valve unit 131 will be discussed according to FIG. 34 to FIGS. 38(a) and 38(b).

Figure 34:
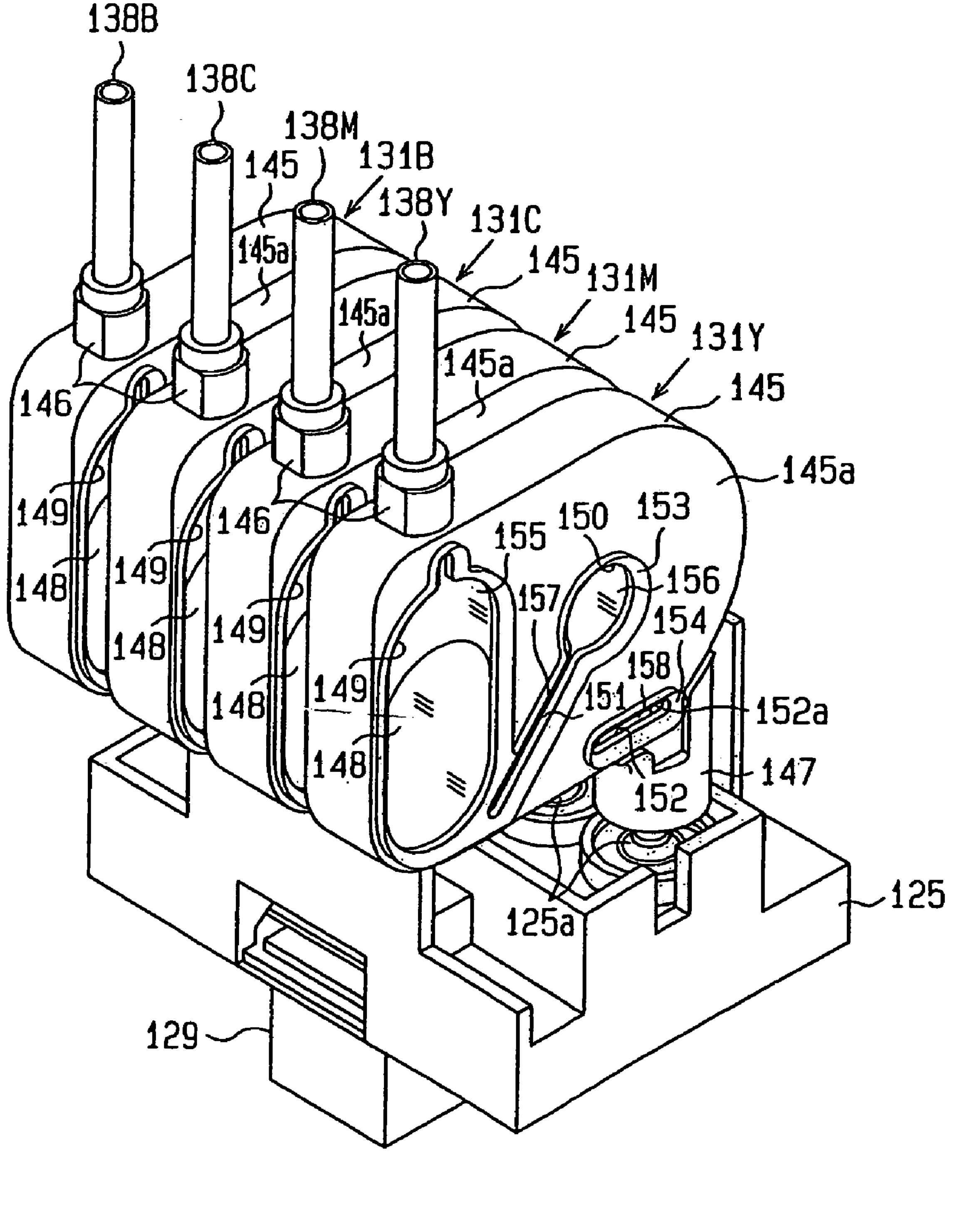
FIG. 34 is a perspective view of a valve unit mounted in a printer according to the fourth embodiment.
Figure 35:
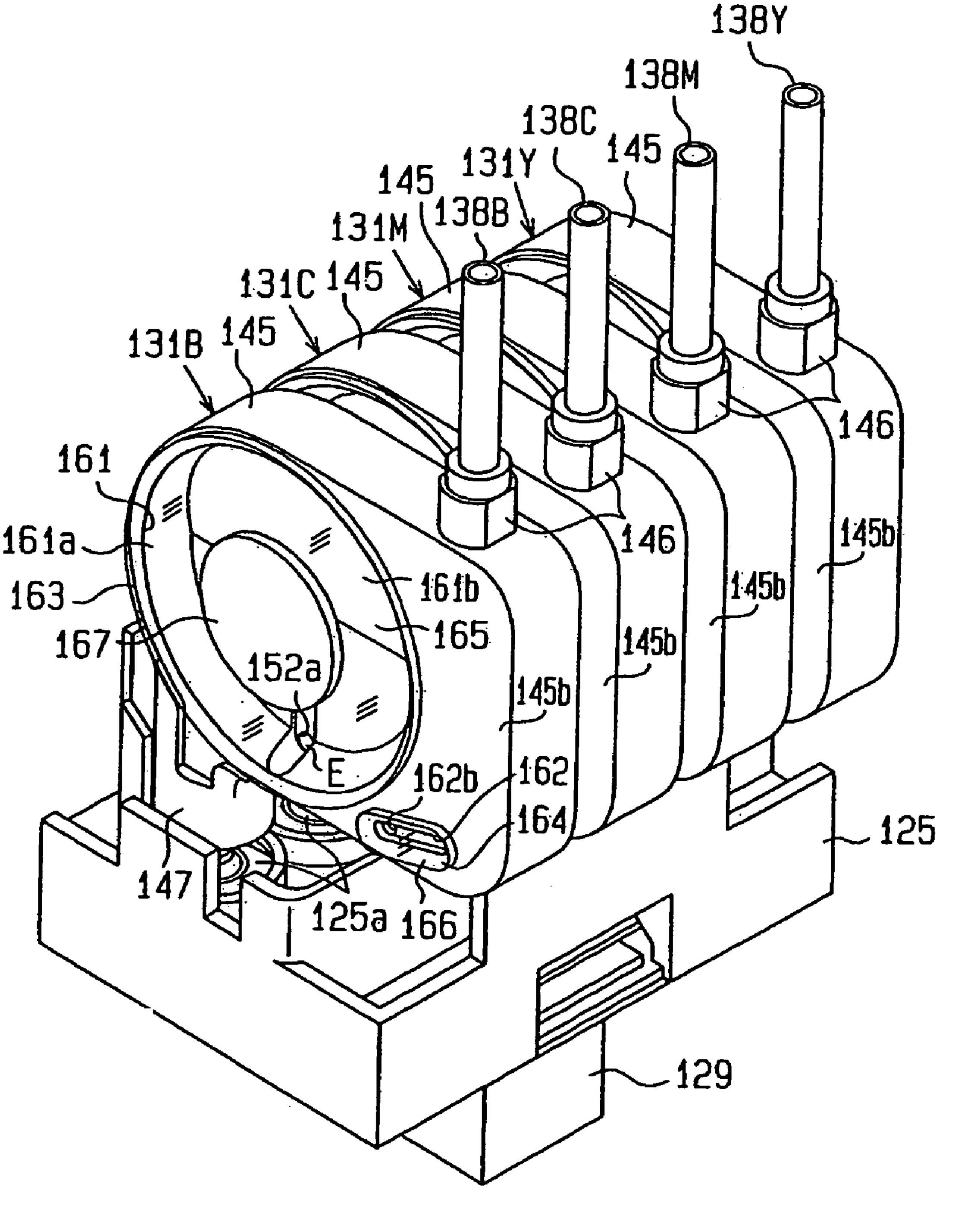
FIG. 35 is a perspective view showing the valve unit in FIG. 34 viewed from the opposite side.

As shown in FIGS. 34 and 35, the valve unit 131 has a unit case 145 of a synthetic resin. The unit case 145 has such a shape as the integral of a parallelepiped and semicolumnar portion. A connection portion 146 is formed at the top portion of the unit case 145, and the tube 138 is connected to the connection portion 146. An ink lead-out portion 147 is formed integrally at the lower portion of the unit case 145, and is connected to the recording head 129 via a connection member 125a of the carriage 125.

Figure 36:
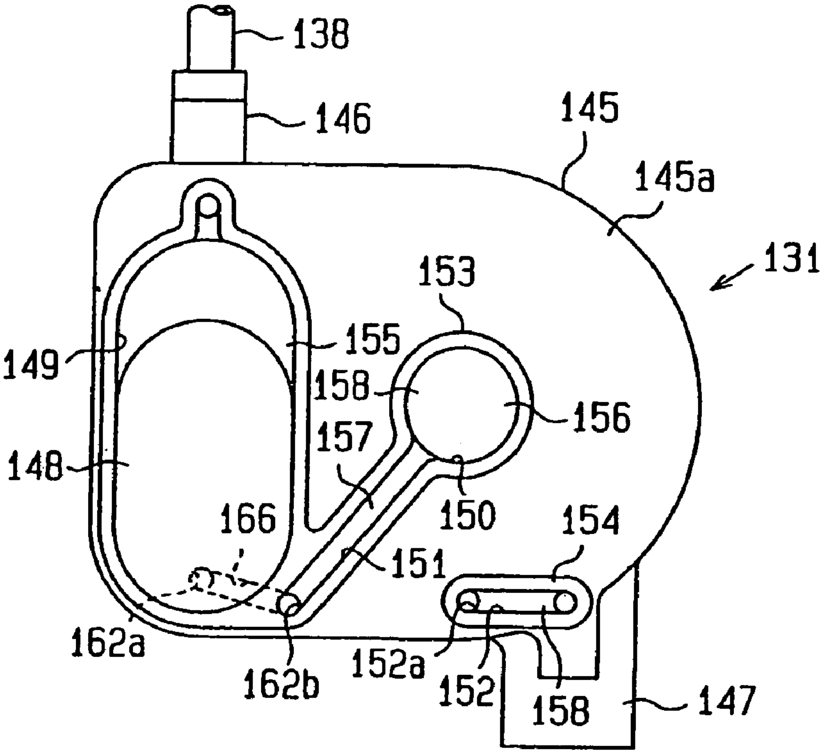
FIG. 36 is a right side view of the valve unit in FIG. 34.

As shown in FIGS. 34, 36, and 38, formed on a first side surface 145a of the unit case 145 are a filter-chamber recess portion 149 where a filter 148 is retained, a substantially cylindrical small recess portion 150, a linear groove 151, which communicates with the small recess portion 150, and linear groove 152 extending horizontally. Further, a film member 153, which covers the filter-chamber recess portion 149, small recess portion 150, and groove 151; and a film member 154, which covers the groove 152, are adhered to the first side surface 145a by thermal deposition. Therefore, the filter-chamber recess portion 149 and the film member 153 constitute a filter chamber 155, the small recess portion 150 and the film member 153 constitute a supply chamber 156, and the groove 151 and the film member 153 constitute a first ink lead-in passage 157. The groove 152 and the film member 154 constitute a flow-out passage 158, which communicates with the ink lead-out portion 147.

The film members 153 and 154 are formed of materials that do not chemically influence the ink property and that further have low water transmittance and low oxygen and nitrogen transmittance. That is, the film members 153 and 154 are formed by a film with the structure in which, for example, a nylon film coated with vinylidene chloride (saran) is adhered and laminated on a high-density polyethylene film or polypropylene film.

As shown in FIGS. 38(*a*) and 38(*b*), a spring receiving member 159, which has an outside diameter slightly smaller than the inside diameter of the supply chamber 156, is attached to the film member 153 in such a way as to be positioned concentrically to the supply chamber 156 and there inside.

Figure 37:
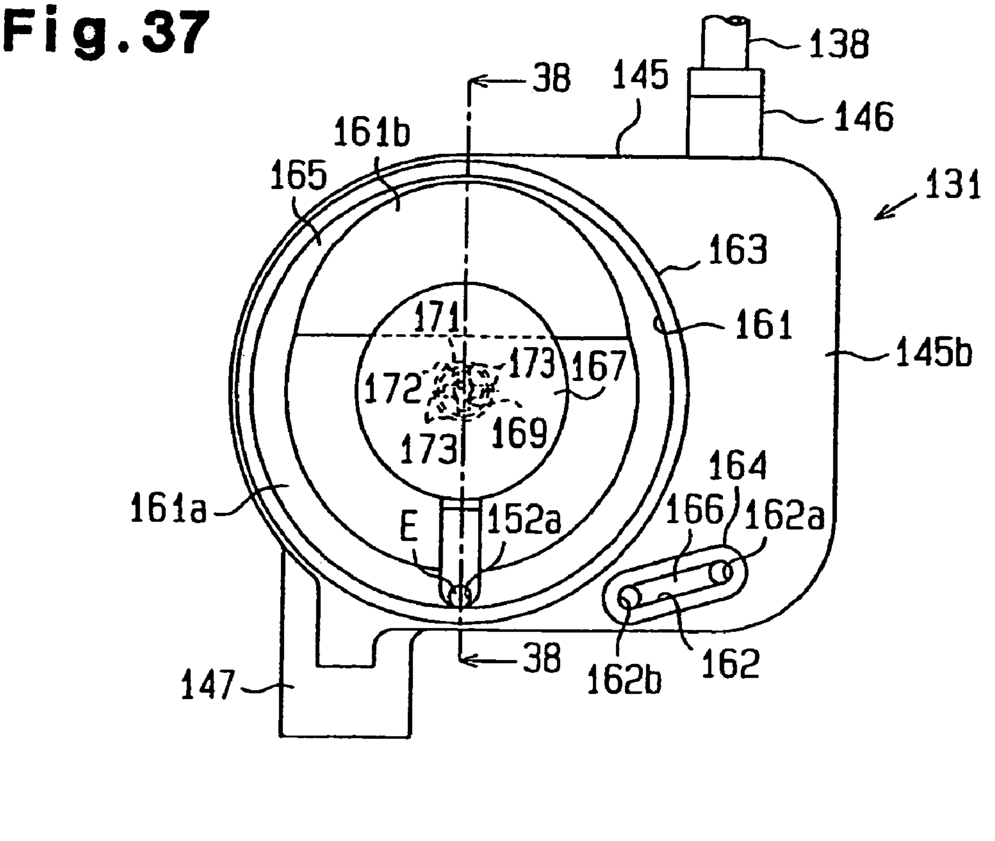
FIG. 37 is a left side view of the valve unit in FIG. 34.

In the meantime, as shown in FIGS. 35, 37, and 38, a substantially cylindrical large recess portion 161, which is provided concentric to the small recess portion 150, and a linear groove 162 are formed on a second side surface 145*b* of the unit case 145. A peripheral wall portion 161*a* of the large recess portion 161 is inclined in such a way as to become wide toward the opening. The bottom wall of the large recess portion 161 has an inclined surface 161*b*, which is inclined in such a way that the depth of the large recess portion 161 gradually becomes smaller toward above. Further, a through hole 152*a*, which communicates with the groove 152 of the first side surface 145*a*, is formed in the lowermost portion of the large recess portion 161.

A film member 163, which covers the large recess portion 161, and a film member 164, which covers the groove 162, are adhered to the second side surface 145*b* of the unit case 145 by thermal deposition. Therefore, the large recess portion 161 and the film member 163 constitute a pressure chamber 165, and the groove 162 and the film member 164 constitute a second ink lead-in passage 166. Further, a through hole 162*a*, which communicates with the filter-chamber recess portion 149, and a through hole 162*b*, which communicates with the groove 151, are formed in the groove 162. Accordingly, the second ink lead-in passage 166 communicates with the filter chamber 155 via the through hole 162*a* and communicates with the first ink lead-in passage 157 via the through hole 162*b*. That is, the ink supplied from the tube 138 is supplied to the supply chamber 156 via the filter-chamber recess portion 149, the through hole 162*a*, the second ink lead-in passage 166, the through hole 162*b*, and the first ink lead-in passage 157. The connection portion for the large recess portion 161, which forms the pressure chamber 165, and the through hole 152*a* becomes a liquid outlet E. The film members 163 and 164 are constituted of the same material as the film members 153 and 154.

A substantially disk-shaped pressure-receiving plate 167 is attached to that side of the film member 163 that is opposite to the pressure chamber 165. The pressure-receiving plate 167 has an outside diameter smaller than the inside diameter of the pressure chamber 165, and is arranged concentrically to the pressure chamber 165. The pressure-receiving plate 167 is formed of a material that is harder than the film member 163, e.g., a light plastic material, such as polyethylene or polypropylene. The pressure-receiving plate 167 is attached to the film member 163 by thermal deposition or by using an adhesive, a double-faced adhesive tape, or the like. As shown in FIG. 38, a spring 170, which urges the film member 163, is provided in the pressure chamber 165 in such a way as to press the film member 163 and the pressure-receiving plate 167 outward.

Meanwhile, a support hole 169 is formed in a partition 168, which partition defines the aforementioned supply chamber 156 and pressure chamber 165 of the unit case 145. The support hole 169 communicates with the supply chamber 156 and the pressure chamber 165. A movable valve 171 is slidably supported in the support hole 169. The movable valve 171 has a columnar rod portion 171*a* inserted into the support hole 169 and a substantially disk-shaped plate-like member 171*b*, which is larger than the outer shape of the support hole 169. The rod portion 171*a* and the plate-like member 171*b* are formed integrally. Describing this part in detail, the rod portion 171*a* is inserted in the support hole 169 and the spring 170 so that its distal end can be abutted on the film member 163. The plate-like member 171*b* is laid in the supply chamber 156. A circular seal member 172, such as an O-ring, is secured to the support hole 169 side of the plate-like member 171*b* in such a way as to surround the support hole 169. When the seal member 172 of the plate-like member 171*b* is moved away from the partition 168, therefore, the movable valve 171 connects the supply chamber 156 to the pressure chamber 165, and when the seal member 172 abuts on the partition 168, it covers around the support hole 169, and disconnects the supply chamber 156 and the pressure chamber 165 from each other. Further, a step portion is formed on the film member 153 side of the movable valve 171. A coil-like spring 174 is fitted, at its one end, on this step portion and the other end of the spring 174 is engaged with the aforementioned spring receiving member 159. Accordingly, the spring 174 urges the movable valve 171 toward the pressure chamber 165.

As shown in FIG. 37, the support hole 169 has four cutaway grooves arranged at equal intervals, and is formed into a substantially cross shape as a whole. With the rod portion 171*a* of the movable valve 171 inserted into the support hole 169, therefore, four ink passages 173 are formed by the rod portion 171*a* and the support hole 169.

Next, the action of the printer 121 will be discussed, which uses the valve unit 131 constructed as described above.

When the manufacture of the printer 121 is completed, its performance test is carried out. In the performance test, first, the ink cartridges 133B, 133C, 133M, and 133Y of the individual colors are retained in the cartridge holders 132. Then, pressurized air is supplied to the outer cases 134 of the individual ink cartridges 133B, 133C, 133M, and 133Y via the air-supply tubes 136B, 136C, 136M, and 136Y from the pressurizing pump 139, pressing the ink packs. Accordingly, the individual inks in the ink packs are pressurized. Then, with the recording head 129 covered with the cap member 141*a*, the unillustrated suction pump is driven. Accordingly, the inks are supplied to the valve units 131B, 131C, 131M, and 131Y via the tubes 138B, 138C, 138M, and 138Y. As the ink is supplied, the air in the filter chamber 155, the second ink lead-in passage 166, the first ink lead-in passage 157, the supply chamber 156 and pressure chamber 165, and the flow-out passage 158 is discharged from the recording head 129. At this time, because the large recess portion 161 of the pressure chamber 165 has the inclined surface 161*b* at its top portion, the upper space of the pressure chamber 165 has become smaller, and the film deforms in a shape along the shape of the pressure chamber to be able to easily increase the negative pressure in the pressure chamber 165, thus making it easier for the air to be discharged.

When the tubes 138B, 138C, 138M, and 138Y, the valve units 131B, 131C, 131M, and 131Y, and the unillustrated nozzles of the recording head 129 are filled with the inks, the suction pump is stopped. Then, as the movable valve 171 is urged by the spring 174, it moves toward the pressure chamber 165 and presses the seal member 172 against the partition 168, blocking the ink passages 173. Therefore, the movable valve 171 becomes the valve-closed state as shown in FIG. 38(*a*). That is, the supply chamber 156 and the pressure chamber 165 go into the non-communicating state, and the valve units 131 go into the self-sealing state.

Thereafter, the printer 121 performs test printing for the performance test. That is, the printer 121 prints by moving the carriage 125 rightward and leftward in FIG. 33 while adequately injecting the inks from the recording head 129 of the carriage 125, based on unillustrated test data.

When the ink is injected outside from the recording head 129 during test printing, the ink in the pressure chamber 165 is reduced so that the pressure chamber 165 has a negative pressure. Accordingly, the film member 163 is bent against the spring 170, and the center of the film member 163 and the pressure-receiving plate 167 are displaced toward the supply chamber 156. The bent film member 163 presses the rod portion 171*a* of the movable valve 171 against the spring 174, pressing the movable valve 171 toward the supply chamber 156. As the pressed movable valve moves toward the supply chamber 156 and the seal member 172 comes away from the partition 168, the movable valve 171 is put in the state of the valve-open state as shown in FIG. 38(*b*). That is, the supply chamber 156 communicates with the pressure chamber 165 via the ink passage 173, and the ink in the supply chamber 156 flows into the pressure chamber 165, nullifying the negative pressure in the pressure chamber 165. Accordingly, the movable valve 171 moves toward the pressure chamber 165 by the urging force of the spring 174, and goes into the valve-closed state again as shown in FIG. 38(*a*), thus stopping supplying the ink from the supply chamber 156 to the pressure chamber 165.

During the actual printing operation, the movable valve 171 is not frequently switched between the valve-open state and the valve-closed state, and the film member 163 is kept in the balanced state where it abuts on the end portion of the rod portion 171*a* of the movable valve 171. It works in such a way as to successively supply the ink to the pressure chamber 165 while opening the movable valve 171 slightly in accordance with the consumption of the ink.

That is, a variation in the pressure of the ink in the pressure chamber 165 is restricted within a predetermined range by opening/closing the movable valve 171, and is dissociated from a change in the pressure of the ink in the supply chamber 156. Even if a pressure change has occurred in the tube 138B, 138C, 138M, 138Y by the reciprocal movement of the carriage 125, therefore, its influence is not applied. As a result, the supply of the ink to the recording head 129 from the pressure chamber 165 is carried out well.

In a case where air remains in the pressure chamber 165 after initial filling, when the environment (temperature) under which the printer is placed changes (rises), the air may expand, possibly increasing the pressure in the pressure chamber 165. Because the spring 170 pushes the film member 163 open outward to absorb a change in the volume of the air in this embodiment, the pressure in the pressure chamber 165 does not go up.

When the ink is injected from the recording head 129 of the printer 121 in this manner, and the performance test is completed, the ink pack is detached from each ink cartridge 133B, 133C, 133M, and 133Y. Then, the carriage 125 moves on the top surface of the capping means 141, and the unillustrated suction pump is driven with the recording head covered with the cap member 141*a*. This discharges the ink through the recording head 129 from the filter chamber 155, the second ink lead-in passage 166, the first ink lead-in passage 157, the supply chamber 156, the pressure chamber 165, and the flow-out passage 158. As the liquid outlet E is formed in the lowermost portion of the pressure chamber 165, the ink is discharged smoothly at this time.

When the ink is mostly discharged, a cleaning liquid supply tube is connected to the cartridge holder 132 in place of each ink cartridge 133B, 133C, 133M, and 133Y. Then, a washing liquid is supplied to the tubes 138B, 138C, 138M, and 138Y, the valve units 131B, 131C, 131M, and 131Y, and the recording head 129 from the cleaning liquid supply tube and cleaning is performed.

The printer 121 of the present embodiment can afford the following effects.

(1) In the present embodiment, the liquid outlet E, which communicates with the flow-out passage 158, is formed in the lowermost portion of the pressure chamber 165 in the valve unit 131 of the printer 121. Therefore, the ink that has been used in the performance test of the printer 121 is discharged smoothly from the recording head 129. It is therefore possible to reduce the amount of the ink remaining in the valve unit 131 and to improve the liquid-discharging characteristics, so that the number of cleaning operations and the cleaning time can be reduced.

(2) In the present embodiment, the large recess portion 161 that forms the pressure chamber 165 of the valve unit 131 has the inclined surface 161*b* at its top portion, and the space above the liquid outlet E becomes smaller than the space below the liquid outlet E. At the time of the initial filling, therefore, the film member. 163 deforms in a shape along the shape of the pressure chamber 165, so that the negative pressure in the pressure chamber can be increased easily, which facilitates the discharge of the air, making it hard for the air to remain in the pressure chamber 165.

(3) In the present embodiment, the diameter of the peripheral wall portion 161*a* of the large recess portion 161 increases toward the film member 163. It is therefore easy to process the large recess portion 161. Further, the area of the film member 163 that receives pressure can be made larger, so that the movable valve 171 can be driven surely.

(4) In the present embodiment, the peripheral wall portion 161*a* of the large recess portion 161 is inclined in such a way as to increase its diameter toward the film member 163. Therefore, the film member 163 deforms in a shape along the shape of the pressure chamber 165, so that the negative pressure in the pressure chamber can be increased easily, making it easier to discharge the air.

(5) In the present embodiment, as the spring 170 is placed in the pressure chamber 165, the film member 163, and the pressure-receiving plate 167 can be pressed evenly, thus making it possible to more reliably prevent the film member 163 from being bent irregularly. Even if the air remains in the pressure chamber 165 after the ink is filled, and the temperature of the portion where the printer is placed rises, the spring 170 pushes the film member 163 open outward and absorbs the expansion of the volume, making it possible to prevent the pressure in the pressure chamber 165 from rising.

The fifth embodiment of the liquid injecting apparatus that embodies the present invention will be described according to FIG. 33 and FIGS. 39 to 41. The same reference numerals will be given to those portions of the following individual embodiments that are similar to those of the above-described embodiment and their detailed description will be omitted.

Figure 39:
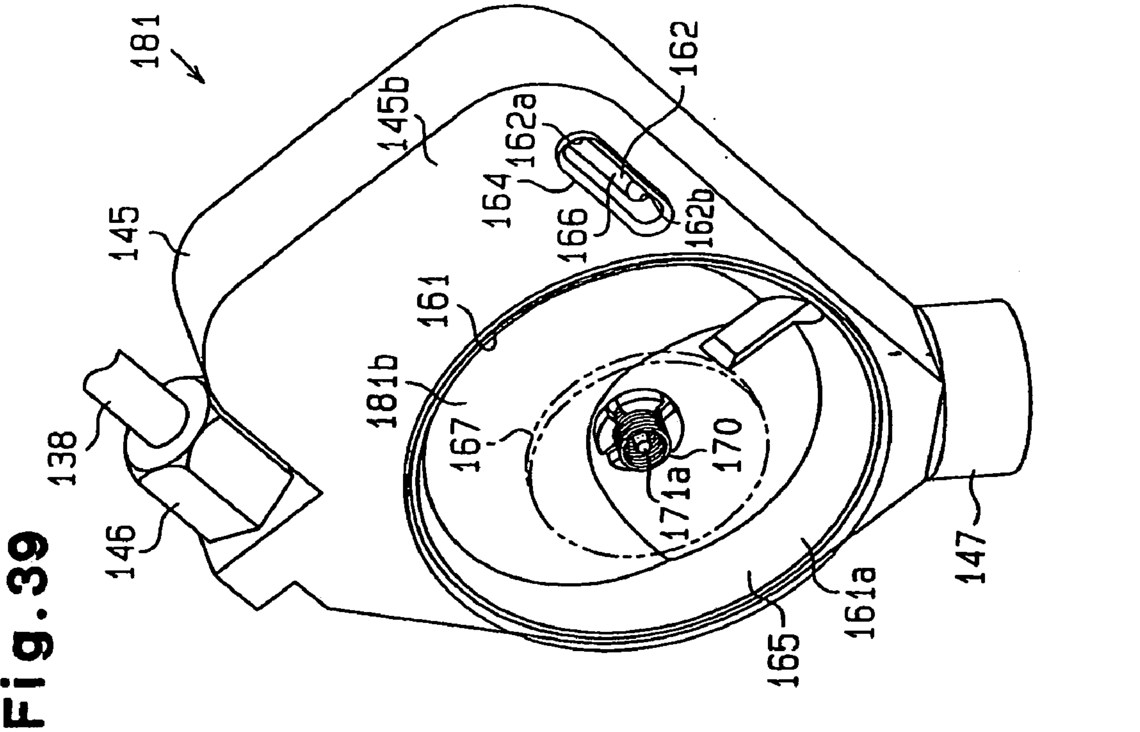
FIG. 39 is a perspective view of a valve unit mounted in a printer according to a fifth embodiment.
Figure 38B:
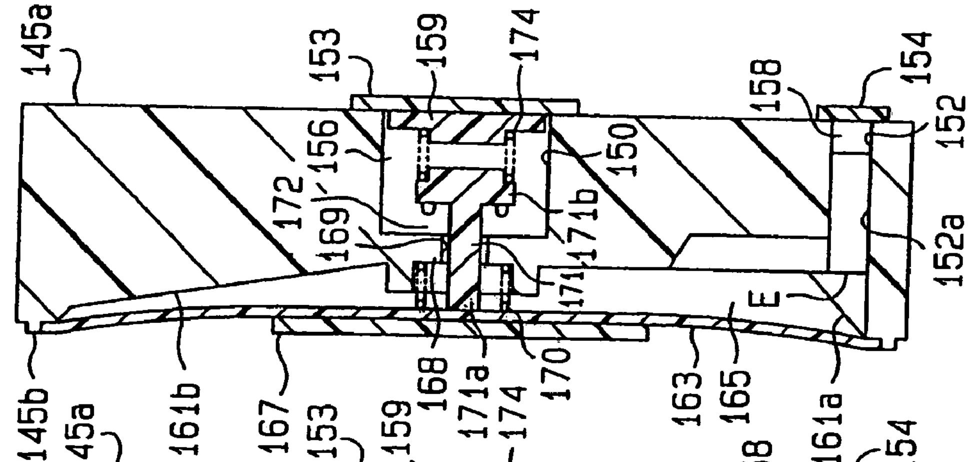
FIGS. 38(*a*) and 38(*b*) are cross-sectional views along the line 38-38 in FIG. 37, FIG. 38(*a*) shows when a valve is closed state and FIG. 38(*b*) shows when the valve is open.
Figure 38A:
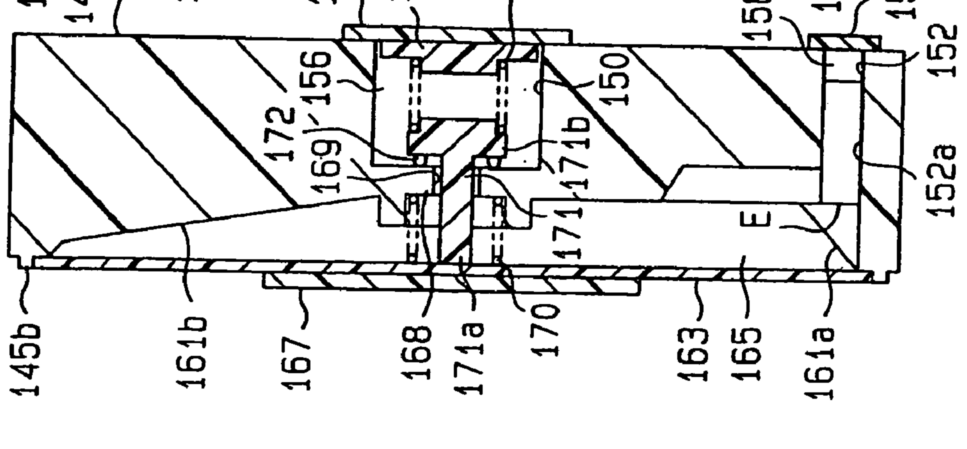
Figure 40B:
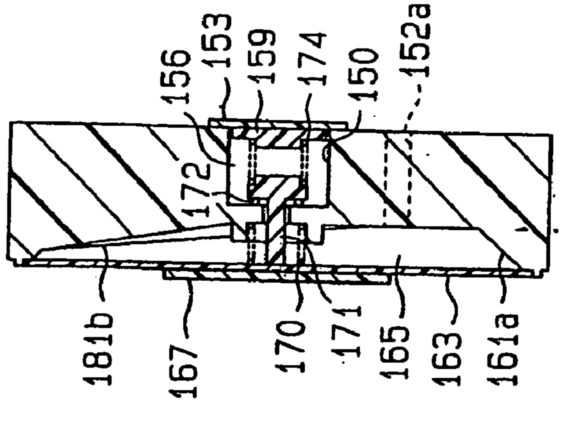
FIGS. 40(*a*) and 40(*b*) show a valve unit mounted in a printer according to the fifth embodiment, FIG. 40(*a*) is a plan view, and FIG. 40(*b*) is a cross-sectional view along the line 40*b*-40*b* in FIG. 40(*a*).
Figure 40A:
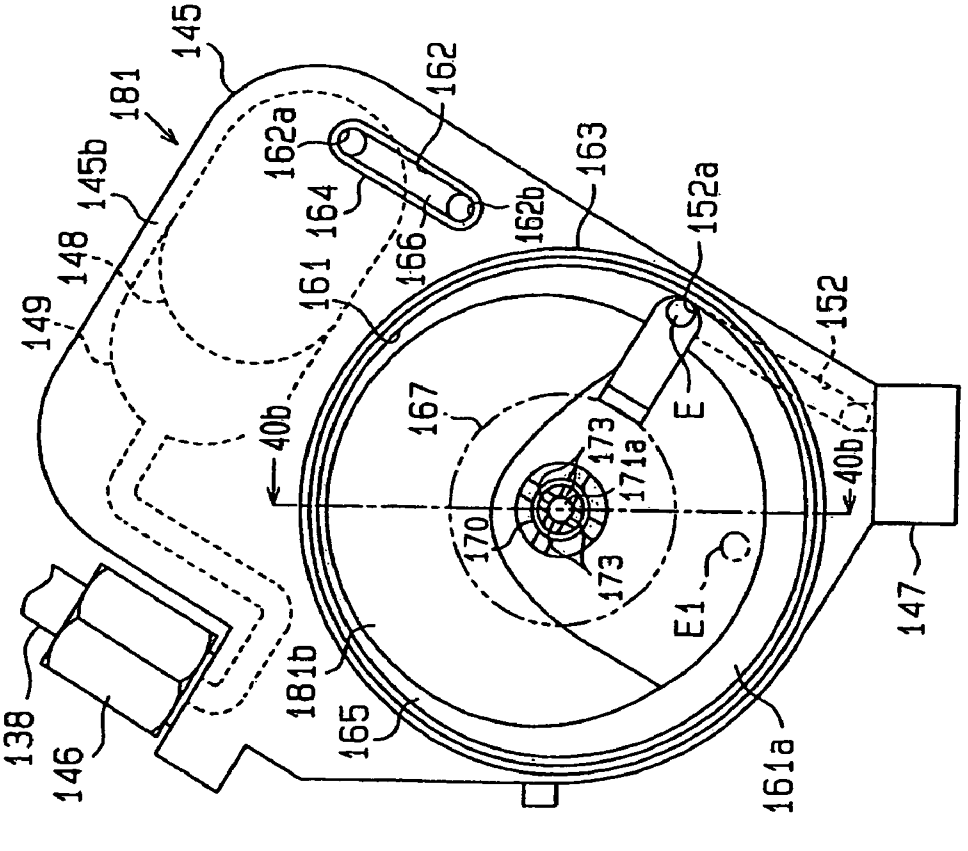

Note that the pressure-receiving plate 167 is indicated by a two-dash chain line in FIGS. 39 and 40(*a*) for the sake of descriptive convenience.

The printer 121 of the present embodiment, as indicated by a two-dash chain line in FIG. 33, has a passage valve 175 disposed in the flow passage of the tube 138. This passage valve 175 is fixed to the frame 122 in the vicinity of the ink cartridge 133 so that the amount of the ink flowing in the tube 138 can be changed.

The printer 121 of the present embodiment has a valve unit 181 shown in FIGS. 39 and 40, instead of the valve unit 131 of the fourth embodiment, mounted on the carriage 125. The passage valve 175 is disposed at the upstream side of the valve unit 181.

As shown in FIGS. 39 and 40, the valve unit 181 has a conical surface portion 181*b* which makes the large recess portion 161 shallower toward the peripheral portion of the large recess portion 161 from the vicinity of the support hole 169, in place of the inclined surface 161*b* of the fourth embodiment. In the valve unit 181, the liquid outlet E is formed in the position of 40% of the volume of the pressure chamber 165, not in the lowermost portion of the pressure chamber 165, and the through hole 152*a* is connected there. To describe in detail, the liquid outlet E is formed in such a way that, with the valve unit 181 mounted on the carriage 125, the volume of the pressure chamber 165 below the centerline of the horizontal plane that passes the center of the liquid outlet E becomes 40% of the volume of the pressure chamber 165.

The method of setting the position of this liquid outlet E will be discussed below.

The position of the liquid outlet E is set by providing the liquid outlet E in various positions in the pressure chamber 165 and executing the simulation of the relationship between the cleaning number and the density of the ink remaining in the pressure chamber 165 (residual ink density). This position is defined by the ratio of the volume of the pressure chamber 165 below the centerline, C, of the liquid outlet E (the volume of the hatched portion) to the volume of the pressure chamber 165. It is to be noted that the centerline of the liquid outlet E is a line extending horizontally when the valve unit 181 is mounted on the printer.

In case of performing cleaning, first, the suction pump of the capping means 141 is driven to suck the inks that have filled the valve unit 181 and the nozzles of the recording head 129. Subsequently, the cleaning liquid supply tube is connected to the tube 138, the cleaning liquid is supplied to the valve unit 181, and the nozzles of the recording head 129 as per the fourth embodiment. Then, the unillustrated suction pump is driven to discharge the ink from the recording head 129, and the entire process of cleaning is carried out.

FIG. 41 shows the relationship between the cleaning number and the residual ink density (the ratio of the ink included in the mixture of the ink discharged when the cleaning has been performed and the cleaning liquid). FIG. 41 shows the relationship between both the case where the passage valve 175 is not provided (no valve), as in the fourth embodiment, and the case where the passage valve 175 is provided (valve present), as in this embodiment.

In the "no valve" case, where the passage valve 175 is not provided, the negative pressure that is generated by the suction of the suction pump causes the cleaning liquid to be supplied to the pressure chamber 165 until a water level Hn (see FIG. 41), at which liquid in the pressure chamber 165 becomes about 50% of its volume, after which when the suction pump is stopped, and the movable valve 171 is closed. In this case, therefore, as the cleaning liquid fills the pressure chamber 165, the water level Hn is obtained, whereas when the mixture of the ink and the cleaning liquid is discharged, the water level H at the lowermost portion of the liquid outlet E is obtained.

In the "valve present" case, where the passage valve 175 is provided, the suction pump is driven with the passage valve 175 closed after the ink is discharged. At this time, the bubbles remaining in the pressure chamber 165 increases its volume or becomes stretched due to a reduction in pressure. When the passage valve 175 is opened thereafter, the cleaning liquid comes in at a burst and is supplied to a water level Ha (see FIG. 41), which is about 80% of the volume of the pressure chamber 165, and when the suction pump is stopped thereafter, the movable valve 171 is closed. In the case where there is the passage valve 175, therefore, as the cleaning liquid fills the pressure chamber 165, the water level Ha is obtained, whereas when the mixture of the ink and the cleaning liquid is discharged, the water level H is obtained.

Normally, the cleaning processing is executed frequently 10 times or less. The residual ink density that hardly causes clogging even if the ink remains in the nozzles of the recording head 129 for a long period of time is equal to or less than 0.1%.

As shown in the table in FIG. 41, in a case where the passage valve 175 is provided in the printer 121 as in this embodiment, if the liquid outlet E is located below the position of 40% or less of the volume of the pressure chamber 165 (the volume below the centerline C of the liquid outlet E is 40% or less of the volume of the pressure chamber 165), performing cleaning ten times makes the residual ink density approximately 0.1% or less. In a case where the passage valve 175 is not provided in the printer 121 as in the fourth embodiment, if the liquid outlet E is located below the position of 25% or less of the volume of the pressure chamber 165 (the volume below the centerline C of the liquid outlet E is 25% or less of the volume of the pressure chamber 165), performing cleaning ten times makes the residual ink density approximately 0.1% or less.

With the liquid outlet E being located in the position of 12% of the volume of the pressure chamber 165, in the "no valve" case, where the passage valve 175 is not provided, cleaning five times makes the residual ink density in the pressure chamber 165 approximately 0.1% or less. In the "valve present" case, where the passage valve 175 is provided, cleaning four times makes the residual ink density in the pressure chamber 165 approximately 0.1% or less. That is, the lower the liquid outlet E is provided, the faster the ink is discharged, ensuring the ink density of 0.1% or less, at which clogging does not occur, even if the ink remains in the nozzles of the recording head 129 for a long period of time.

In view of the above, the highest position of the liquid outlet E to achieve the residual ink density of 0.1% or less, at which ink clogging does not occur, through the normal cleaning times of 10 or less is the position of 40% of the volume of the pressure chamber 165. In the present embodiment, therefore, the liquid outlet E is provided in the position of 40% of the volume of the pressure chamber 165.

The printer 121 of the present embodiment undergoes the performance test after assembly is completed, as per the first embodiment. That is, as in the first embodiment, pressurized individual inks are supplied to the valve units 181B, 181C, 181M, and 181Y via the tubes 138B, 138C, 138M, and 138Y from the individual ink cartridges 133B, 133C, 133M, and 133Y. As a result, the air in the filter chamber 155, the second ink lead-in passage 166, the first ink lead-in passage 157, the supply chamber 156, the pressure chamber 165, and the flow-out passage 158 are discharged from the recording head 129.

When the ink is supplied to the tube 138, the valve unit 181, and the nozzle of the recording head 129, the passage valve 175 is closed, the carriage 125 is covered with the cap member 141 a and the suction pump is driven. Although the movable valve 171 has its seal member 172 set apart from the partition 168 and is open at this time, the passage valve 175 is closed so that the pressure in an area downstream of the passage valve 175 (on the recording head 129 side), such as the supply chamber 156 and the pressure chamber 165, is significantly reduced. The bubbles that have remained in the pressure chamber 165 increase the volumes and become stretched, due to the reduced pressure. When the passage valve 175 is opened thereafter, the ink flows into the pressure chamber 165 at a burst. Therefore, the bubbles that have been stretched in the pressure chamber 165 are discharged out together with the ink flow via the liquid outlet E, the flow-out passage 158, and the recording head 129.

The printer 121 prints for the performance test, and when this is completed, the individual ink cartridges 133B, 133C, 133M, and 133Y are detached from the cartridge holders 132, as per the fourth embodiment. Then, with the recording head 129 covered with the cap member 141*a*, the unillustrated suction pump is driven. That is, the ink is discharged via the recording head 129 from the filter chamber 155, the second ink lead-in passage 166, the first ink lead-in passage 157, the supply chamber 156, the pressure chamber 165, and the flow-out passage 158.

When most of the ink is discharged, each ink cartridge 133B, 133C, 133M, and 133Y is detached from the cartridge holder 132, then the cleaning liquid supply tube is connected to the tube 138 and cleaning is performed. To describe specifically, with the passage valve 175 closed, the carriage 125 is covered with the cap member 141*a*, and the suction pump is driven to significantly depressurize the pressure chamber 165. Thereafter, the passage valve 175 is opened to guide the cleaning liquid to the pressure chamber 165 at a burst to clean the interior of the pressure chamber 165. As this is repeated about ten times, cleaning is completed.

Therefore, this embodiment can afford the following effects in addition to effects similar to those described in paragraphs (2) to (5) in the above-described fourth embodiment.

(6) In this embodiment, the valve unit 181 is provided in the tube 138 in the downstream of the passage valve 175, and the liquid outlet E is located in the position of 40% or less of the volume of the pressure chamber 165 in the gravitational direction. Accordingly, the ink is smoothly substituted by adequately opening and closing the passage valve 175, so that fewer cleaning times of ten times can carry out cleaning to the residual ink density of 0.1% or less at which clogging hardly occurs even if the ink is remaining in the nozzles of the recording head 129. That is, the liquid-filling characteristics are improved and the number of cleaning times can be reduced.

(7) In this embodiment, the liquid outlet E is provided in a position in the upstream of the pressure chamber 165, i.e., in the position of 40% of the volume of the pressure chamber 165. That is, the liquid outlet E is provided in the highest position where 0.1% or less at which clogging hardly occurs even if the ink is remaining in the nozzles of the recording head 129 can be provided with fewer cleaning times of ten times. The higher the position of the liquid outlet E is, the better the ink-filling characteristics become; thus the present embodiment can make the ink-filling characteristics better, as well as making the ink-discharge characteristics better. That is, it is possible to make it harder for bubbles to remain in the pressure chamber 165 at the time of filling the valve unit 181 with the ink, thus the printing reliability hardly falls.

(8) In this embodiment, the conical surface portion 181*b* is provided in the large recess portion 161. The conical surface portion 181*b* makes the large recess portion 161 shallower toward the peripheral wall portion 161*a* than from the vicinity of the support hole 169 or the center of the large recess portion 161 of the valve unit 181. Even if the movable valve 171 is provided in the center of the pressure chamber 165, therefore, the pressure chamber 165 in the upstream of the liquid outlet E can be made smaller, and the film member 163 deforms in a shape along the shape of the large recess portion 161. Thus, the negative pressure in the pressure chamber 165 can be increased easily, making it possible to improve the ink-filling characteristic.

Figure 42B:
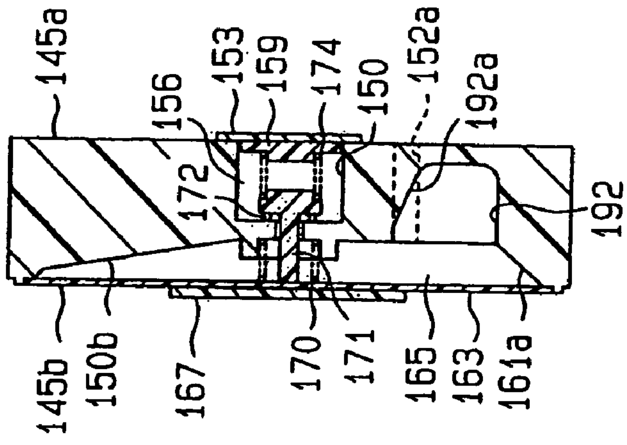
FIGS. 42(*a*) and 42(*b*) show a valve unit mounted in a printer according to a sixth embodiment, FIG. 42(*a*) is a plan view, and FIG. 42(*b*) is a cross-sectional view along the line 42*b*-42*b* in FIG. 42(*a*).
Figure 42A:
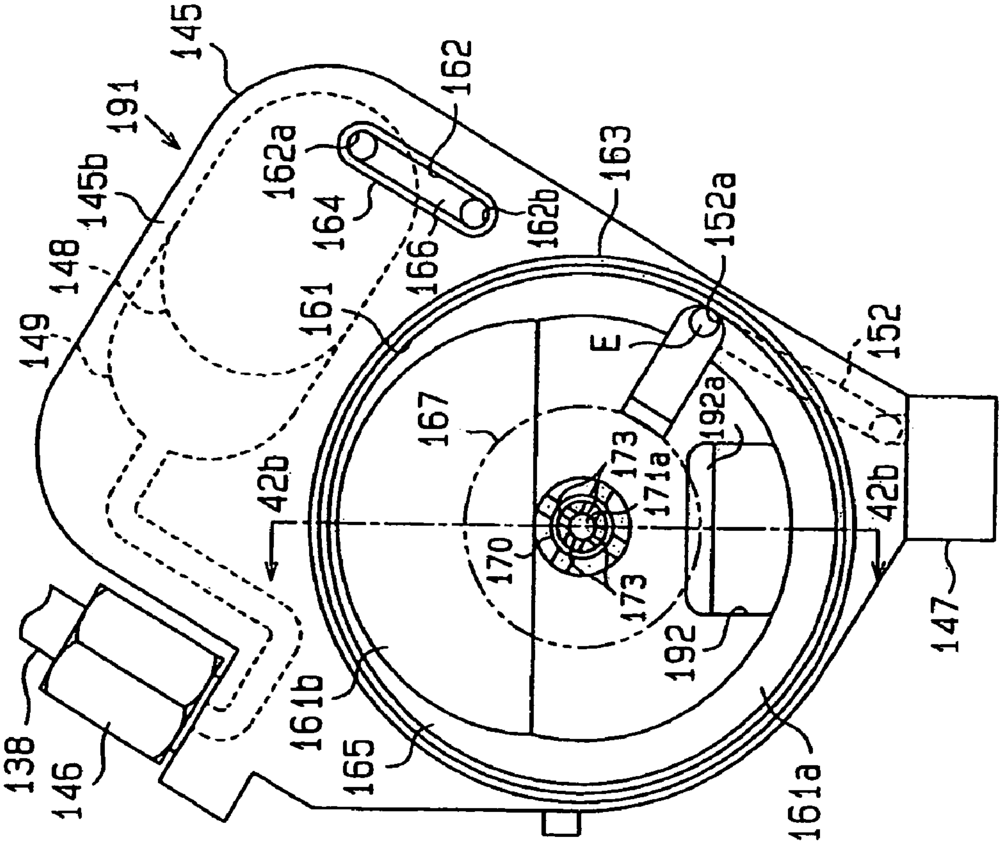

The sixth embodiment of the printer 121 as a liquid injecting apparatus which embodies the present invention will be described according to FIGS. 42(*a*) and 42(*b*) and FIG. 43. FIG. 42(*a*) and FIG. 43 show the pressure-receiving plate 167 removed for the sake of descriptive convenience.

Figure 43:
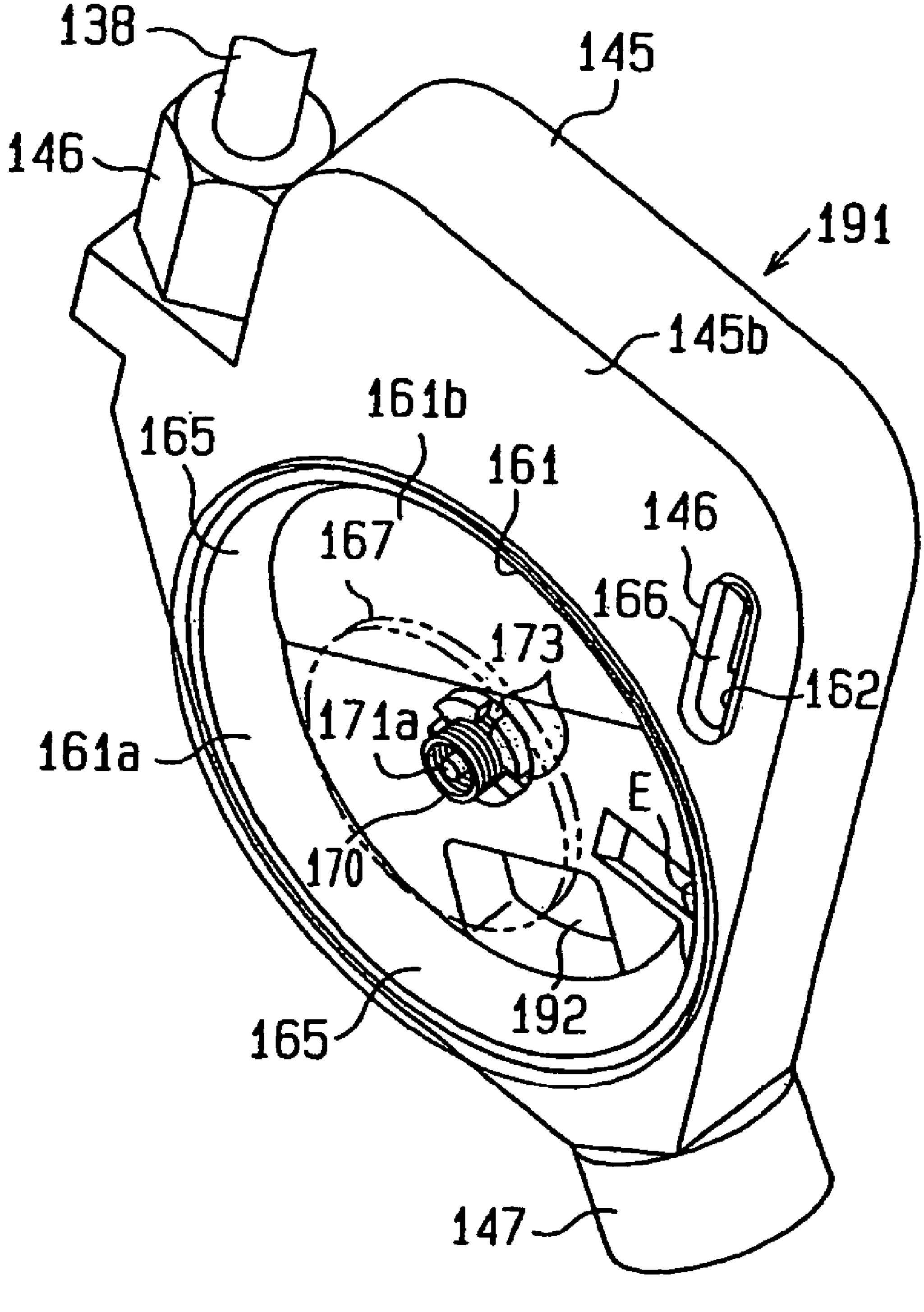
FIG. 43 is a perspective view of the valve unit mounted in the printer according to the sixth embodiment.

The printer 121 of the sixth embodiment is provided with a valve unit 191 shown in FIGS. 42 and 43 in place of the valve unit 131 of the fourth embodiment. This valve unit 191 has a recess portion 192 provided below the large recess portion 161 as a volume-increasing portion, which communicates with the large recess portion 161. This recess portion 192 is formed in such a way that at the time the valve unit 191 is mounted on the carriage 125, the space below the liquid outlet E has a larger volume. The top portion of the recess portion 192 becomes an inclined surface 192*a* inclined in such a way that the second side surface 145*b* side becomes higher.

Therefore, the printer 121 of the sixth embodiment achieves functions similar to those of the fourth embodiment. Further, this embodiment can afford the following effects in addition to effects similar to those described in paragraphs (2) to (5) and (7) in the above-described fourth embodiment.

(9) In the sixth embodiment, the recess portion 192 is provided to increase the volume of the lower portion of the pressure chamber 165. That is, the volume of the upper portion of the pressure chamber 165 becomes smaller relatively. This can make the ink volume in the pressure chamber 165 relatively larger with respect to the surface area of the film member 163, which forms the pressure chamber 165, so that a rise in the viscosity of the ink in the pressure chamber 165 can be minimized, even in a case where the printer 121 is not used for a long period of time and the water transmittance or oxygen/nitrogen transmittance from the film member 163 occurs. That is, even in case of using the printer 121 that has not been used for a long period, ink injection can be carried out well and the printer 121 can be provided with a high reliability.

(10) In the sixth embodiment, as the top portion of the recess portion 192 becomes the inclined surface 192*a* inclined in such a way that the opening side of the large recess portion 161 becomes higher, remaining bubbles in the recess portion 192 can be suppressed as much as possible.

The fourth to sixth embodiments may be modified as follows.

In the above individual embodiments, the liquid outlet E is provided in the peripheral wall portion 161*a* of the pressure chamber 165. This liquid outlet E should not necessarily have to be provided in the peripheral wall portion 161*a* but may be provided in a position closer to the center of the pressure chamber 165, for example, as indicated by a two-dash chain line in FIG. 40(*a*). This may be used as a liquid outlet E1.

Although the shape of the large recess portion 161 of the pressure chamber 165 is nearly cylindrical in the fourth to sixth embodiments, it may take another shape. That is, the upper space of the pressure chamber 165 does not have to be inclined but may have an elongated shape. Further, the volume-increasing portion, which is formed in the lower space of the pressure chamber 165, may take a prism shape or conical shape.

Although the through hole 152*a*, which is connected to the liquid outlet E of the large recess portion 161, is so formed as to extend horizontally as shown in FIGS. 38(*a*) and 38(*b*) in the fourth to sixth embodiments, it may be inclined with respect to the horizontal direction and connected to the liquid outlet E.

In the fourth to sixth embodiments, the shapes of the unit cases 145 of the valve units 131, 181, and 191 are not limited to a substantially rectangular parallelepiped. In a case where the valve units 131, 181, and 191 of the same shape differ in the angle of attachment to the carriage 125, the position of the liquid outlet E differs. The liquid outlet E is provided in the position of 25% or less of the volume of the pressure chamber 165 at the time the valve units 131, 181, and 191 are attached to the carriage 125 for usage. In a case where the passage valve 175 is provided, the liquid outlet E is provided in the position of 40% or less of the volume of the pressure chamber 165.

The seventh embodiment, which embodies the present invention, will be described in detail according to the drawings.

In general, a printer that prints an image on a large sheet of A0 size or the like consumes a large amount of ink, so that an ink cartridge that stores a large amount of ink is used. When the ink cartridge is mounted on the carriage, the carriage becomes heavy and a large load is applied thereto. Therefore, a conventional large printer shown in FIG. 53 takes a so-called off-carriage type structure where ink cartridges 271 of the individual colors are not mounted on a carriage 273 that is provided with a recording head 272.

Figure 53:
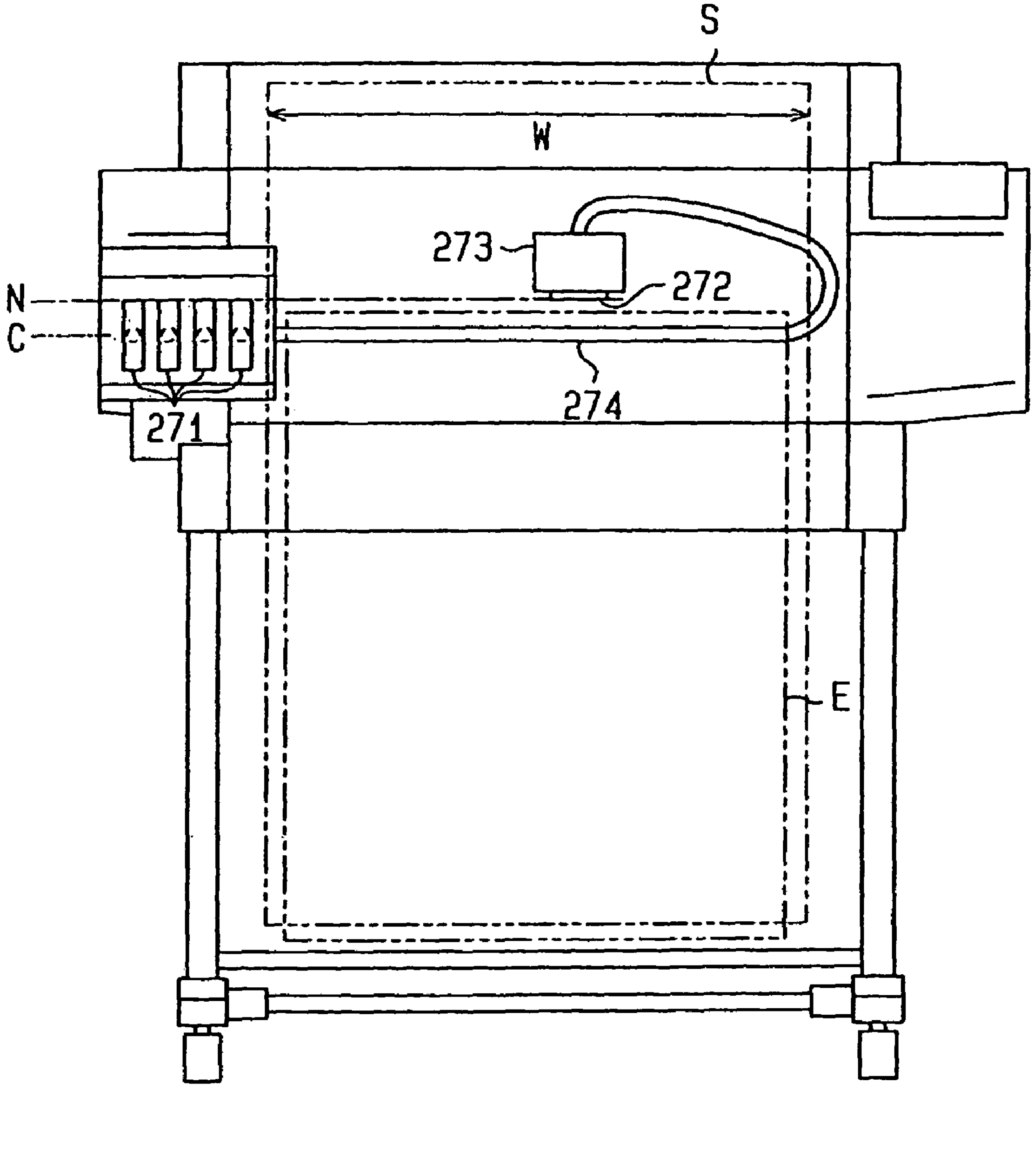
FIG. 53 is a front view of a printer according to prior art.
Figure 54:
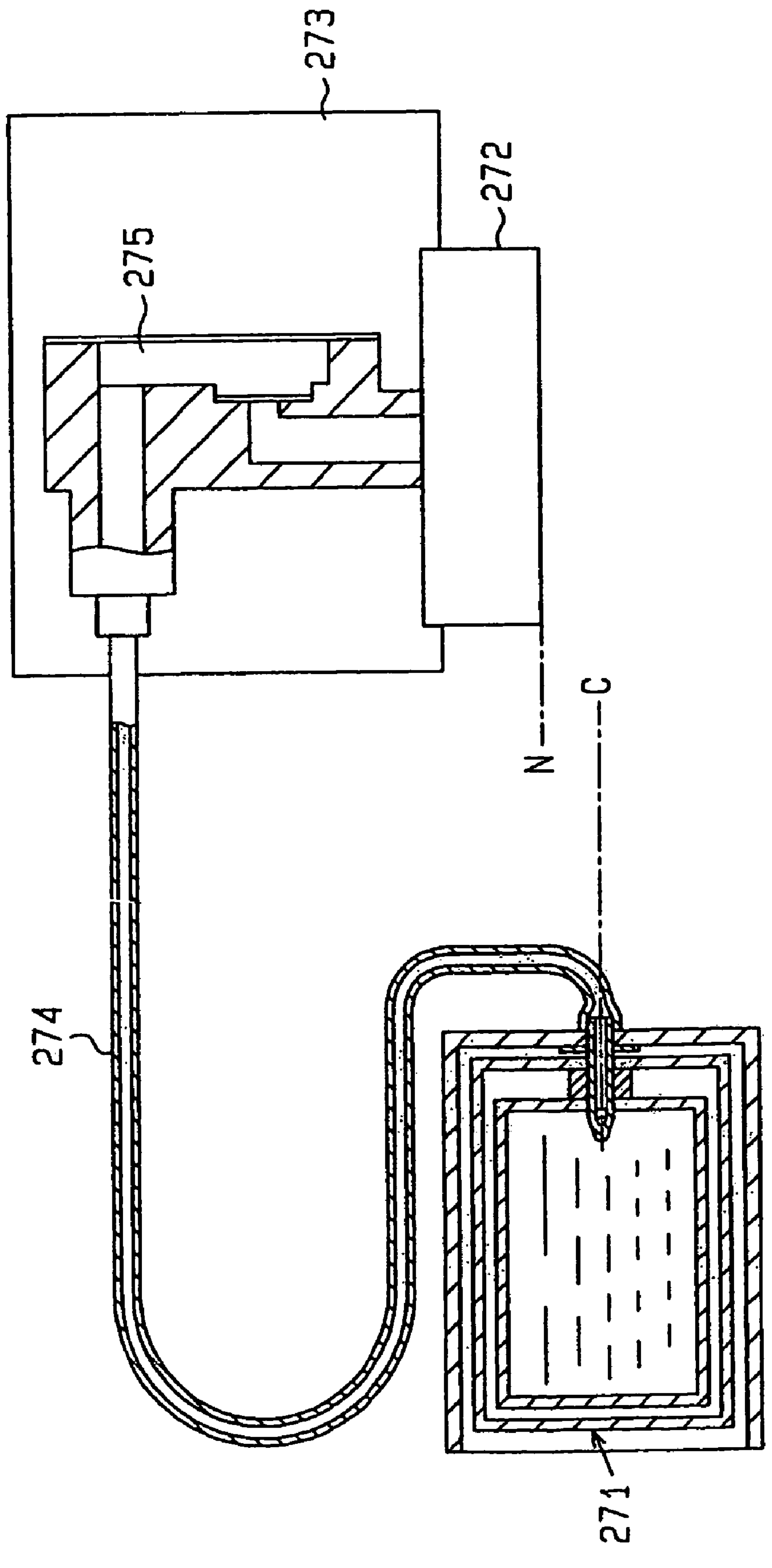
FIG. 54 is a schematic diagram showing the structure of the printer in FIG. 53.

The ink is supplied to the recording head 272 of the carriage 273 via each flexible tube 274 (only one shown in FIG. 53) from each ink cartridge 271 fixed in a replaceable manner. When the pressure in the tube 274 varies according to the movement of the carriage 273, therefore, it affects the ink discharge, and makes it difficult to discharge a predetermined amount of ink. In this respect, a pressure dumper chamber 275 is provided between the carriage 273 and the tube 274 as shown in FIG. 54, and a height position C of the discharge port of the ink cartridge 271 is so set as to be always lower than a height position N of the nozzle discharge port for the ink.

In this printer, an area E below the carriage 273 shown in FIG. 53 becomes a discharge area for a printed sheet S. To facilitate replacement of the ink in the ink cartridge 271 during printing, the ink cartridge 271 is provided at the side of the discharge area E of the sheet S. Therefore, the length of the tube 274 needs to be equal to, or greater than, the maximum width of printable sheet S or the maximum movement width W of the carriage 273.

Now, the pressure loss of the ink is proportional to the length of the tube 274 and is inversely proportional to the fourth power of the inside diameter. That is, in a case where the ink consumption amount increases with the multiple nozzle design and an increase in the printing speed, the tube diameter should be made large in order to guide surely the ink from the ink cartridge 271 to the carriage 273. This would increase the bending curvature of the tube, so that it would be difficult to make the printer compact.

Figure 44:
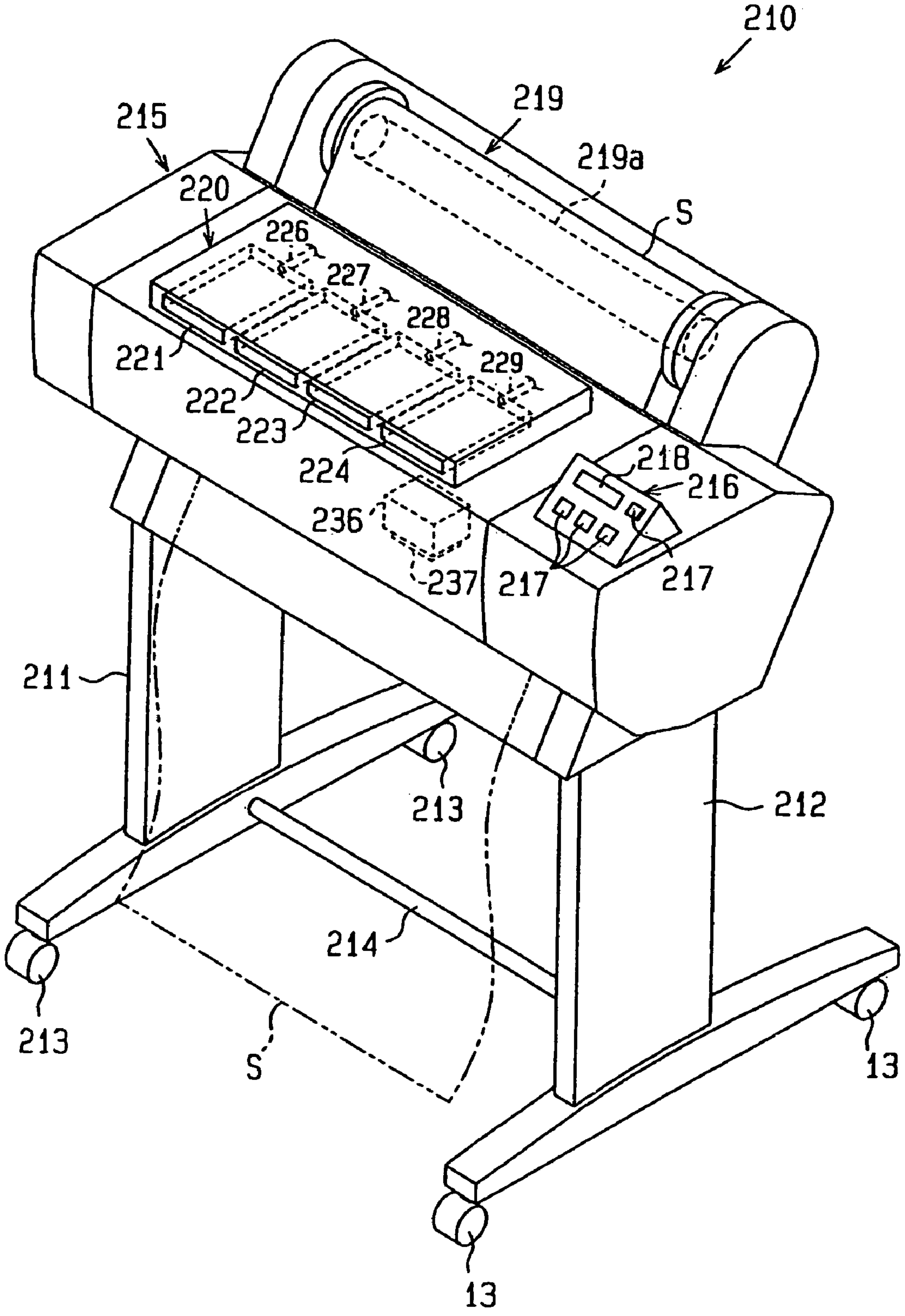
FIG. 44 is a perspective view of a printer according to a seventh embodiment.

The liquid injecting apparatus of the present embodiment can be made compact by reducing the loss of pressure that is applied to liquid in the liquid retainer. As shown in FIG. 44, an ink jet type printer (hereinafter referred to as printer) 210 as the liquid injecting apparatus of the present embodiment has a pair of supports 211 and 212 of an inverted T shape. A pair of casters 213 is provided under the individual supports 211 and 212 to facilitate the movement of the printer. The supports 211, 212 are provided with a link bar 214 to couple them, and a housing 215 with a substantially parallelepiped shape is supported on the supports.

An operation panel 216 is provided protrusively on the right upper portion of the housing 215. The operation panel 216 has a plurality of operation buttons 217 and a display screen 218. Therefore, the operation panel 216 can execute predetermined printing according to the selection of the operation buttons 217 by a user while displaying process contents on the display screen 218. The housing 215 is provided, at its backside, with an unillustrated connection portion through which an unillustrated computer is connected. Therefore, print data received from the computer is stored in an unillustrated memory incorporated in the housing 215.

A sheet-feeding portion 219 is provided on the backside of the housing 215, and a sheet S as a target rolled around a core 219*a* is retained in this sheet-feeding portion 219. The sheet-feeding portion 219 is also provided with an unillustrated sheet-feeding mechanism which feeds the sheet S to a platen 235 to be discussed later.

Figure 45:
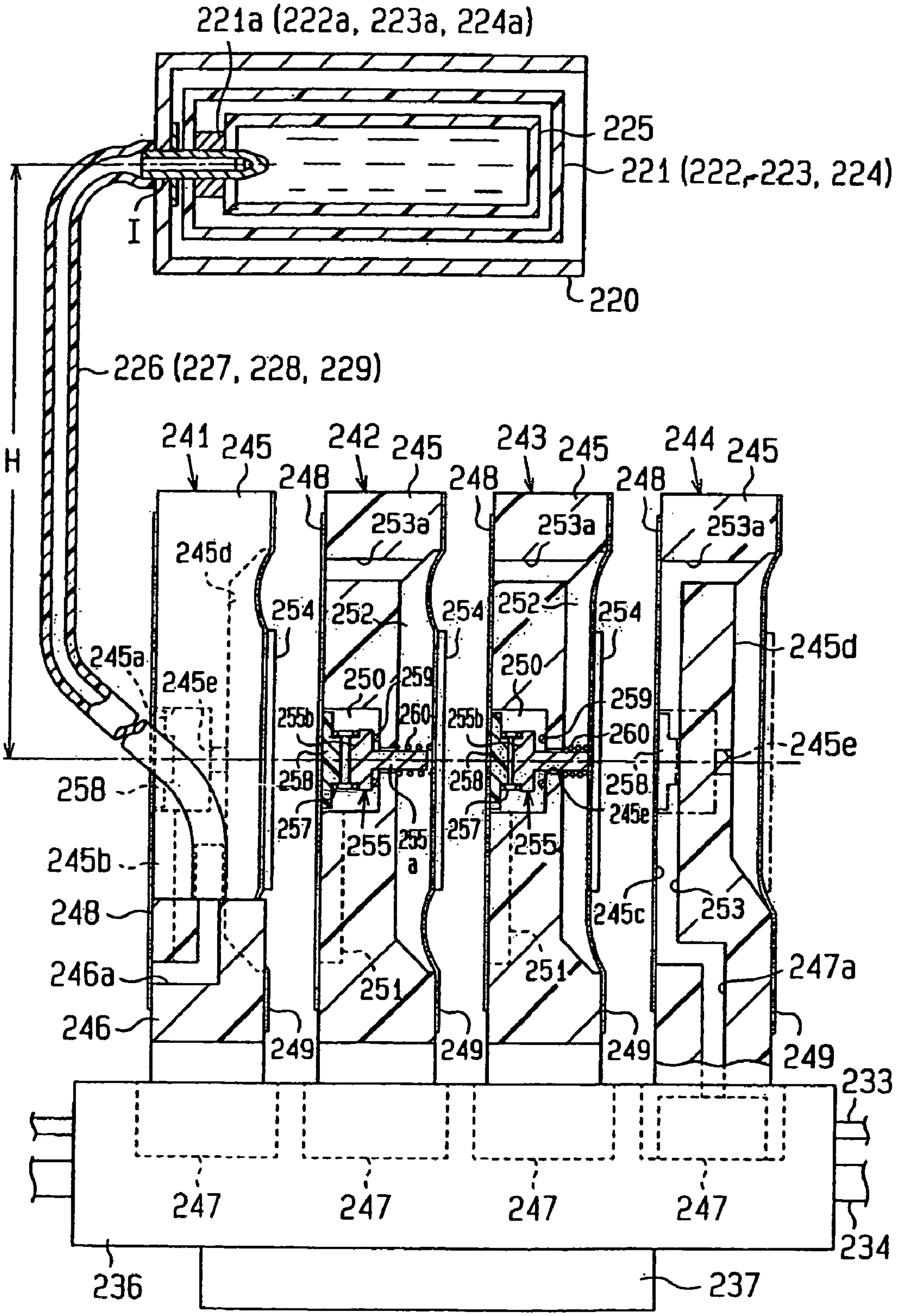
FIG. 45 is a partly enlarged cross-sectional view showing the essential portions of the printer in FIG. 44.

An ink cartridge retaining portion 220 is secured to the upper center portion of the outer portion of the housing 215. Ink cartridges 221, 222, 223, and 224 of the individual colors (e.g., four colors of cyan, magenta, yellow, and black) as liquid retainers are arranged in the ink cartridge retaining portion 220 in such a manner as to be replaceable from the front side. To describe specifically, the ink cartridges 221-224 are shaped like a flat parallelepiped box, their maximum area portions are laid out upward and downward, and the individual ink cartridge 221-224 are laid out on the same plane. As shown in FIG. 45, an ink pack 225 where ink or liquid is stored is incorporated in each ink cartridge 221-224. Provided in the centers of the ink packs 225 of the individual ink cartridge 221-224 are ink lead-out ports 221*a*, 222*a*, 223*a*, and 224*a*, which protrude outside. Needles I provided at the distal ends of flexible tubes 226, 227, 228, and 229 as supply tubes are respectively attached to the ink lead-out ports 221*a*, 222*a*, 223*a*, and 224*a*.

Figure 46:
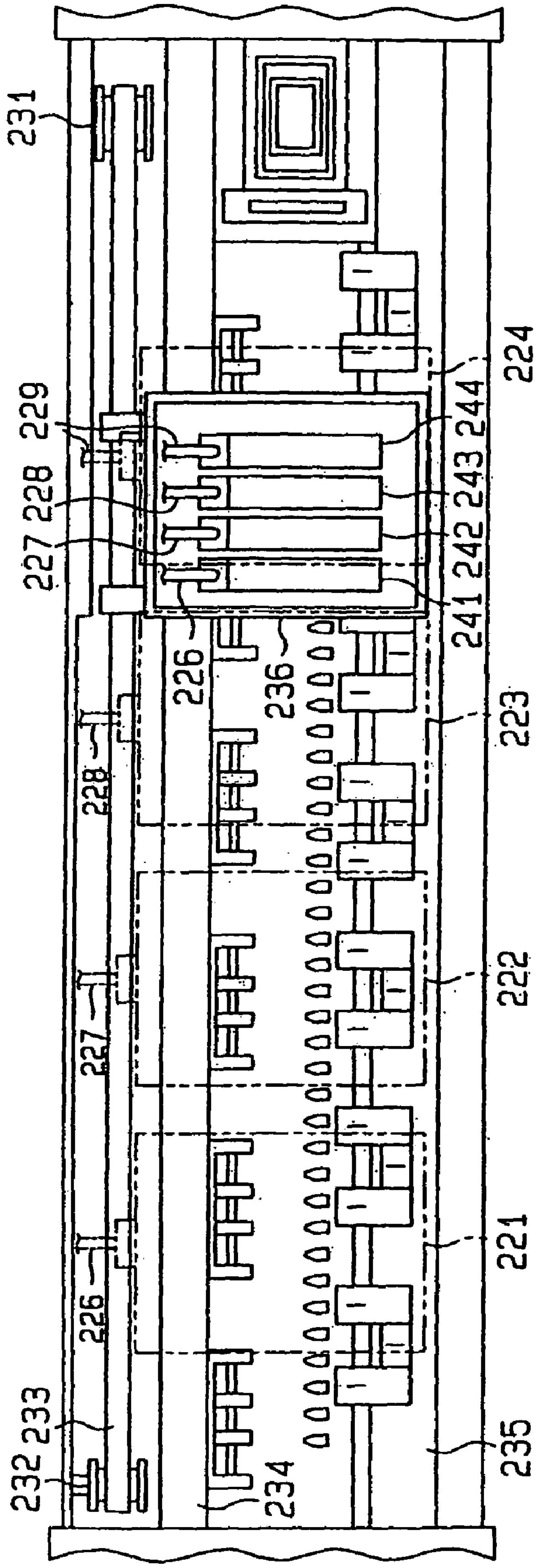
FIG. 46 is a plan view showing the essential portions of the printer in FIG. 44.

As shown in FIG. 46, disposed inside the housing 215 are a timing belt 233, put around a right and left pair of a drive pulley 231 and a driven pulley 232, and a guide shaft 234. The platen 235 on which the sheet S is placed is arranged in the lower center portion of the housing 215. Further, a carriage 236 is laid out above the platen 235. The carriage 236 is guided in engagement with the guide shaft 234 and is driven in engagement with the timing belt 233. Therefore, the carriage 236 is laid out above the platen 235 at a predetermined clearance with the platen 235 and is movable in the X direction.

Figure 47:
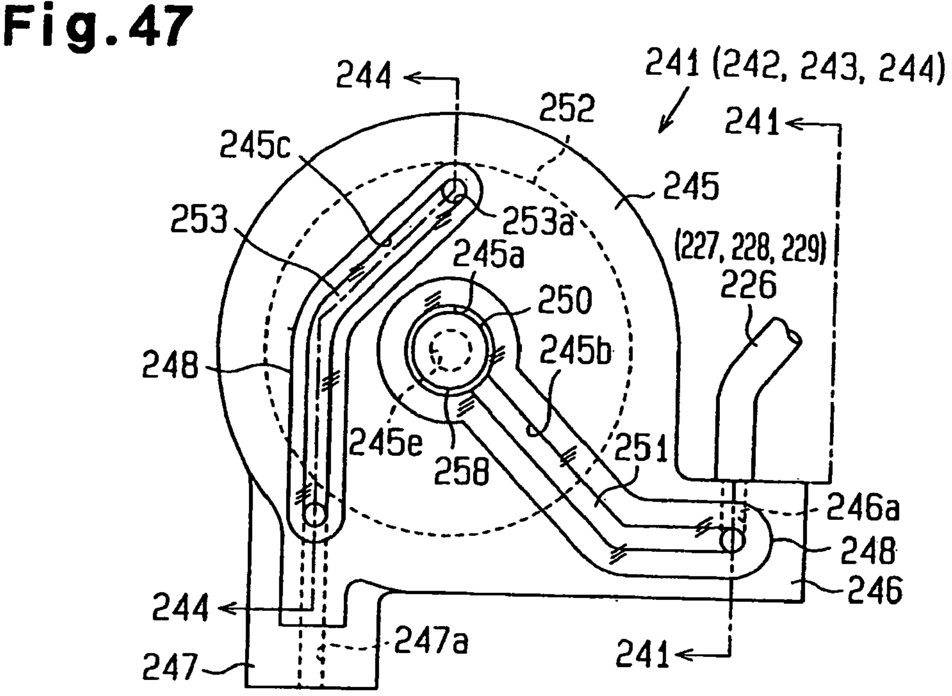
FIG. 47 is a left side view of the valve unit that is used in the printer in FIG. 44.

As shown in FIG. 45, the carriage 236 is provided with a recording head 237 in which a plurality of nozzles are provided for spurting the inks. Valve units 241 to 244, corresponding to the individual ink cartridge 221-224, are provided on the carriage 236 in such a way as to be positioned above the recording head 237. The individual valve units 241-244 have the same structure as shown in FIGS. 45 to 47. In FIG. 45, the valve unit 241 is shown in a cross-sectional view along the line 241-241 in FIG. 47, the valve units 242 and 243 are shown in a cross-sectional view along the line

Figure 48:
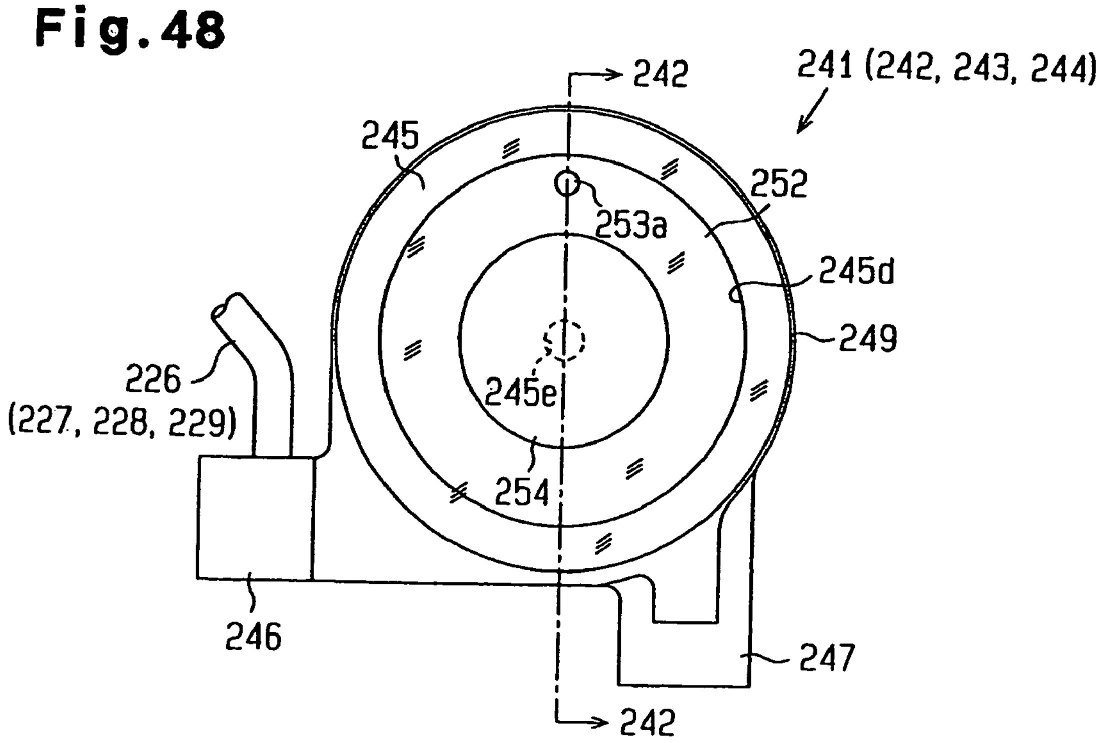
FIG. 48 is likewise a right side view of the valve unit.

242-242 in FIG. 48, and the valve unit 244 is shown in a cross-sectional view along the line 244-244 in FIG. 47.

As shown in FIGS. 45, 47, and 48, each valve unit 241-244 has a substantially cylindrical case 245 formed of, for example, a hard synthetic resin. As shown in FIG. 47, a substantially cylindrical recess portion 245*a* and two bent groove portions 245*b* and 245*c* are formed on the first side surface of the case 245. An inlet-side film 248 is adhered to the first side surface of the case 245 by thermal deposition in such a way as to cover those recess portion 245*a* and groove portions 245*b* and 245*c*. Accordingly, the recess portion 245*a* becomes a supply chamber 250, the groove portion 245*b* becomes a supply passage 251, which communicates with the supply chamber 250, and the groove portion 245*c* becomes a discharge passage 253.

As shown in FIG. 48, a substantially cylindrical recess portion 245*d* is formed on the second side surface of the case 245. A discharge-side film 249 as a drive body is adhered to the second side surface by thermal deposition, and accordingly, the recess portion 245*d* constitutes a pressure chamber 252.

It is important that the inlet-side film 248 and discharge-side film 249 are soft, are of materials that do not chemically influence the ink property, and have low water transmittance and low oxygen and nitrogen transmittance. In this respect, the films 248 and 249 have a structure such that a nylon film coated with vinylidene chloride (saran) is adhered to, and laminated on, a high-density polyethylene film or polypropylene film. This is to efficiently sense the pressure states of the supply chamber 250 and the pressure chamber 252 by both films. Note that the inlet-side film 248 and the discharge-side film 249 of the present embodiment are transparent.

Provided in the center of the case 245 are a through hole 245*e*, for communicating the supply chamber 250 and the pressure chamber 252 with each other, and a communication passage 253*a*, which communicates the pressure chamber 252 and the discharge passage 253 with each other.

Further formed in the case 245 are a connection portion 246, to which the tubes 226-229 are connected, and an ink lead-out portion 247, which is connected to the recording head 237. A passage-forming hole 246*a*, which connects the supply passage 251 to the tubes 226-229, is formed in the connection portion 246, and a passage-forming hole 247*a*, which extends to the recording head 237 from the discharge passage 253, is formed in the ink lead-out portion 247.

Therefore, the ink that reaches the passage-forming hole 246*a* of the connection portion 246 from the tubes 226-229 is supplied to the recording head 237 via the supply passage 251, the supply chamber 250, the through hole 245*e*, the pressure chamber 252, the communication passage 253*a*, the discharge passage 253, and the passage-forming hole 247*a*.

As shown in FIG. 45, a valve body 255 comprises a shaft portion 255*a* and a disk portion 255*b* formed integral with the shaft portion 255*a*; the shaft portion 255*a* is inserted in the through hole 245*e* and the disk portion 255*b* is located in the supply chamber 250. One end of a valve-closing spring 257 is pressed against the back of the disk portion 255*b* and the other end of the valve-closing spring 257 is pressed against a spring seat 258. Therefore, the valve-closing spring 257 urges the valve body 255 toward the discharge-side film 249 (rightward in the diagram). A seal member 259 is secured around the through hole 245*e* on the supply chamber 250 side (on the left-hand side in the diagram). As the valve-closing spring 257 urges the valve body 255 rightward in FIG. 45, therefore, the disk portion 255*b* of the valve body 255 is pressed against the seal member 259 and the valve body 255 blocks and closes the through hole 245*e* (see a valve unit 242 in FIG. 45).

A pressure-receiving plate 254 having rigidity is secured to the outside of the discharge-side film 249 in a concentric manner to the through hole 245*e* of the case 245. The pressure-receiving plate 254 is provided for preventing, as much as possible, the flexible discharge-side film 249 from being deformed every time it receives pressure from the pressure chamber 252 and bends toward the supply chamber 250 (leftward) similarly when it always receives the same pressure to thereby press the shaft portion 255*a* of the valve body 255 similarly. A negative-pressure holding spring 260 is disposed in the pressure chamber 252. This negative-pressure holding spring 260 abuts on around the through hole 245*e* and presses the discharge-side film 249. Therefore, the negative-pressure holding spring 260 prevents, as much as possible, the pressure in the pressure chamber 252 from becoming uneven, which would press the shaft portion 255*a* of the valve body 255 in an eccentric state, due to the dead weight of the ink in the pressure chamber 252.

Next, a method of setting the height H (mm) of the ink cartridge retaining portion 220 with respect to the valve body 255 of the valve unit 241-244 will be described referring to FIGS. 45, 49, and 50.

A pressure Pv in the pressure chamber 252 at the time the recording head is consuming the ink is equal to a release pressure Po of the valve body 255. As the release pressure Po is a negative pressure, it has a minus sign and is given by the following equation.

$$Pv=-Po \tag{1}$$

Figure 49:
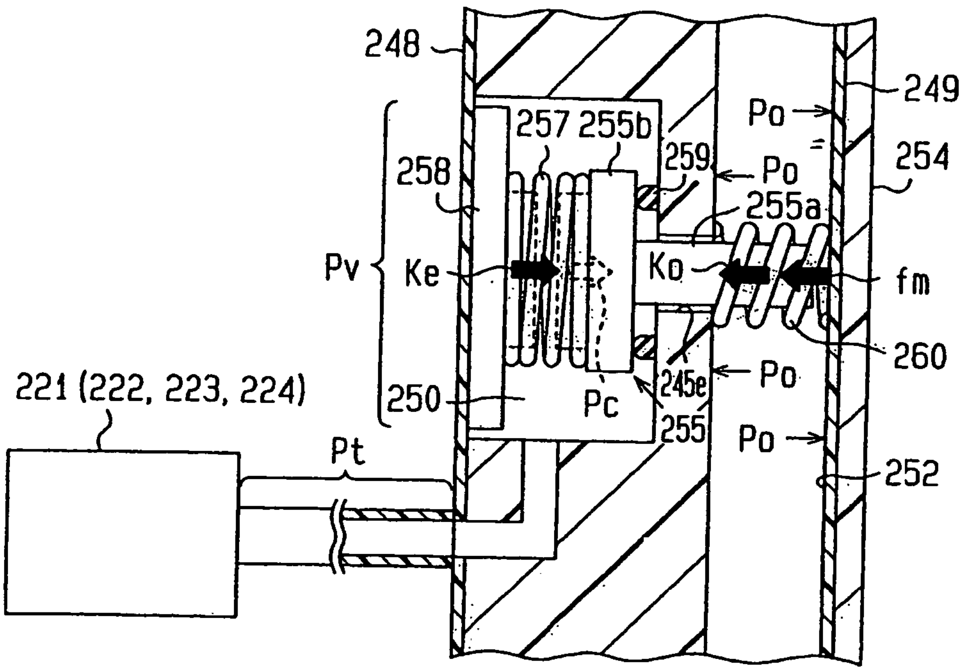
FIG. 49 is a conceptual diagram illustrating the forces that act on the valve unit.

This release pressure Po should be greater than the sum of the urging force Ke of the valve-closing spring 257 disposed in the supply chamber 250, the urging force Ko of the negative-pressure holding spring 260 disposed in the pressure chamber 252, resistive force fm at the time the discharge-side film 249 is deformed, and force Pc that is applied to the back of the disk portion 255*b* of the valve body 255 by position head H, as shown in FIG. 49. Thus, the release pressure Po is expressed by the following equation.

$$Po \geqq Ko+Ke+fm+Pc$$

Figure 50:
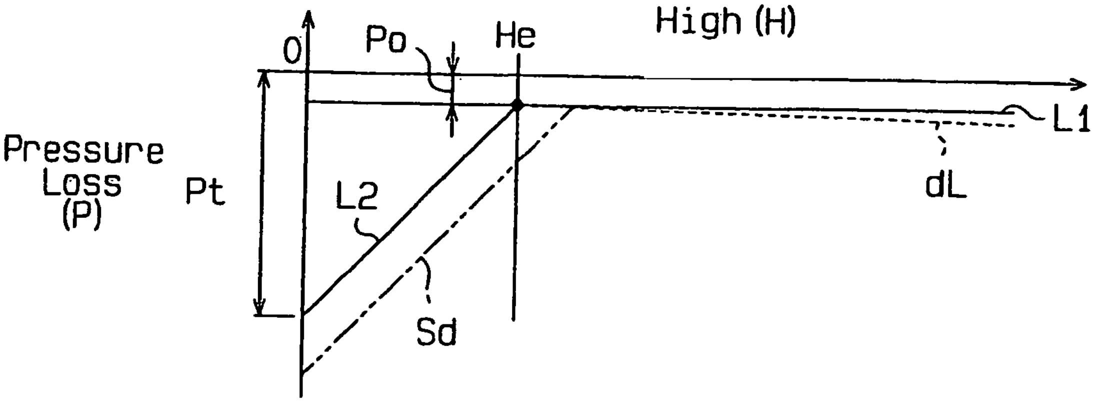
FIG. 50 is a diagram showing the relationship between the height of the valve unit and pressure loss.

Here, because the force Pc applied to the disk portion 255*b* of the valve body 255 changes by the position head, the pressure Pv in the pressure chamber 252 becomes as indicated by a broken line dL in FIG. 50. Because the area of the disk portion 255*b* is small, however, the force Pc applied to the disk portion 255*b* is negligibly small. Therefore, even if the position head H is changed, the large release pressure Po is not likely to be influenced, and the release pressure Po may be considered as being expressed by a straight line L1 of Po=a (constant).

Pressure Pk in the supply chamber 250 becomes the sum of the position head H, originated from the height from the ink cartridge retaining portion 220 to the supply chamber 250, and the pressure loss Pt of tube 226-229. As the pressure loss Pt is a negative pressure, it has a minus sign and is given by the following equation.

$$Pk=-Pt+H \tag{2}$$

In a case where the position head H is zero, Pk=−Pt, and as the position head H is increased, the pressure Pk in the supply chamber 250 becomes as indicated by a straight line L2 in FIG. 50.

Then, in a case where the pressure Pk in the supply chamber 250 indicated by the equation (2) during ink consumption is equal to or higher than the pressure Pv in the pressure chamber 252 indicated by the equation (1), the ink is sufficiently supplied to the pressure chamber 252 from the supply chamber 250. That is, $$Pk \geqq Pv = -Pt + H \geqq -Po$$

and from the above equation, a position head He for the ink to be sufficiently supplied to the pressure chamber 252 from the supply chamber 250 is expressed by the following equation.

$$He \geqq -Po + Pt$$

The pressure Pv in the pressure chamber 252 when the position head H is changed is expressed by a line connecting the straight line L1 and the straight line L2 in FIG. 50.

In case of setting H≧He, even when the recording head has consumed the ink for printing, the ink is sufficiently supplied to the pressure chamber 252 from the supply chamber 250. Therefore, the valve body 255 is opened/closed (self-sealed) while adjusting the pressure in the pressure chamber 252, so that the pressure Pv in the pressure chamber 252 becomes equal to −Po, and Pv=−Po is satisfied.

In case of setting H<He, when the recording head has consumed the ink for printing, the supply of the ink to the pressure chamber 252 from the supply chamber 250 becomes insufficient, and to overcome it, the ink is supplied to the pressure chamber 252 with the valve body 255 always open. In this case, the pressure Pv in the pressure chamber 252 is expressed by the following equation, $$Pv = -Po - H.$$

Because the pressure in the pressure chamber 252 becomes the supply pressure to the recording head, the smaller the better. The height H of the ink cartridge retaining portion 220 in the present embodiment should be equal to or greater than He.

Next, the height H (mm) of the ink cartridge retaining portion 220 will be discussed using specific values. For example, let the pressure loss Pt of the tubes 226-229 going from the ink cartridges 221-224 to the supply chamber 250 be 150 (mm $H_2O$) and the release pressure Po of the valve body 255 be 100 (mm $H_2O$). At this time, the position head He for the ink to be sufficiently supplied to the pressure chamber 252 from the supply chamber 250 is expressed as follows.

$$He = -100\ (\text{mm } H_2O) + 150\ (\text{mm } H_2O) = 50\ (\text{mm } H_2O)$$

In a case where the release pressure Pv and the pressure loss Pf are equal and, for example, the tubes 226-229 are made longer so that the pressure loss Pt is increased to 200 (mm $H_2O$), the position head He becomes high, 100 (mm $H_2O$), as indicated by a two-dash chain line in FIG. 50.

The action of the printer of the present embodiment will be described next.

In using the printer 210, the sheet S rolled around the core 219*a* is retained in the sheet-feeding portion 219 and the ink cartridges 221-224 of the individual colors are retained in the ink cartridge retaining portion 220. The ink lead-out ports 221*a* to 224*a* of the ink cartridges 221-224 are engaged with the needles I.

When receiving print data from the unillustrated, connected computer, the printer 210 stores the print data in the memory. Next, when printing of the print data is executed, the sheet S is led to the housing 215 by the unillustrated sheet-feeding apparatus. When the sheet S comes between the platen 235 and the carriage 236, the printer 210 performs printing by moving the carriage 236 in the X direction while adequately spurting the inks from the discharge port of the recording head 237 of the carriage 236.

To describe specifically, when the ink is spurted from the recording head 237, the volume of the pressure chamber 252 of the valve unit 241-244 is reduced by the volume of the spurted ink, generating a given negative pressure. This negative pressure becomes the aforementioned release pressure Po. This negative pressure causes the discharge-side film 249 to deform toward the inlet-side film 248 against the valve-closing spring 257 and the negative-pressure holding spring 260 (see the valve unit 243 in FIG. 45). As the discharge-side film 249 deforms, the pressure-receiving plate 254 fixed to the discharge-side film 249 moves and abuts on the valve body 255, pushing the valve body 255 leftward. As a result, the valve body 255 moves leftward and the disk portion 255*b* comes away from the seal member 259, so that the supply chamber 250 communicates with the pressure chamber 252 via the through hole 245*e*, causing the ink to flow into the pressure chamber 252 from the supply chamber 250. As the ink flows into the pressure chamber 252, the negative pressure in the pressure chamber 252 is nullified and the valve body 255 moves rightward by the urging force of the valve-closing spring 257 and is closed (see the valve unit 242 in FIG. 45).

Every time the printer 210 moves the carriage 236 reciprocally in the X direction while spurting the ink in the above-described manner, it drives the unillustrated sheet-feeding mechanism to move the sheet S toward the lower portion of the printer 210. Then, it executes printing while repeating the above-described series of operations.

The printer 210 of the present embodiment can afford the following effects.

(a) In this embodiment, the ink cartridges 221 to 224 are movable areas of the carriage 236 and are provided at the upper portion of the recording head 237. As the inks are supplied to the recording head 237 by the head differences of the ink cartridges 221 to 224 from the recording head 237, it is unnecessary to provide an ink supplying apparatus, such as a pressurizing pump. Because the lengths of the tubes 226-229 have only to extend from the individual ink lead-out ports 221*a*-224*a* to the farthest movable range of the carriage 236, it is possible to make the tubes 226-229, which supply the inks to the recording head 37, shorter than those of the conventional case. That is, because the pressure loss can be made smaller, the inks can be supplied surely to the recording head 237 even if the height H from the recording head 237 to the ink cartridges 221-224 is made lower. Therefore, the height H from the recording head 237 to the ink cartridges 221-224 can be set lower than the conventional one, so that the printer 210 can be made compact.

(b) In the present embodiment, the valve units 241-244, which are closed when the pressure in the supply chamber 250 is higher than the pressure in the pressure chamber 252, are provided on the upstream side of the recording head 237 of the carriage 236. Even if the ink cartridges 221-224 are located above the recording head 237, the inks will not leak out from the recording head by the pressure. As the inks in the ink cartridges 221-224 are supplied to the recording head 237 by using the head differences from the recording head 237 to the ink cartridges 221-224, it is unnecessary to provide a large-scale apparatus, such as a pressurizing pump for supplying the inks to the recording head 237. This can make the printer 210 smaller. In addition, as the ink cartridge retaining portion 220 is provided at the upper portion of the carriage 236, even in a case where the printed sheet S is discharged below the carriage 236 during printing, ink replacement can be performed easily.

(c) In the present embodiment, the height H from the valve body 255 of the valve unit 241-244 to the ink cartridge retaining portion 220 is the position head that is equal to the sum of the pressure head originated from the pressure loss Pt of the tube 226-229 and the pressure head originated from the release pressure Po (negative pressure) of the valve body 255 of the valve unit 241-244. Therefore, the inks in the ink cartridges 221-224 can be supplied surely to the recording head 237 by the energy that is generated by the height H. Thus, the inks can be spurted smoothly from the recording head 237.

(d) In the present embodiment, the height H from the valve body 255 of the valve unit 241-244 to the ink cartridge retaining portion 220 is the position head that is equal to the sum of the pressure head originated from the pressure loss Pt of the tube 226-229 and the pressure head originated from the release pressure Po (negative pressure) of the valve body 255 of the valve unit 241-244. That is, it becomes the lowest height H that can allow the inks in the ink cartridges 221-224 to be supplied surely to the recording head 237. It is therefore possible to make the printer 210 smaller.

(e) In the present embodiment, as the ink cartridges 221-224 are formed in the shape of a flat box and are laid out flat, the height size of the ink jet type printer 210 can be made smaller.

Figure 51:
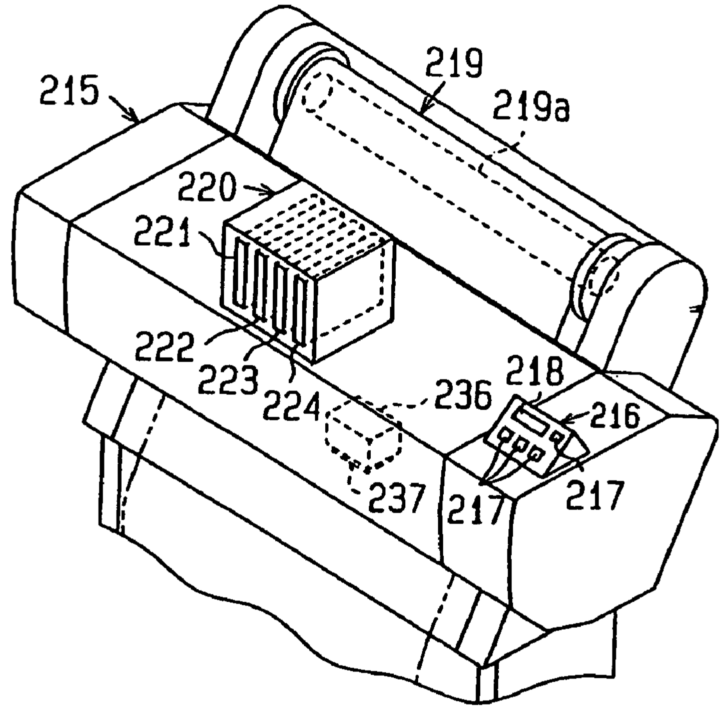
FIG. 51 is a perspective view showing the essential portions of a printer according to an eighth embodiment.
Figure 52:
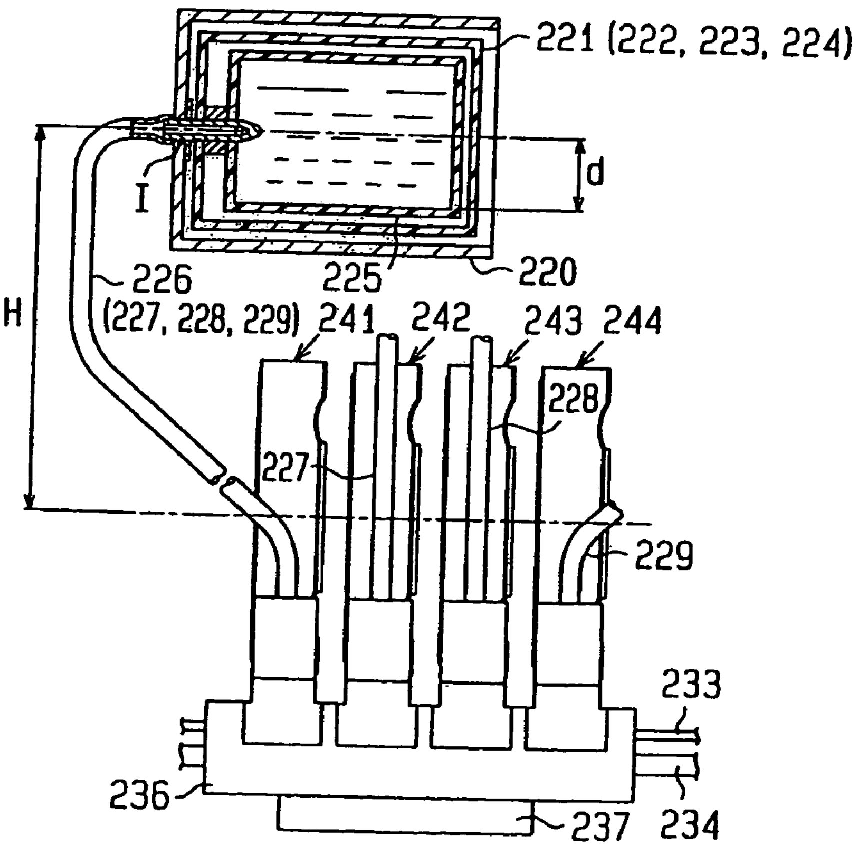
FIG. 52 is a partly enlarged cross-sectional view showing the essential portions of the printer in FIG. 51.

The eighth embodiment of the liquid injecting apparatus that embodies the present invention will be described according to FIG. 51 and FIG. 52. It is to be noted however that the same reference numerals will be given to those portions of the following individual embodiments that are similar to those of the seventh embodiment and their detailed description will be omitted.

The ink cartridge retaining portion 220 of the printer 210 as the liquid injecting apparatus of the eighth embodiment is laid out nearly in the center of the printer 210 and retains vertically-elongated ink cartridges 221-224.

Further, in this embodiment, the height H from the valve body 255 of the valve unit 241-244 to the ink cartridge 221-224 is set as given by the following equation where d is a change in hydrostatic head in the ink pack 225 of the ink cartridge 221-224.

$$H=He+d \qquad (3)$$

That is, the height H of the ink cartridge retaining portion 220 in the present embodiment takes a change in hydrostatic head in the ink cartridges 221-224 caused by ink consumption into consideration.

In the printer 210 of the present embodiment, therefore, the ink cartridges 221-224 are also retained in the ink cartridge retaining portion 220 and are engaged with the needles I, and the valve bodies 255 are in a closed state. When printing is executed, the printer 210 performs printing by spurting the inks from the recording head 37 of the carriage 236 while feeding the sheet S to between the platen 235 and the carriage 236, and moves the carriage 236 in the X direction, as per the seventh embodiment.

When the ink in the ink cartridge 221-224 is consumed thereafter, the hydrostatic head in the ink cartridge 221-224 becomes a negative pressure. Therefore, there is a possibility that the supply of the ink from the supply chamber 250 to the pressure chamber 252 becomes insufficient, significantly lowering the pressure in the pressure chamber 252, due to the negative pressure that is generated by a reduction in the volume in the pressure chamber 252 as a result of the ink being spurted from the discharge port of the nozzle of the recording head 237. However, the height H in the present embodiment is set to a value that is the position head He of the seventh embodiment plus the hydrostatic head change d originated from the depth of the ink in the ink cartridge 221-224. Even if most of the ink in the ink cartridge 221-224 is consumed, therefore, the pressure in the supply chamber 250 is higher than the pressure in the pressure chamber 252 so that the ink is sufficiently supplied to the pressure chamber 252 from the supply chamber 250, thus adequately keeping the pressure in the pressure chamber.

Therefore, this embodiment can acquire the following effects in addition to as well as effects similar to (a), (b) and (d) of the above-described embodiment.

(f) In the present embodiment, the ink cartridges 221-224 are retained in the ink cartridge retaining portion 220 in such a way as to be nearly in the center of the printer 210 and horizontally aligned. Therefore, the lengths of the tubes 226-229 which supply inks to the individual valve units 241-244 from the individual ink cartridges 221-224 can be set to approximately a half the movable range of the carriage 236. As the tubes 226-229 over which inks are supplied to the carriage can be made shorter, the pressure loss can be made smaller and the printer 210 can be made more compact.

(g) In the present embodiment, the height H is set to a value that takes into consideration a change in hydrostatic head originated from the depth of the ink in the ink cartridge 221-224. Even if most of the ink in the ink cartridge 221-224 is consumed, therefore, the ink in the ink cartridge 221-224 can be supplied to the recording head 237 smoothly.

The seventh and eighth embodiments may be modified as follows.

In each embodiment described above, the negative-pressure holding spring 260 is disposed in the pressure chamber 252. This negative-pressure holding spring 260 may be omitted for cost reduction or the like.

In the seventh embodiment, the height H from the valve body 255 of the valve unit 241-244 to the ink cartridge 221-224 is set equal to the position head He, which is the sum of the pressure head originated from the pressure loss Pt of the tube 226-229 and the pressure head originated from the release pressure Po (negative pressure) of the valve body 255 of the valve unit 241-244. In the eighth embodiment, the height H is set equal to He+d. However, the height H from the valve body 255 of the valve unit 241-244 to the ink cartridge 221-224 need not be exactly equal to the position head He but has only to be equal to or greater than the position head He. Even in this case, the inks in the ink cartridges 221-224 can be supplied to the valve units 241-244 more surely.

In the eighth embodiment, the ink cartridge retaining portion 220, which retains the ink cartridges 221-224, is placed in the center of the housing 215. However, the ink cartridge retaining portion 220 need not be in the center of the ink jet type printer 210 but has only to be in the movable range of the carriage 236. In this case too, the tubes 226-229 can be made shorter than the conventional ones, so that it is possible to reduce the pressure loss and contribute to making the printer 210 compact.

The description of the individual embodiments given above has been given of the ink cartridges 221-224 retaining the ink packs 225. Instead, for example, ink cartridges 221-224 which store inks in porous substances may be used.

Figure 55:
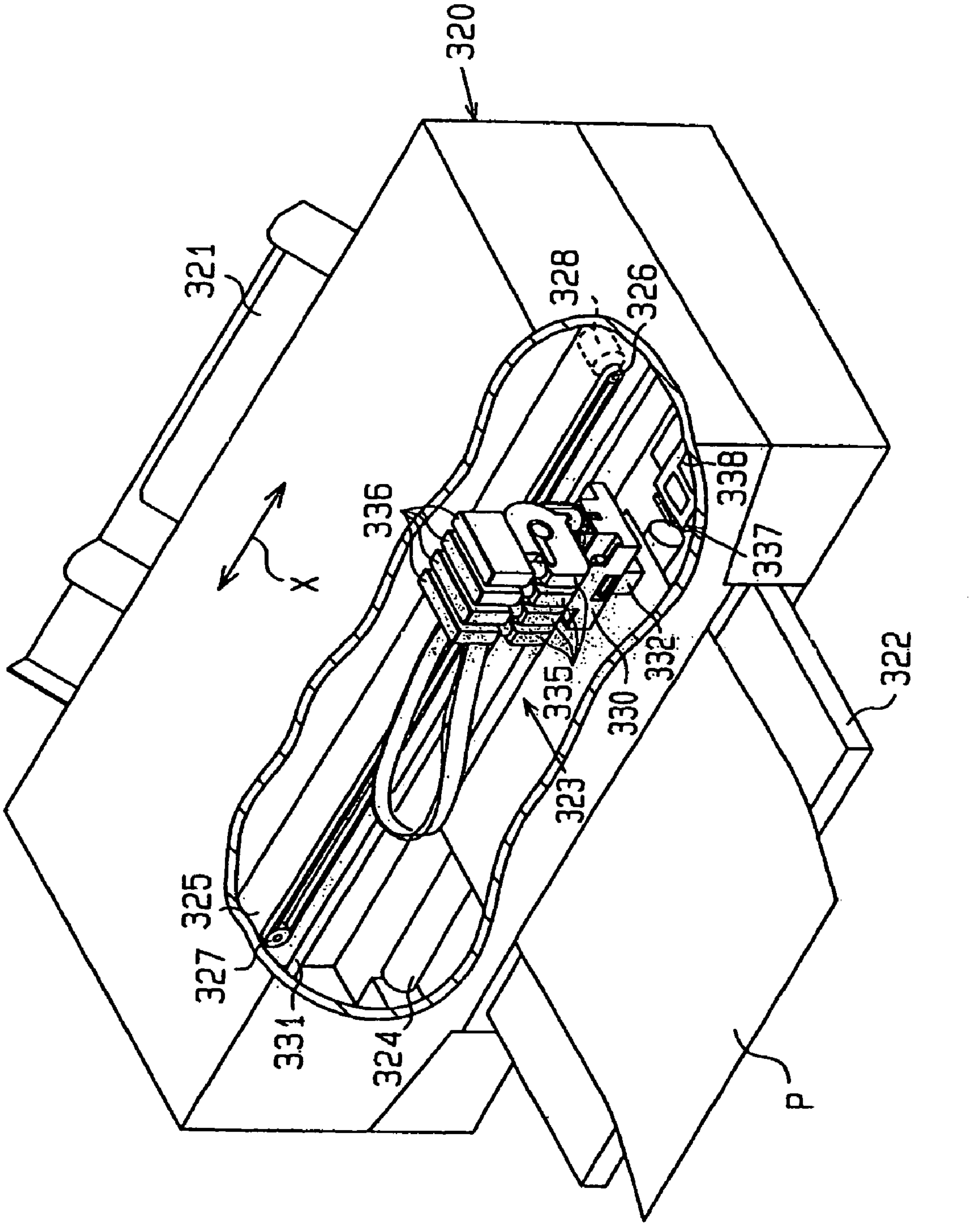
FIG. 55 is a perspective view showing a part of a printer according to a ninth embodiment in a broken-away form.

The ninth embodiment of the liquid injecting apparatus that embodies the present invention will be described according to FIGS. 55 to 61. As shown in FIG. 55, a printer 320 as the liquid injecting apparatus has a sheet-feeding tray 321 and a sheet-discharge tray 322 outside, and has a printer body 323 inside. The printer body 323 is provided with a platen 324 and an unillustrated sheet-feeding mechanism. The platen 324 supports a sheet P as a target, and the sheet P is placed on its top surface at the time of injecting liquid. The sheet-feeding mechanism is driven by an unillustrated drive mechanism to feed the sheet P onto the platen 324 from the sheet-feeding tray 321, and to discharge the sheet P on the platen 324 into the sheet-discharge tray 322.

A drive pulley 326 and a driven pulley 327 are fixed to the printer body 323 via a frame 325, and a carriage motor 328 is coupled to the drive pulley 326. A timing belt 329 is put around those pair of pulleys 326 and 327, and a carriage 330 positioned above the platen 324 is secured to the timing belt 329. The carriage 330 is slidable along a guide shaft 331, which is hung from the frame 325. Therefore, the carriage 330 moves in the main scan direction X via the timing belt 329 by the driving of the carriage motor 328.

The carriage 330 has a recording head 332 as a liquid injecting head on its bottom surface. A plurality of unillustrated nozzles is formed in the recording head 332, and unillustrated piezoelectric elements corresponding to the individual nozzles are laid out. The piezoelectric elements are driven by an unillustrated drive mechanism and inject inks or liquid from the individual nozzles toward the sheet P that have reached under the recording head 332.

Further, four valve units 335 are mounted on the top portion of the carriage 330 and four ink cartridges 336, as liquid retainers, are supported by engagement with the respective valve units 335. The individual ink cartridges 336 retain the individual inks of black, magenta, cyan, and yellow.

In FIG. 55, a cleaning mechanism 337 is provided at the right-hand end portion of the printer 320. This cleaning mechanism 337 has a cap 338 that covers the recording head 332, and an unillustrated suction pump that communicates with the cap 338. When the suction pump is driven with the recording head 332 covered with the cap 338, the inks and bubbles or the like are discharged.

Figure 56:
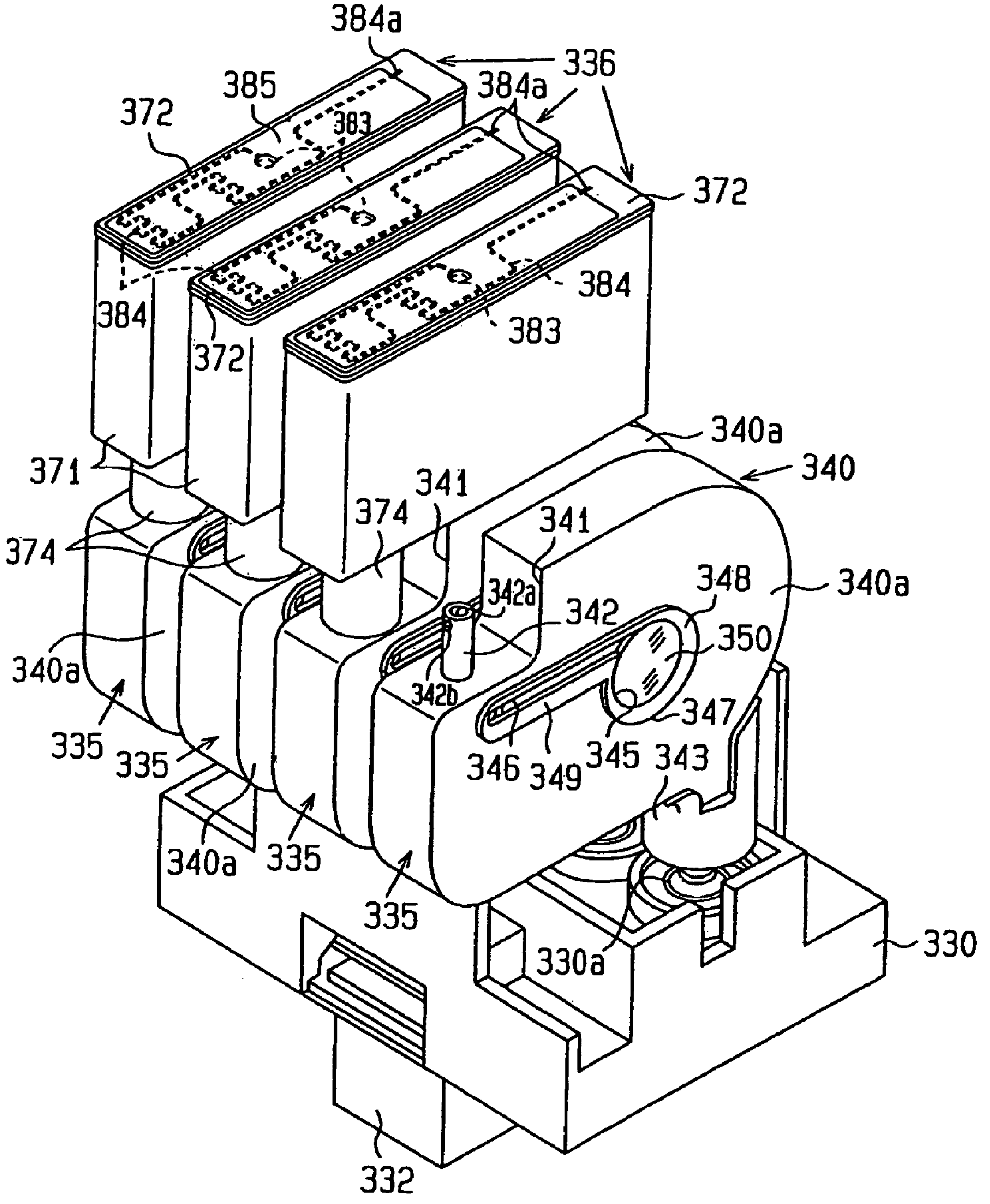
FIG. 56 is a perspective view showing a carriage of the printer in FIG. 55 from the left side.
Figure 57:
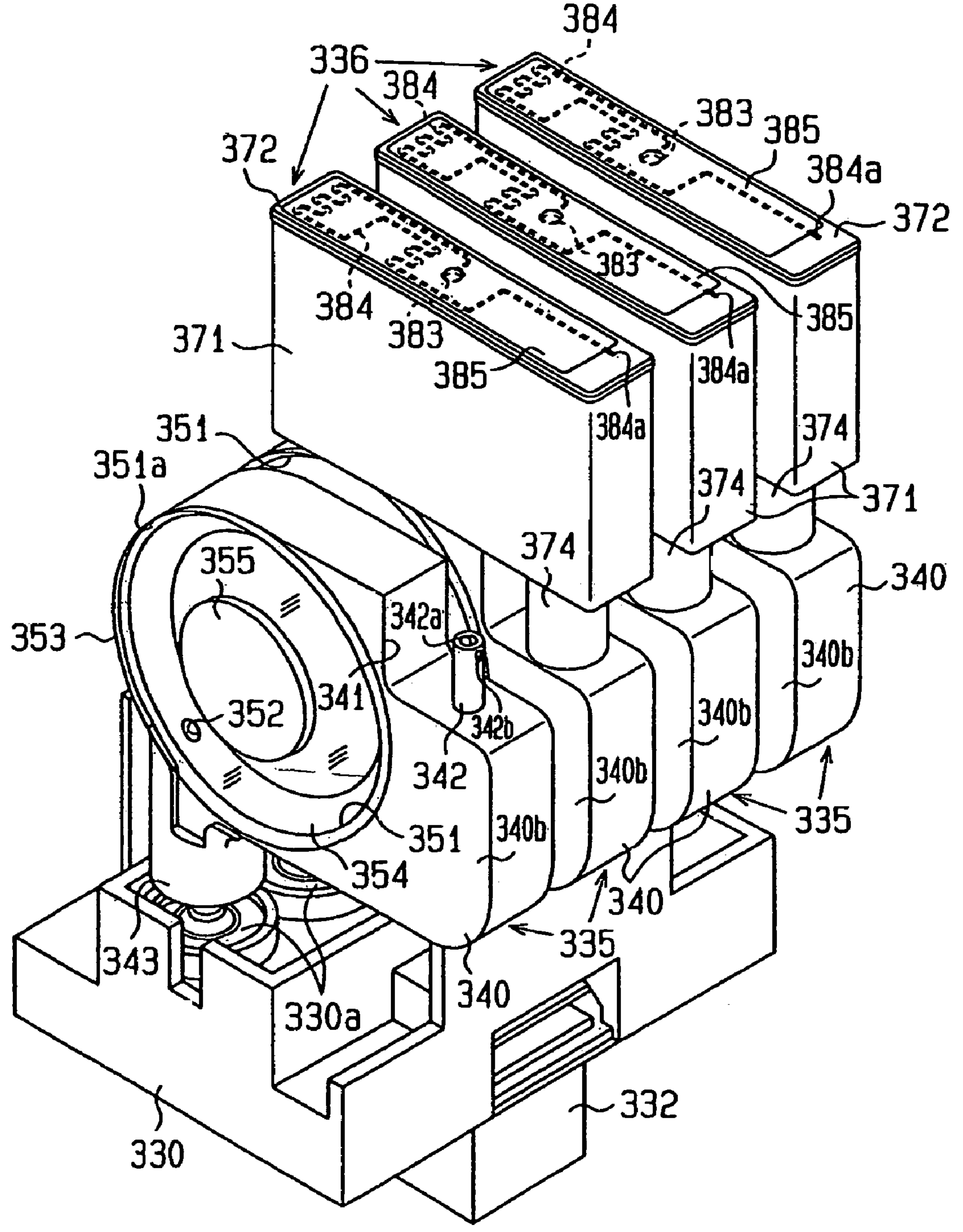
FIG. 57 is a perspective view showing a carriage of the printer in FIG. 55 from the right side.

Next, the valve unit 335 of the carriage 330 will be elaborated according to the diagrams. FIGS. 56 and 57 show the carriage 330 and the ink cartridges 336 mounted on the carriage 330, with one ink cartridge 336 removed.

As shown in FIGS. 56 to 59(*a*) and 59(*b*), the valve units 335 have a plurality of unit cases 340 of a synthetic resin. Each unit case 340 is formed in the shape of a flat box, and has a semicylindrical portion and a step portion 341 formed on its top portion. A supply needle 342 is formed protruding upward on the step portion 341 of each unit case 340. Each supply needle 342 is cylindrically formed and has an inner cavity 342*a*. Two supply holes 342*b*, facing each other, are provided on the upper outer surface of each supply needle 342. As the supply needle 342 is fitted in the ink cartridge 336, liquid is supplied to the valve unit 335 from the ink cartridge 336 via the inner cavity 342*a* and the supply holes 342*b*. Further, an ink lead-out portion 343 protruding downward is formed integrally at the lower portion of each unit case 340. This ink lead-out portion 343 is connected to the recording head 332 via a connection portion 330*a* of the carriage 330.

Figure 58A:
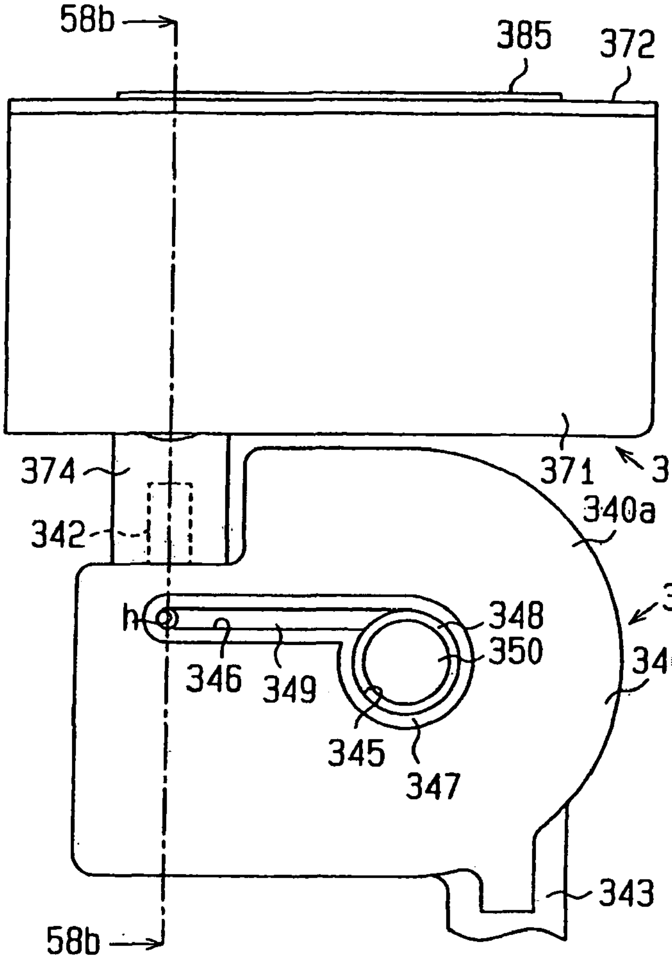
FIGS. 58(*a*) and 58(*b*) show an assembled state of an ink cartridge, FIG. 58(*a*) is a right side view and FIG. 58(*b*) is a cross-sectional view along the line 58*b*-58*b* in FIG. 58(*a*).
Figure 58B:
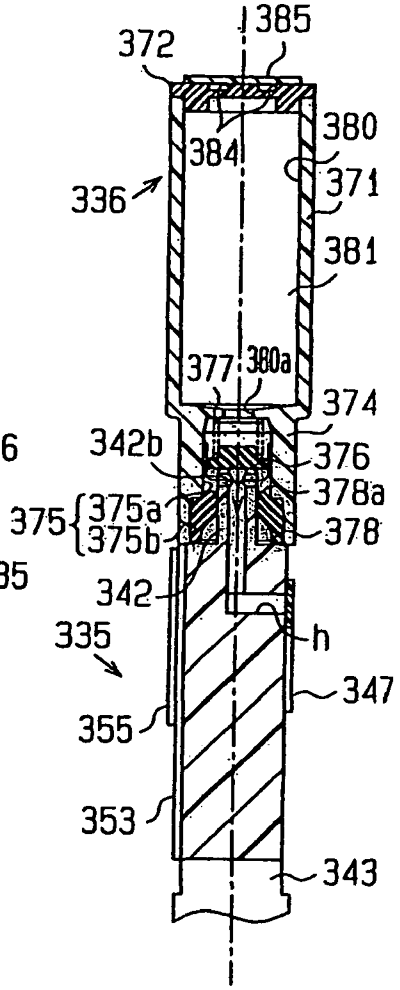

As shown in FIGS. 56, 58(*a*) and 58(*b*), and 60(*a*) and 60(*b*), a substantially columnar small recess portion 345 and a substantially linear groove 346, which communicates with the small recess portion 345, are formed in a first side surface 340*a* of the unit case 340. A film member 347, which covers those small recess portion 345 and groove 346, is thermally deposited to the first side surface 340*a*. Therefore, the small recess portion 345 and the film member 347 form a supply chamber 348, and the groove 346 and the film member 347 form an ink lead-in portion 349. A communication hole h, which is connected to the inner cavity 342*a* of the supply needle 342, is provided in one end portion of the groove 346. Therefore, the ink that has been introduced from the supply needle 342 is led into the supply chamber 348 via the communication hole h and the ink lead-in portion 349. The film member 347 is formed of a material that does not chemically influence the ink properties and further has low water transmittance and low oxygen and nitrogen transmittance. In this embodiment, therefore, the film member 347 is formed by a film that has, for example, a high-density polyethylene film or polypropylene film on which a nylon film coated with vinylidene chloride (saran) is adhered and laminated.

As shown in FIG. 60, a spring receiving member 350, which has an outside diameter slightly smaller than the inside diameter of the supply chamber 348, is attached to the film member 347 in the supply chamber 348 in such a way as to be positioned concentric to the supply chamber 348. The spring receiving member 350 may be thermally deposited to the film member 347 beforehand or may be attached thereto by an adhesive, a double-faced adhesive tape, or the like. Further, a spring member S, which engages with the spring receiving member 350, is disposed in a contracted state in the supply chamber 348.

Figure 59A:
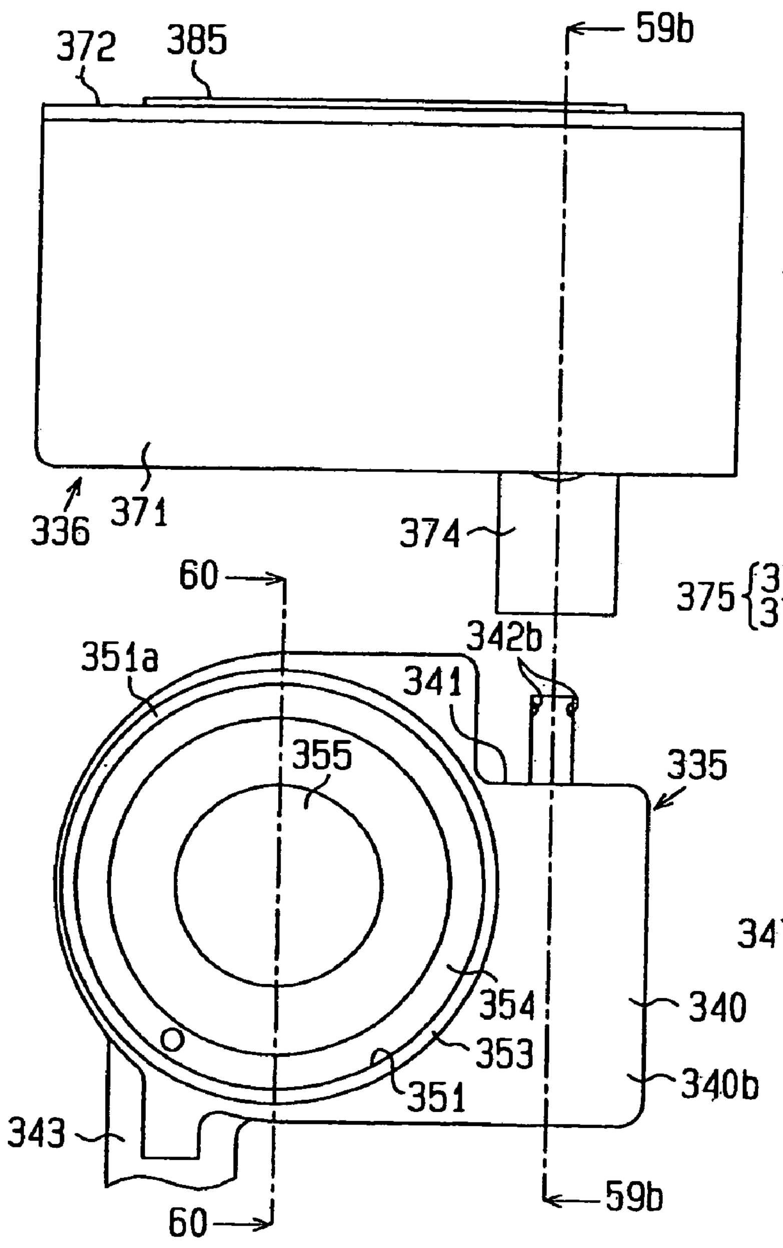
FIGS. 59(*a*) and 59(*b*) show a detached state of the ink cartridge, FIG. 59(*a*) is a left side view and FIG. 59(*b*) is a cross-sectional view along the line 59*b*-59*b* in FIG. 59(*a*).

As shown in FIGS. 57, 59(*a*) and 59(*b*), and 60(*a*) and 60(*b*), a large recess portion 351 with a substantially cylindrical shape, which is provided concentric to the small recess portion 345, is formed in the second side surface 340*b* of the unit case 340. This large recess portion 351 has a peripheral wall portion 351 a inclined in such a way as to increase its diameter toward the opening. An outlet hole 352 is provided in the lower portion of the large recess portion 351 directly above the ink lead-out portion 343. This outlet hole 352 communicates with a lead-out passage 343*a* of the ink lead-out portion 343. A film member 353, as a drive body that covers the large recess portion 351, is thermally deposited to the second side surface 340*b* of the unit case 340. Therefore, the large recess portion 351 and the film member 353 form a pressure chamber 354. The film member 353 is constituted by the same material as that of the film member 347.

A substantially disk-shaped pressure-receiving plate 355 is attached to that side of the film member 353 that is opposite to the pressure chamber 354. This pressure-receiving plate 355 has an outside diameter smaller than the inside diameter of the pressure chamber 354, and is arranged concentrically to the pressure chamber 354. The pressure-receiving plate 355 is formed of a harder material than the film member 353, e.g., a light plastic material, such as polyethylene or polypropylene. The pressure-receiving plate 355 is attached to the film member 353 by thermal deposition or using an adhesive, a double-faced adhesive tape, or the like.

As shown in FIGS. 60(*a*) and 60(*b*), a support hole 358, which communicates the supply chamber 348 with the pressure chamber 354, is formed in a partition 357 that defines the supply chamber 348 and the pressure chamber 354 of the unit case 340. A movable valve 359, which constitutes an open/close valve, is slidably supported in the support hole 358. The movable valve 359 is constituted by the integration of a columnar rod portion 359*a* inserted into the support hole 358 and a plate-like member 359*b* with a substantially disk shape that is larger than the outline of the support hole 358. To describe specifically, the rod portion 359*a* is inserted in the support hole 358, and its distal end can abut on the film member 353. The plate-like member 359*b* of the movable valve 359 is disposed in the supply chamber 348 and is urged in an L direction in FIGS. 60(*a*) and 60(*b*) by the spring member S. Further, a ring-like seal member 360 is secured to the supply chamber 348 side of the partition 357 in such a way as to surround the support hole 358. This seal member 360 is formed of an elastomer resin or the like of, for example, an O-ring or the like. As shown in FIG. 61, the support hole 358 has four cutaway grooves arranged at equal intervals, which form a substantially cross shape as a whole. With the rod portion 359*a* of the movable valve 359 being inserted into the support hole 358, therefore, four ink passages 361 are formed by the rod portion 359*a* and the support hole 358.

Therefore, the movable valve 359 is normally placed in a position shown in FIG. 60(*a*) by the urging force of the spring member S and its plate-like member 359*b* is pressed against the seal member 360, covering around the support hole 358 and blocking the supply chamber 348 from the pressure chamber 354. That is, the movable valve is in a valve-closed state. When the movable valve 359 moves in an R direction in FIGS. 60(*a*) and 60(*b*) and the plate-like member 359*b* comes away from the seal member 360 of the partition 357, the supply chamber 348 and the pressure chamber 354 are communicated with each other via the ink passage 361. At this time, the movable valve 359 becomes a vale open state. Then, the ink supplied to the pressure chamber 354 is led to a lead-out passage 343*a* of the ink lead-out portion 343 via an outlet hole 352 and is supplied to the recording head 332 via this lead-out passage 343*a*.

Next, the ink cartridge 336 will be described referring to FIGS. 56 to 59(*a*) and 59(*b*). As shown in FIGS. 56 to 59(*a*) and 59(*b*), the ink cartridge 336 is formed in a substantially parallelepiped shape and comprises a main body 371 and a lid member 372.

A supply portion 374 is formed protrusively on the lower portion of the main body 371. As shown in FIGS. 58(*a*) and 58(*b*) to 59(*a*) and 59(*b*), a stepped hole 375 is formed in the supply portion 374. This stepped hole 375 comprises a small-diameter portion 375*a* on the inner side of the main body 371 and a large-diameter portion 375*b* on the opening side, and the supply needle 342 is insertable into the small-diameter portion 375*a* and large-diameter portion 375*b*.

A valve body 376, which constitutes a valve mechanism, and a spring member 377, which likewise constitutes a valve mechanism, are disposed in the small-diameter portion 375*a* of the stepped hole 375. The valve body 376 has a substantially disk shape whose upper center portion protrudes upward and the spring member 377, which constitutes the valve mechanism, is fitted on the upper center portion. The spring member 377 is pressed fixedly between the valve body 376 and the upper end of the stepped hole 375, and presses the valve body 376 downward. When the supply needle 342 is inserted into the supply portion 374, the valve body 376 is moved, pressed upward, by the supply needle 342 while blocking the upper end of the inner cavity 342*a* of the supply needle 342, against the urging force of the spring member 377.

A seal member 378 is placed in the large-diameter portion 375*b* of the stepped hole 375. This seal member 378 has a ring portion 378*a* whose inside diameter is smaller than the outside diameter of the lower portion of the valve body 376 and the outside diameter of the supply needle 342. When the valve body 376 is pressed by the spring member 377 and moved downward, the valve body 376 closely contacts the seal member 378, closing the opening of the ring portion 378*a* and preventing the flow-out of the ink inside the ink cartridge 336, as shown in FIG. 59(9). When the supply needle 342 of the valve unit 335 is inserted into the supply portion 374, as shown in FIG. 59(*a*), the seal member 378 comes in close contact with the supply needle 342 to seal between the stepped hole 375 and the supply needle 342, and to guide the ink in the main body 371 to the inner cavity 342*a* of the supply needle 342.

As shown in FIGS. 58(*a*) and 58(*b*), and 59(*a*) and 59(*b*), a recess portion 380 open upward is formed in the upper portion of the main body 371. As this recess portion 380 is covered with the lid member 372, a retaining chamber 381 as a liquid retaining portion is defined. Inks of cyan, magenta, yellow, and black are respectively retained in the retaining chambers 381 of the individual ink cartridges 336. The bottom surface of the recess portion 380 is inclined toward a supply port 380*a*, which connects the recess portion 380 to the stepped hole 375. Therefore, the ink retained in this retaining chamber 381 is gathered in the supply port 380*a* along the bottom surface due to the action of the gravitational force.

As shown in FIG. 56, a through hole 383 and a communication groove 384, which communicates with that through hole 383, is formed in the lid member 372. A passage-forming film 385 is adhered to the top surface of the lid member 372. The passage-forming film 385 covers the communication groove 384 and the through hole 383, excluding one end portion 384*a* of the communication groove 384. Therefore, the retaining chamber 381 can communicate with the atmosphere via the through hole 383 and the communication groove 384 so that even the ink is discharged from the retaining chamber 381, the inside of the retaining chamber 381 does not become a negative pressure.

The action of the printer 320 of the present embodiment will be described next.

Before the use of the printer 320, a user inserts the supply needle 342 of each valve unit 335 of the carriage 330 into the supply portion 374 of each ink cartridge 336, and mounts each ink cartridge 336 onto the carriage 330. Before the ink cartridge 336 is mounted on the carriage 330, the valve body 376 is pressed against the seal member 378 to seal the supply port 380*a* of the retaining chamber 381 so that the ink inside the retaining chamber 381 does not lead outside.

When the supply needle 342 is inserted into the supply portion 374 of the ink cartridge 336, as shown in FIG. 58(*b*), the supply needle 342 is pressed against the seal member 378 and pushes the valve body 376 upward while maintaining the seal of the supply port 380*a*. Accordingly, the ink in the retaining chamber 381 and the stepped hole 375 is supplied to the supply chamber 348 via the supply holes 342*b* and the inner cavity 342*a* of the supply needle 342, the communication hole h, and the ink lead-in portion 349. Because the retaining chamber 381 is communicating with the atmosphere via the through hole 383 and the communication groove 384 of the lid member 372 at this time, the retaining chamber 381 does not become a negative pressure inside and the ink is supplied to the supply chamber 348 smoothly.

Further, at this time, the unillustrated suction pump of the cleaning mechanism 337 is activated and the air in the pressure chamber 354 is discharged. As a negative pressure is generated in the pressure chamber 354 accordingly, the film member 353 and a pressure-receiving plate 355 are displaced on the side to reduce the volume of the pressure chamber 354, and are arranged in the positions indicated in FIG. 60(*b*). Therefore, the film member 353 and the pressure-receiving plate 355 push and move the movable valve 359 in the R direction, thus separating the plate-like member 359*b* from the seal member 360. This opens the movable valve 359 so that the supply chamber 348 and the pressure chamber 354 communicate each other via the ink passages 361. Therefore, the ink supplied to the supply needle 342 from the retaining chamber 381 of the ink cartridge 336 is supplied to the pressure chamber 354.

When the pressure chamber 354 is filled with the ink, the pressure of the ink in the supply chamber 348 and the urging force of the spring member S act on the movable valve 359 so that the movable valve 359 is pushed in the L direction in FIGS. 60(*a*) and 60(*b*) and is moved in that direction. The pressure of the ink in the supply chamber 348 is the pressure by the position head of the ink in the retaining chamber 381 of the ink cartridge 336. Accordingly, the plate-like member 359*b* is pressed against the seal member 360, closing the movable valve 359, as shown in FIG. 60(*a*). Thus, the supply chamber 348 and the pressure chamber 354 are disconnected from each other, stopping the supply of the ink to the pressure chamber 354 from the supply chamber 348.

When the printer 320 becomes a print state thereafter, the unillustrated sheet-feeding mechanism is driven to feed the sheet P on the sheet-feeding tray 321 to between the carriage 330 and the platen 324. When the sheet P comes between the carriage 330 and the platen 324, the carriage motor 328 and the unillustrated piezoelectric elements of the recording head 332 are driven. As a result, while the carriage 330 is moved reciprocally in the X direction, the ink is injected toward the sheet P from the recording head 332.

When the ink is injected from the recording head 332, the ink in the pressure chamber 354 is reduced in accordance with the amount of injection. Given that the pressure of the ink in the supply chamber 348 is P1, the urging force of the spring member S is W1, the displacement reaction force required to displace the film member 353 is Wd and the negative pressure of the ink in the pressure chamber 354 is P2, in a case where the following relationship $$P2>P1+Wd+W1$$

is satisfied, the film member 353 is bent in the R direction, thus moving the movable valve 359 in the R direction. Therefore, the movable valve 359 is separated from the seal member 360 as shown in FIG. 60(*b*) and is opened, the supply chamber 348 and the pressure chamber 354 and the ink is supplied to the pressure chamber 354 from the supply chamber 348 via the ink passages 361.

When the ink is supplied to the pressure chamber 354 from the supply chamber 348 and the ink consumed in the pressure chamber 354 is supplemented, the negative pressure in the pressure chamber 354 is reduced. As a result, the movable valve 359 is moved in the L direction and is closed by the pressure in the supply chamber 348 and the urging force of the spring member S, which are applied to the plate-like member 359*b*, thus disconnecting the supply chamber 348 from the pressure chamber 354.

In case of replacing the ink cartridge 336 thereafter, the ink cartridge 336 is detached upward from the valve unit 335. Then, the valve body 376 of the ink cartridge 336 is pushed and moved downward by the spring member 377, and abuts on the seal member 378, thereby sealing the supply port 380*a*. Therefore, the once used ink cartridge 336 is detached from the carriage 330 without leakage of the ink from inside the stepped hole 375 and the retaining chamber 381.

The printer 320 of the present embodiment can afford the following effect.

(1) In the ninth embodiment, the valve unit 335 is provided between the retaining chamber 381 of the ink cartridge 336 and the recording head 332. This valve unit 335 causes the movable valve 359 to perform a valve-opening operation when a negative pressure is generated in the pressure chamber 354 that is communicating with the recording head, thus communicating the supply chamber 348 on the retaining chamber 381 side with the pressure chamber 354 on the recording head 332 side.

When the movable valve 359 is in the valve-closed state, the pressure of the ink in the retaining chamber 381 is not transmitted to the pressure chamber. Therefore, the ink hardly leaks out of the recording head 332. In accordance with the injection of the ink from the recording head 332, the movable valve 359 is opened, and the ink is supplied to the pressure chamber 354 from the supply chamber 348. This makes it unnecessary to retain a porous substance in the retaining chamber 381. It is therefore possible to retain more ink in the retaining chamber 381 by the amount of the porous substance that will not be retained, and the stagnation of the ink supply caused by the porous substance does not occur.

Further, as the porous substance is not retained in the retaining chamber 381, part of the porous substance does not mix, as an impurity, into the ink to be supplied to the recording head 332 from the ink cartridge 336. It is therefore unnecessary to dispose a filter for removing an impurity between the ink cartridge 336 and the recording head 332, so that the number of parts can be reduced.

(2) In the ninth embodiment, the ink cartridge 336 is provided above the supply chamber 348 of the valve unit 335. Therefore, the ink retained in the retaining chamber 381 of the ink cartridge 336 is supplied to the supply chamber 348 by pressure originated from the position head. The ink in the retaining chamber 381 is therefore supplied to the supply chamber 348 without providing any means to pressurize the ink. As a result, the ink in the retaining chamber 381 is supplied to the supply chamber 348 with a simple structure.

(3) In the ninth embodiment, the valve unit 335 is provided integral with the carriage 330. The valve unit 335 having the retaining chamber 381 is detachable from the recording head 332. At the time the ink retained in the retaining chamber 381 is consumed and it is to be replaced with a new ink cartridge 336, only the ink cartridge 336 should be replaced, without replacement of the valve unit 335. That is, as only a minimum number of parts are required to be replaced, the ink cartridge 336 to be replaced can be manufactured with fewer materials and at a lower cost.

(4) In the ninth embodiment, the ink cartridge 336 is provided with the supply portion 374 having the stepped hole 375. Disposed in this stepped hole 375 is the valve body 376 which moves and opens when the supply needle 342 is inserted, and is pressed against the seal member 378 when the supply needle 342 is disengaged. Even if the ink cartridge 336, once mounted on the carriage 330, is detached before all the ink is used up, ink leakage hardly occurs. If the supply needle 342 of the valve unit 335 is inserted into the supply portion 374 of the ink cartridge 336, which has been used halfway, the ink in the retaining chamber 381 can be supplied to the valve unit 335. Even if the ink cartridge 336 is detached while being used halfway, therefore, the ink can be used effectively.

(5) In the ninth embodiment, when the ink is injected on the sheet P and the ink in the pressure chamber 354 is reduced, the film member 353 is bent and displaced in the R direction in FIG. 60 in such a way that the volume of the pressure chamber 354 decreases. As the film member 353 is displaced in the R direction, the movable valve 359 is opened and the supply chamber 348 and the pressure chamber 354 communicate with each other via the ink passages 361. Therefore, the ink is supplemented into the pressure chamber 354 in accordance with the amount of the ink consumed. At this time, the ink is supplemented into the pressure chamber 354 from the supply chamber 348, in accordance with the amount of the ink consumed by the recording head 332, regardless of the pressure of the ink to be supplied to the supply chamber 348 of the valve unit 335 from the retaining chamber 381 of the ink cartridge 336. As a result, the ink can be supplied to the pressure chamber 354 from the supply chamber 348 stably with a simple structure.

(6) In the ninth embodiment, the bottom of the retaining chamber 381 is inclined in such a way as to converge to the opening of the stepped hole 375 or the supply port 380*a*.

Therefore, the ink in the retaining chamber 381 of the ink cartridge 336 gathers in the supply port 380*a*, due to the action of the gravitational force. Even if the ink in the retaining chamber 381 becomes less, therefore, the ink is supplied, to the last, more reliably to the supply chamber 348 via the supply port 380*a*, so that the ink in the retaining chamber 381 can be used to the last effectively.

(7) In the ninth embodiment, the retaining chamber 381 is open to the atmosphere via the through hole 383 and the communication groove 384 formed in the lid member 372. Even if the ink in the retaining chamber 381 is supplied to the recording head 332 via the supply chamber 348 and the pressure chamber 354, and is consumed by the injection from the recording head 332, the inside of the retaining chamber 381 does not become a negative pressure. It is therefore possible to supply the ink smoothly to the pressure chamber 354 from the retaining chamber 381, and to inject the ink from the recording head 332 properly.

(8) In the ninth embodiment, the supply needle 342 of the valve unit 335 is provided on the step portion 341 of the valve unit 335. Even if the supply portion 374 of the ink cartridge 336 is fitted over the supply needle 342, therefore, the height of the carriage 330 can be made as small as possible. That is, the printer 320 can be made smaller.

The tenth embodiment of the liquid injecting apparatus that embodies the present invention will be discussed according to FIGS. 62 to 66(*a*) and 66(*b*). The tenth embodiment merely modifies the carriage 330 and the ink cartridge 336 of the printer 320 of the ninth embodiment. Therefore, the same reference numerals will be given to those portions of the tenth embodiment, which are similar to those of the ninth embodiment, and their detailed description will be omitted.

Figure 62:
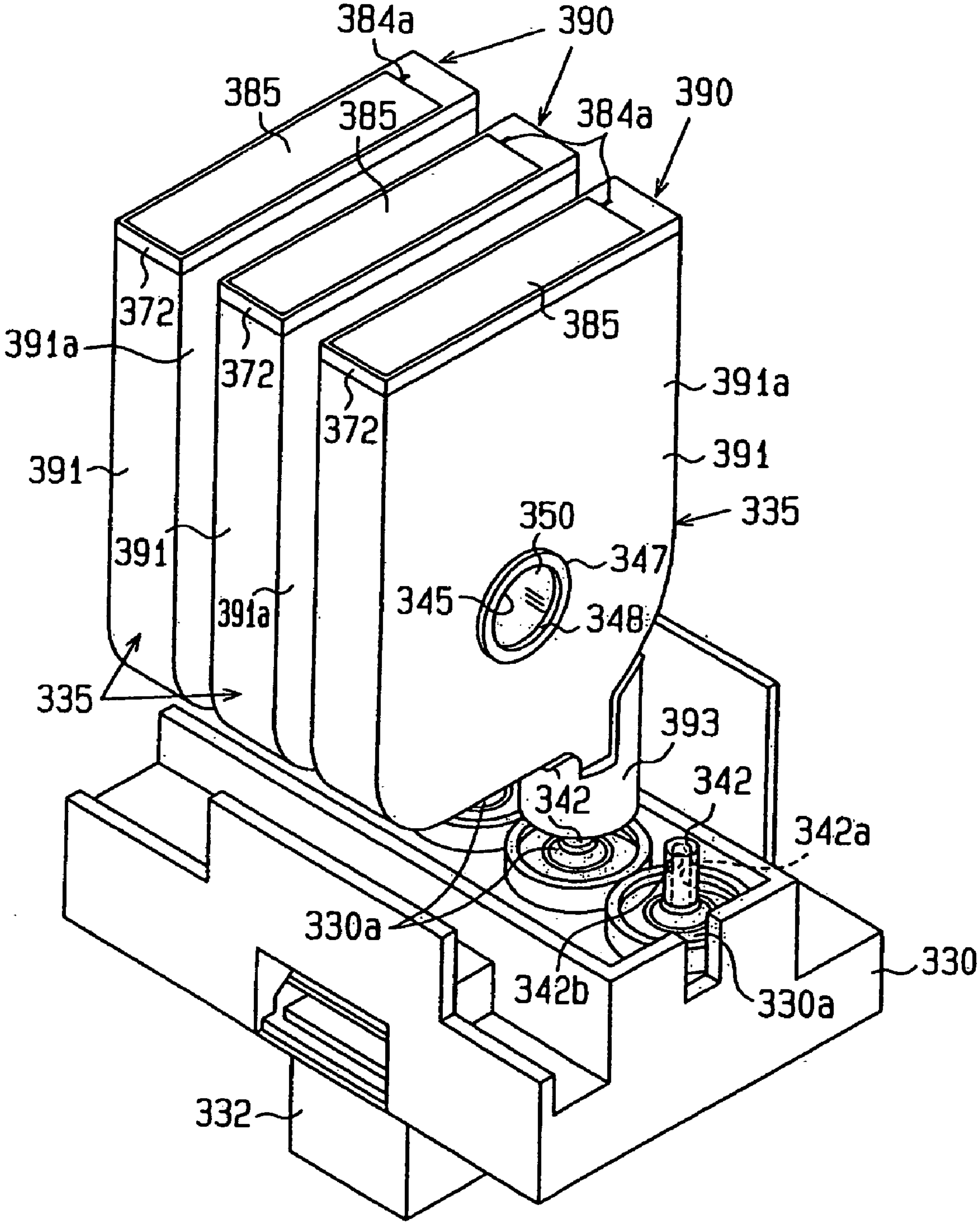
FIG. 62 is a perspective view showing a carriage according to a tenth embodiment from the right side.
Figure 63:
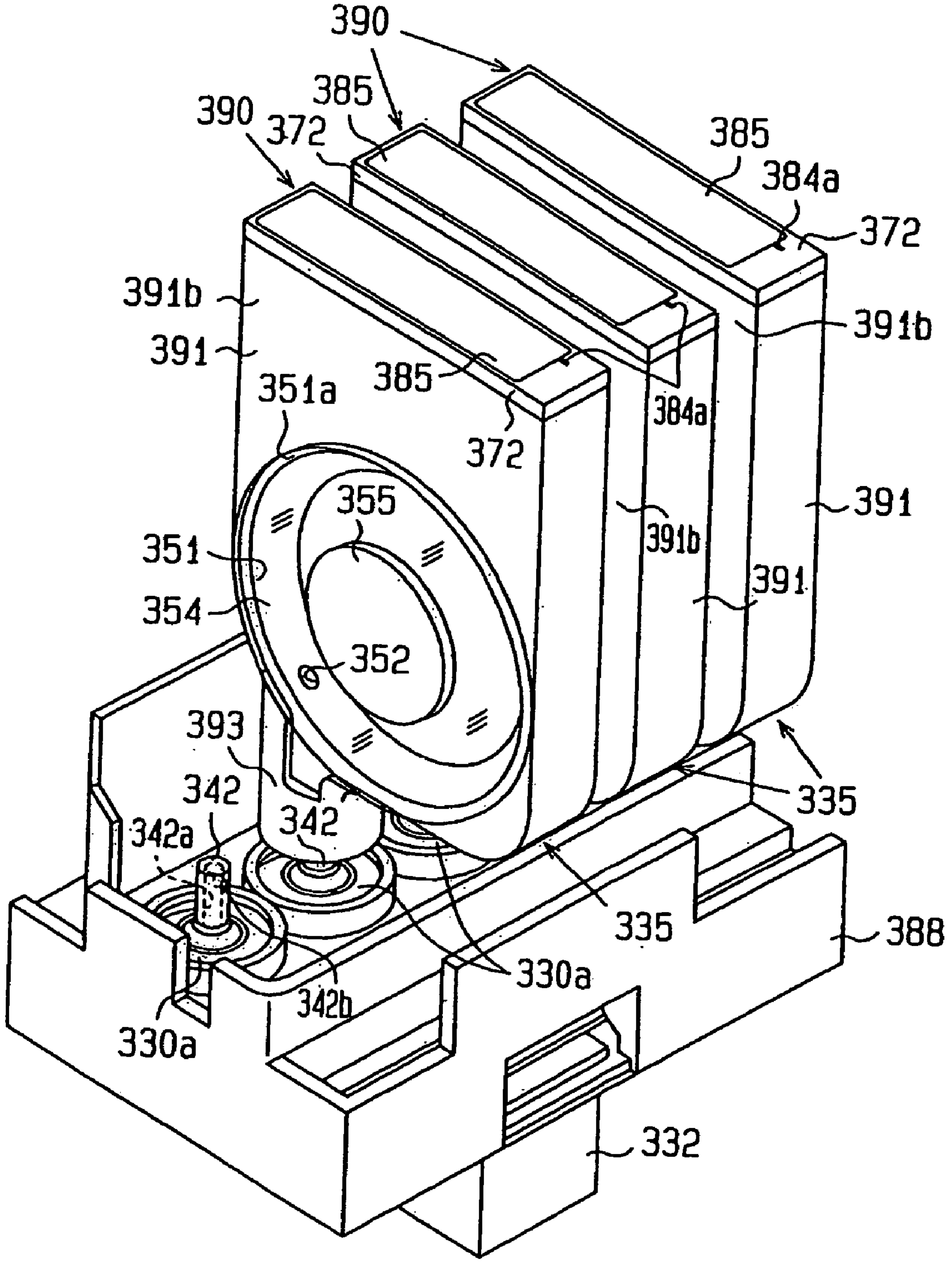
FIG. 63 is a perspective view showing the carriage in FIG. 62 from the left side.

FIGS. 62 and 63 show a carriage 388 according to the present embodiment and ink cartridges 390 to be mounted on the carriage 388 with one ink cartridge 390 detached.

As shown in FIGS. 62 and 63, four cylindrical supply needles 342 (only two shown) are provided on the upper portion of the connection portion 330*a* of the carriage 388 of the tenth embodiment. Each supply needle 342 has two supply holes 342*b* facing each other, and the inner cavity 342*a* communicates with the supply holes 342*b* to lead the ink to the connection portion 330*a*, as per the ninth embodiment.

In the tenth embodiment, four ink cartridges 390 as liquid retainers are likewise mounted on the carriage 388 in such a way as to be fitted into the supply needles 342 of each carriage 388. Each ink cartridge 390 is the integration of the retaining chamber 381 as a liquid retaining portion and the valve unit 335, and comprises a cartridge case 391 and the lid member 372.

Figure 66A:
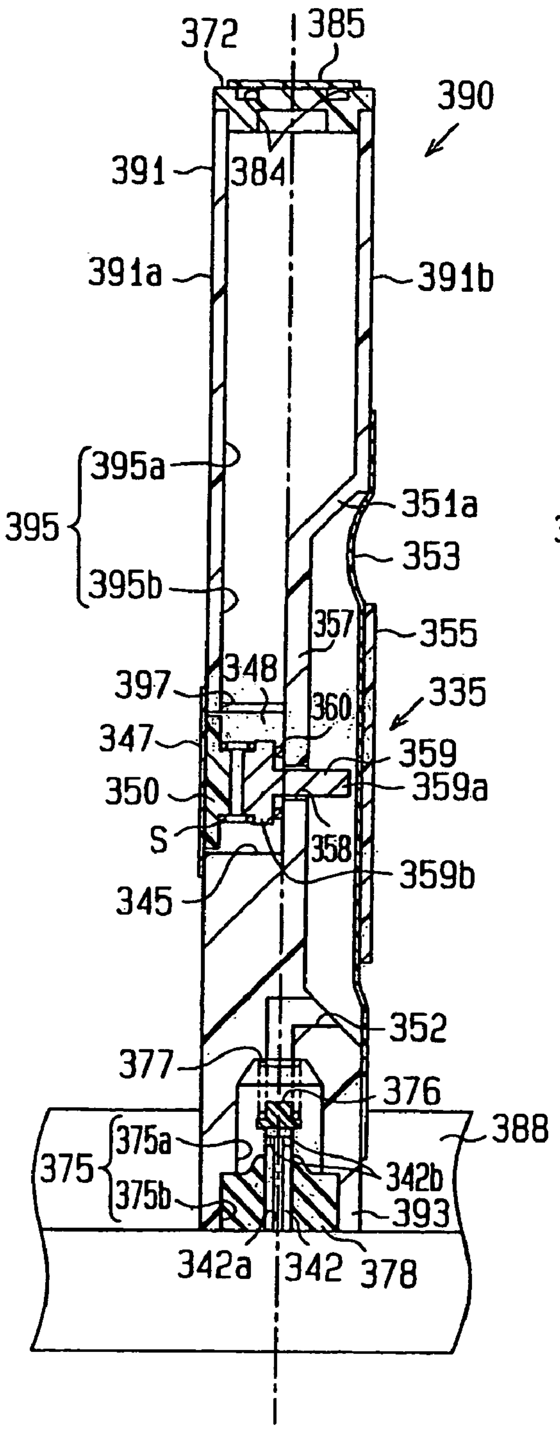
FIGS. 66(*a*) and 66(*b*) are cross-sectional views along the line 66-66 in FIG. 65, FIG. 66(*a*) shows an assembled state of the ink cartridge, and FIG. 66(*b*) shows a detached state of the ink cartridge.
Figure 66B:
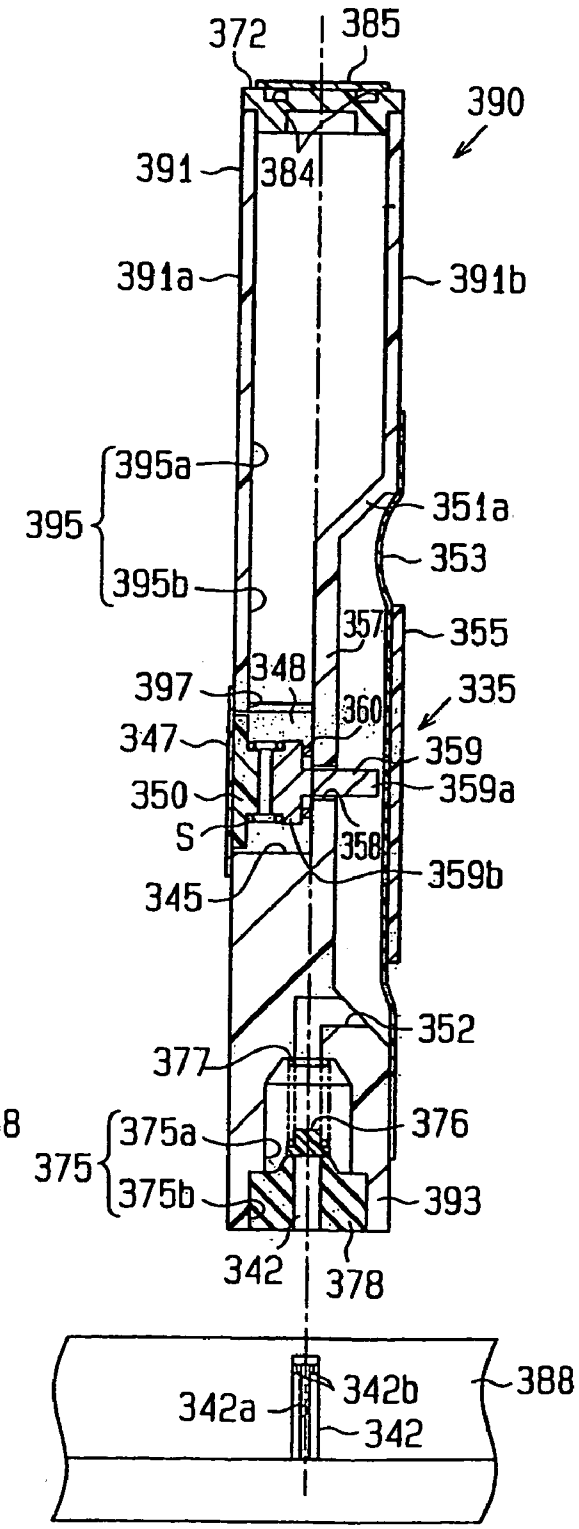

Each cartridge case 391 is formed in the shape of a flat parallelepiped. An ink lead-out portion 393 is formed protrusively on the lower portion of each cartridge case 391. The ink lead-out portion 393 has a structure similar to that of the supply portion 374 of the first embodiment, and the stepped hole 375, where the supply needle 342 is to be inserted, is formed there as shown in FIGS. 66(*a*) and 66(*b*). That is, the valve body 376 and the spring member 377 are retained in the small-diameter portion 375*a* of the stepped hole 375, and the seal member 378 is retained in the large-diameter portion 375*b*. Therefore, the cartridge case 391 is mounted on the carriage 388 as the supply needle 342 is inserted, while being sealed, into the seal member 378 of the stepped hole 375 of the ink lead-out portion 393 as shown in FIG. 66(*a*).

Figure 64:
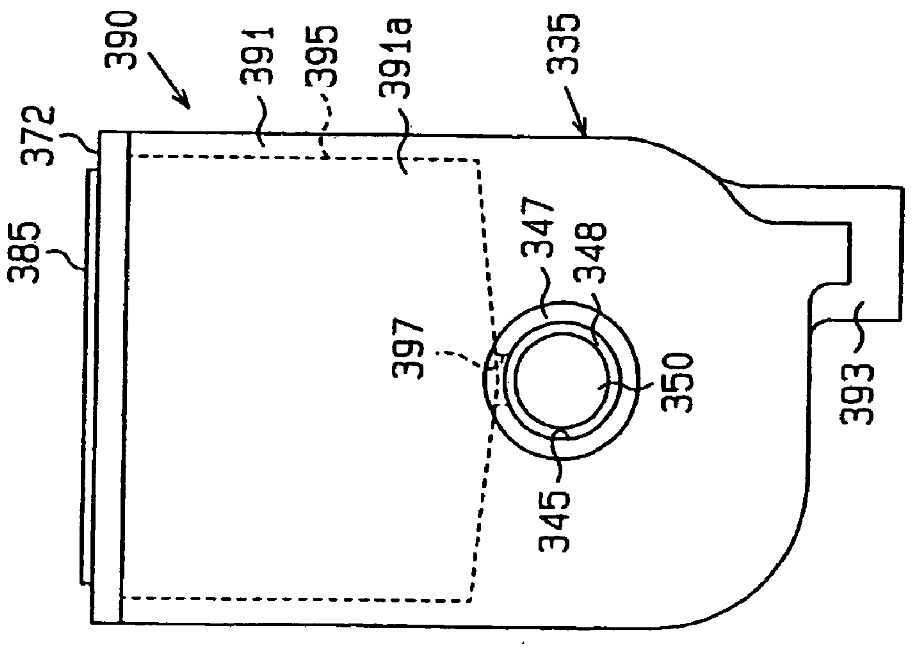
FIG. 64 is a right side view of an ink cartridge.

As shown in FIGS. 62 and 64, the small recess portion 345 is formed in a first side surface 391*a* of the cartridge case 391, and the film member 347 that covers this small recess portion 345 is thermally deposited to the first side surface. Therefore, the small recess portion 345 and the film member 347 form the supply chamber 348. As shown in FIGS. 66(*a*) and 66(*b*), the spring receiving member 350 and the spring member S are disposed in this supply chamber 348.

Figure 65:
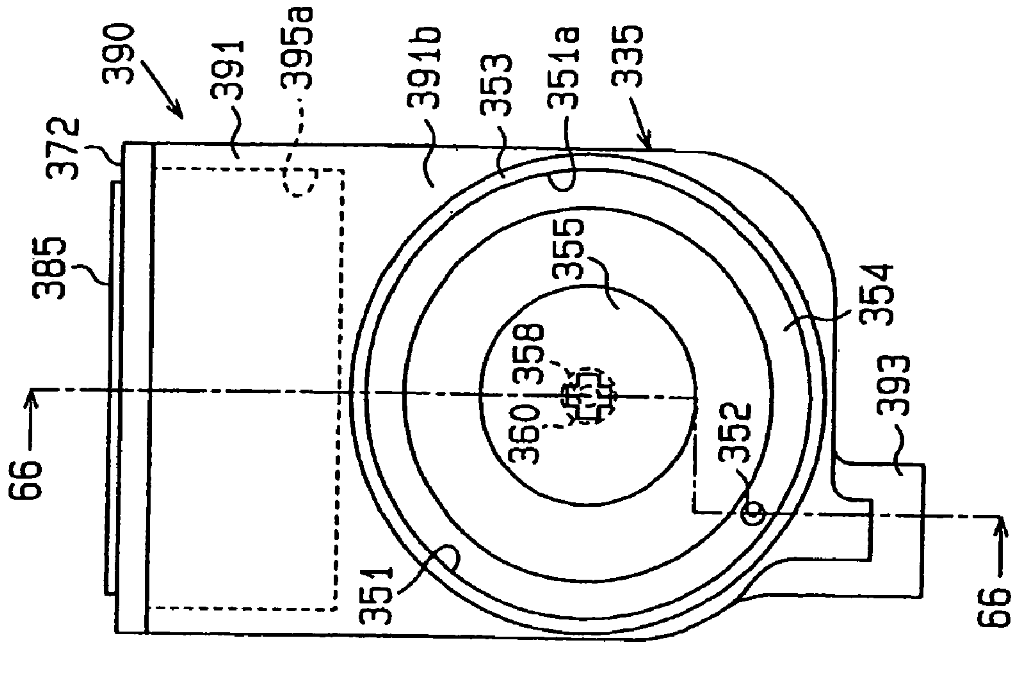
FIG. 65 is a left side view of the ink cartridge.

As shown in FIGS. 63 and 65, a large recess portion 351 concentric to the small recess portion 345 is formed in a second side surface 391*b* of the cartridge case 391, and a film member 353 that covers this large recess portion 351 is thermally deposited to the second side surface. Therefore, the large recess portion 351 and the film member 353 form the pressure chamber 354. The outlet hole 352, which communicates with the stepped hole 375 of the ink lead-out portion 393, is formed in the large recess portion 351. The film member 353 is provided with the pressure-receiving plate 355, as per the ninth embodiment.

Further, the support hole 358 is formed in the partition 357, which defines the supply chamber 348 and the pressure chamber 354, and the movable valve 359 is inserted in this support hole 358. The rod portion 359*a* of the movable valve 359 can abut on the film member 353. A plate-like member 359*b* of the movable valve 359 is urged rightward in FIGS. 66(*a*) and 66(*b*) by the spring member S. Further, the seal member 360 is provided on the supply chamber 348 side of the partition 357.

As shown in FIGS. 66(*a*) and 66(*b*), a recess portion 395 is formed in the upper portion of the cartridge case 391. The width of a lower portion 395*b* of the recess portion 395 is narrower than the width of an upper portion 395*a*. A communication hole 397, which communicates with the supply chamber 348, is formed in the center of the lower portion 395*b*. The bottom of the recess portion 395 is inclined toward the communication hole 397 in such a way as to converge to the communication hole 397. Therefore, the ink retained in the retaining chamber 381 gathers in the communication hole 397 by the action of the gravitational force.

As the recess portion 395 is covered with the lid member 372, the retaining chamber 381 as a liquid retaining portion is defined. Inks of cyan, magenta, yellow, and black are respectively retained in the retaining chambers 381 of the individual ink cartridges 390. The through hole (not shown) and the communication groove 384 (see FIGS. 66(*a*) and 66(*b*)), which communicates with it, are formed in the lid member 372 as per the ninth embodiment. The passage-forming film 385 is adhered to the lid member, so that the communication groove 384 and the through hole are covered with the passage-forming film 385, excluding one end portion 384*a* of the communication groove 384.

Therefore, the carriage 388 of the tenth embodiment operates in a manner similar to that of the ninth embodiment. To describe specifically, pressure originated from the head difference of the ink in the retaining chamber 381 always acts on the supply chamber 348. Accordingly, the movable valve 359 is always moved rightward in FIGS. 66(*a*) and 66(*b*) to abut on the seal member 360, and is closed by the urging force of the spring member S and the pressure of the ink in the supply chamber 348, thereby disconnecting the supply chamber 348 from the pressure chamber 354. When ink is injected onto the sheet P from the recording head 332, the amount of ink in the pressure chamber 354 decreases, which generates a negative pressure in the pressure chamber 354. This moves the film member 353 and the pressure-receiving plate 355 in the direction of reducing the volume of the pressure chamber 354 or leftward in FIGS. 66(*a*) and 66(*b*). Accordingly, the movable valve 359 is pushed leftward by the film member 353 and is disengaged from the seal member 360 and opened. Therefore, the ink is supplied to the pressure chamber 354 from the supply chamber 348 via the ink passages 361. The ink retained in the retaining chamber 381 of the present embodiment is supplied to the supply chamber 348 via the communication hole 397, and the ink is supplied to the pressure chamber 354 from the supply chamber 348 via the ink passages 361.

The printer of the tenth embodiment can afford the following effects in addition to the effects (1), (2) and (5) to (7) of the ninth embodiment.

(9) In the ink cartridge 390 of the tenth embodiment, the valve unit 335 and the retaining chamber 381 are provided integrally, and this ink cartridge 390 is attachable and detachable with respect to the carriage 388. It is therefore possible to easily mount the valve unit 335 on the conventional carriage 388 on which the valve unit 335 is not mounted, so that the ink cartridge 390 which can use the ink more efficiently can be attached.

If the ink retained in the retaining chamber 381 is all used up, the ink cartridge together with valve unit is replaced. That is, because the valve unit is used only while liquid retained in the liquid retaining portion is consumed, it does not require the rigidity that can endure long usage. Accordingly, the materials can be selected more freely, and the liquid retainer can be manufactured at a lower cost at a low cost. Further, a porous substance is not retained in the ink cartridge 390, so part of the porous substance does not mix into the ink as an impurity. It is therefore unnecessary to dispose a filter for removing an impurity in the ink passage between the ink cartridge 336 and the recording head 332, so that the number of parts can be reduced.

(10) In the tenth embodiment, the ink lead-out portion 393 having the stepped hole 375 is provided on the valve unit 335. The supply needle 342 is inserted in this stepped hole 375 to be open as shown in FIG. 66(*a*) and, with the supply needle 342 disengaged as shown in FIG. 66(*b*), the valve body 376 that is pressed against the seal member 378 is disposed. Even if the ink cartridge 390, once mounted on the carriage 388, is detached before the ink is all used up, the retained ink hardly leaks out.

When the supply needle 342 of the carriage 388 is inserted into the supply portion 374 of the ink cartridge 390 that has been used halfway, the ink in the valve unit 335 is supplied to the ink lead-out portion 393. Even if the ink cartridge 390 is detached while it is being used halfway, the ink retained in the ink cartridge 390 can be used effectively.

The ninth and tenth embodiments may be modified as follows.

In the ninth and tenth embodiments, the retaining chamber 381 of the ink cartridge 336, 390 is provided above the supply chamber 348 of the valve unit 335. Instead, the retaining chamber 381 that has a shape which extends sideways and downward of the supply chamber 348 may be provided.

In the ninth and tenth embodiments, as the supply needle 342 is inserted into the stepped hole 375, the ink cartridge 336, 390 is mounted on the carriage 330, 388. Instead, the ink cartridge 336, 390 may be supported on the carriage 330, 388 via another support means. In this case, even if the volume of the retaining chamber 381 which is arranged at the upper portion is made larger, the carriage 330, 388 can be moved stably.

In the ninth and tenth embodiments, the ink lead-out portion 343, 393 protrudes downward from the case 340, 391. Those ink lead-out portions 343 and 393 may be formed so as not to protrude from the cases 340 and 391. The shapes of those cases 340 and 391 are selectable arbitrarily.

INDUSTRIAL APPLICABILITY

As described above, the liquid injecting apparatus according to the present invention is suitable for use in a printer which spurts ink (printing apparatus including a facsimile, copying machine or the like) as a liquid injecting apparatus. Further, the apparatus of the present invention is also adaptable to a liquid injecting apparatus that injects liquid, such as an electrode material or coloring material, which is used in manufacturing a liquid crystal display, EL display and surface emission display, a liquid injecting apparatus that injects a bioorganic substance, which is used in fabricating bio chips, or a sample injecting apparatus as a precision pipet.

What is claimed is.

1. A method of manufacturing a valve unit in which a pressure chamber comprises a recess portion formed in a unit case and a flexible film member that covers the recess portion, and which said valve unit has a valve for leading liquid from a liquid retainer into the pressure chamber by detecting a negative pressure originated from a decrease in liquid in said pressure chamber by means of said film member, said method comprising:

a step of heating said unit case;

a step of placing said film member on the unit case in such a way as to cover the recess portion of the heated unit case; and a step of thermally depositing said film member on the unit case to thereby form said pressure chamber.

2. A method of manufacturing a valve unit, in which a pressure chamber comprises a recess portion formed in a unit case and a flexible film member that covers the recess portion, wherein said valve unit has a valve for leading liquid from a liquid retainer into the pressure chamber by detecting a negative pressure originated from a decrease in liquid in said pressure chamber by means of said film member, said method comprising:

a step of attaching a pressure-receiving plate to a top surface of said film member;

a step of placing said film member, with said attached pressure-receiving plate, on the unit case in such a way as to cover the recess portion of said unit case; and a step of thermally depositing said placed film member on the unit case to thereby form said pressure chamber.

3. The method of manufacturing a valve unit according to claim 2, wherein in the step of placing said film member, a second surface of said film member opposite to the top surface is caused to face said recess portion of said unit case, and wherein, in the step of thermally depositing said placed film member on said unit case, said film member is thermally deposited on the periphery of said recess portion with said pressure-receiving plate pressed toward the recess portion by a flat surface of a heater block.

4. The method of manufacturing a valve unit according to claim 2, wherein, in the step of thermally depositing said placed film member on said unit case, said pressure-receiving plate is pressed toward the recess portion by a projection of a heater block and said placed film member is thermally deposited on a periphery of said recess portion.

5. The method of manufacturing a valve unit according to claim 4, wherein said projection of said heater block is formed of a heat insulating material.

6. The method of manufacturing a valve unit according to claim 2, wherein in the step of thermally depositing said placed film member on said unit case, the placed film member is pressure-bonded to the unit case by a heater block and said film member is thermally deposited on said unit case with air between the heater block and the unit case being sucked and discharged from a hole in the heater block.

* * * * *

UNITED STATES PATENT AND TRADEMARK OFFICE

CERTIFICATE OF CORRECTION

Figure 59B:
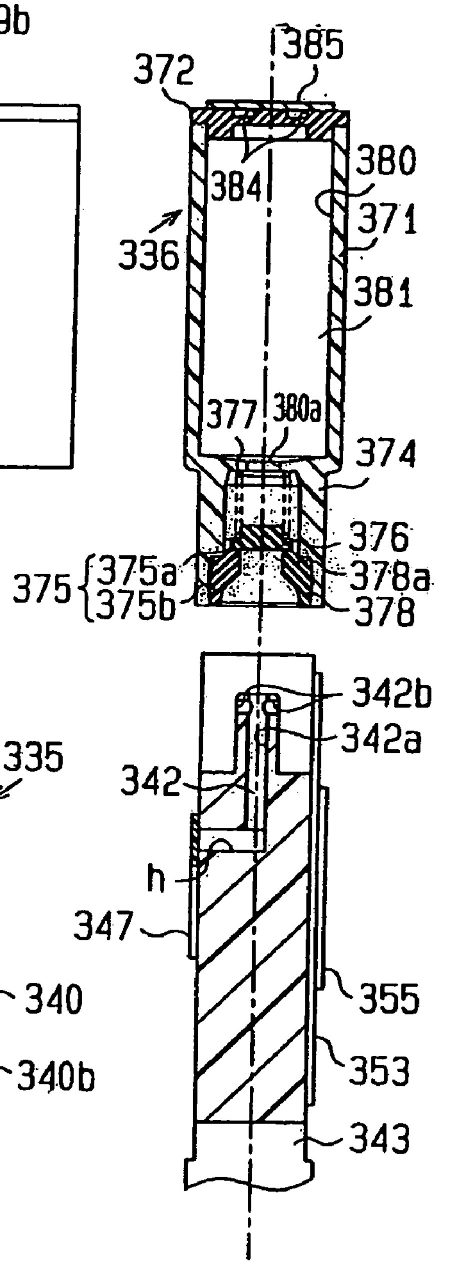

PATENT NO. : 7,780,277 B2
APPLICATION NO. : 11/598750
DATED : August 24, 2010
INVENTOR(S) : Yoshiharu Aruga, Toshio Kumagai and Hitoshi Matsumoto It is certified that error appears in the above-identified patent and that said Letters Patent is hereby corrected as shown below:

In the Specification:

Column 41, line 57: delete “FIG. 59(9)” and insert --FIG. 59(b)--

Signed and Sealed this
Eighteenth Day of June, 2013

Teresa Stanek Rea
*Acting Director of the United States Patent and Trademark Office*